United States Patent
Kita

(10) Patent No.: US 6,619,835 B2
(45) Date of Patent: Sep. 16, 2003

(54) BODY WEARABLE INFORMATION PROCESSING TERMINAL DEVICE

(75) Inventor: Kazunori Kita, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 09/858,231

(22) Filed: May 15, 2001

(65) Prior Publication Data

US 2001/0043514 A1 Nov. 22, 2001

(30) Foreign Application Priority Data

May 17, 2000 (JP) .................................. 2000-144500
Apr. 5, 2001 (JP) .................................. 2001-106722

(51) Int. Cl.[7] .......................... G04B 37/00; G04B 47/00
(52) U.S. Cl. ........................... 368/281; 368/10; 368/11; 368/282
(58) Field of Search .......................... 368/11, 281–282, 368/10

(56) References Cited

U.S. PATENT DOCUMENTS

| | | | | | |
|---|---|---|---|---|---|
| 4,180,970 A | * | 1/1980 | Tokunaga | .................. | 368/243 |
| 4,586,827 A | * | 5/1986 | Hirsch | ........................ | 368/282 |
| 5,477,508 A | * | 12/1995 | Will | ........................... | 368/189 |
| 5,526,006 A | * | 6/1996 | Akahane | ..................... | 343/718 |
| 5,940,349 A | * | 8/1999 | Stewart | ....................... | 368/69 |
| 6,158,884 A | * | 12/2000 | Lebby | ........................ | 368/282 |
| 6,216,490 B1 | * | 4/2001 | Radley-Smith | .................. | 63/3 |

FOREIGN PATENT DOCUMENTS

| | | | | |
|---|---|---|---|---|
| JP | 60-115891 | * | 6/1985 | ................ 368/327 |
| JP | 6-102374 |  | 4/1994 | |

* cited by examiner

*Primary Examiner*—David Martin
*Assistant Examiner*—Michael L. Lindinger
(74) *Attorney, Agent, or Firm*—Frishauf, Holtz, Goodman & Chick, P.C.

(57) ABSTRACT

A function module unit having a memory function is removably attached on one of wrist bands, while a function module unit having a sensor function is removably attached to the other wrist band. On both wrist bands, bus line wires are embedded along the longitudinal direction. Each of the bus line wires comprises a Vcc line, a serial data line, a clock data line, and a ground line. Each of these lines is provided with a connector member which is exposed on the back surface of the wrist band at a position corresponding to the function module unit.

9 Claims, 66 Drawing Sheets

FIG.1A
FIG.1B
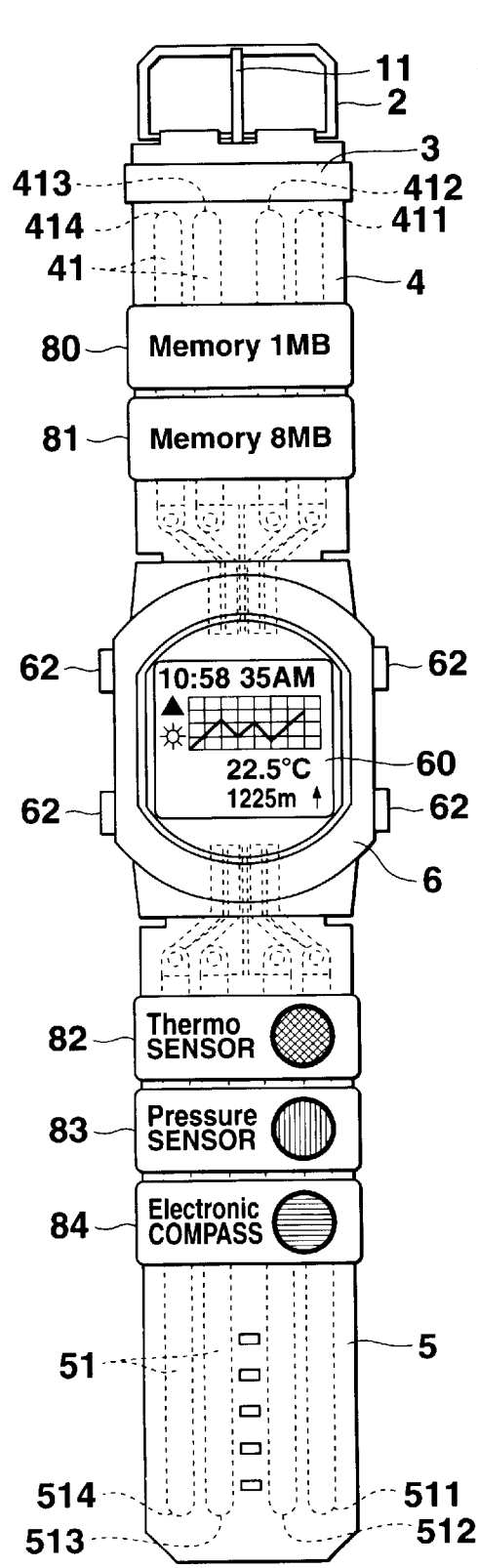
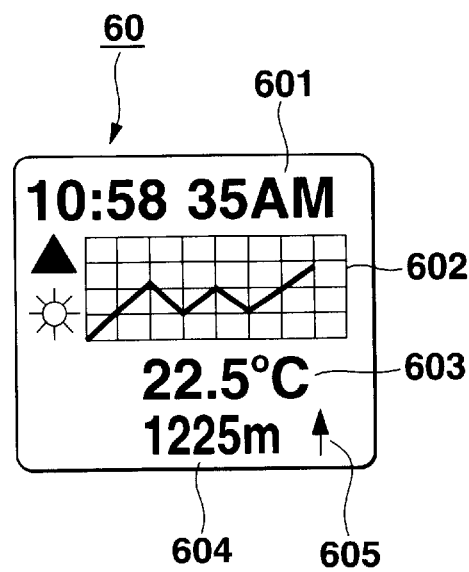

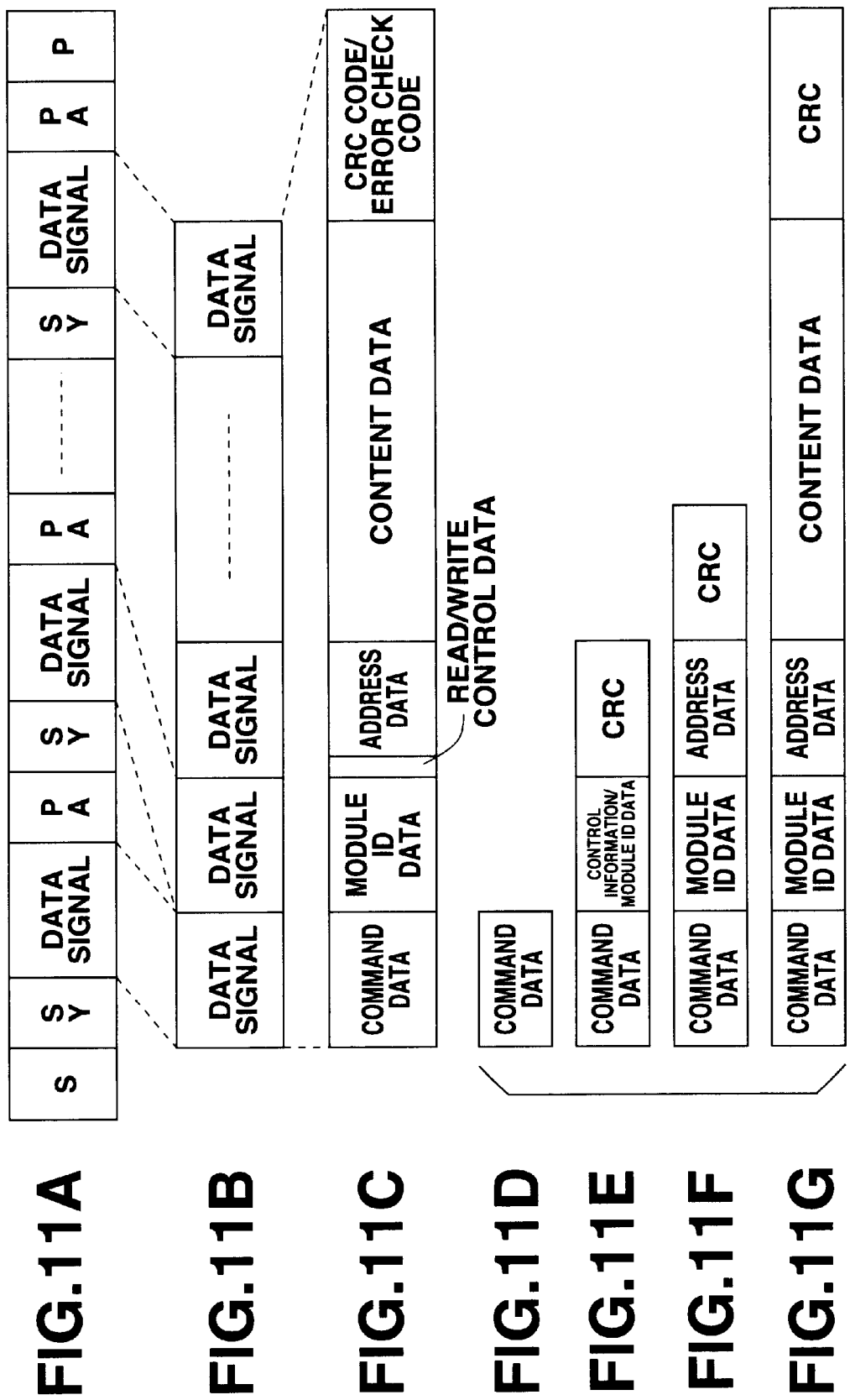

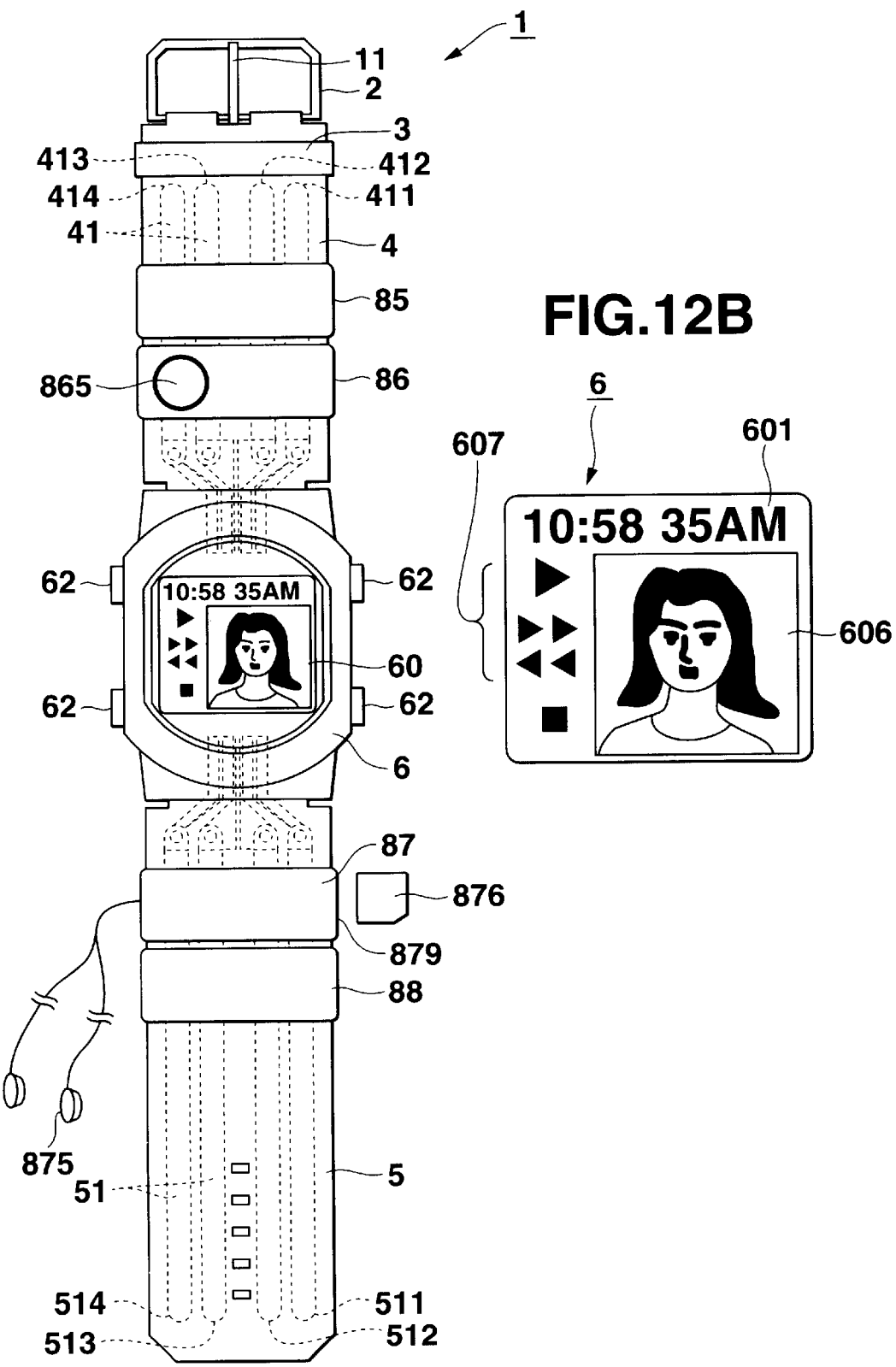

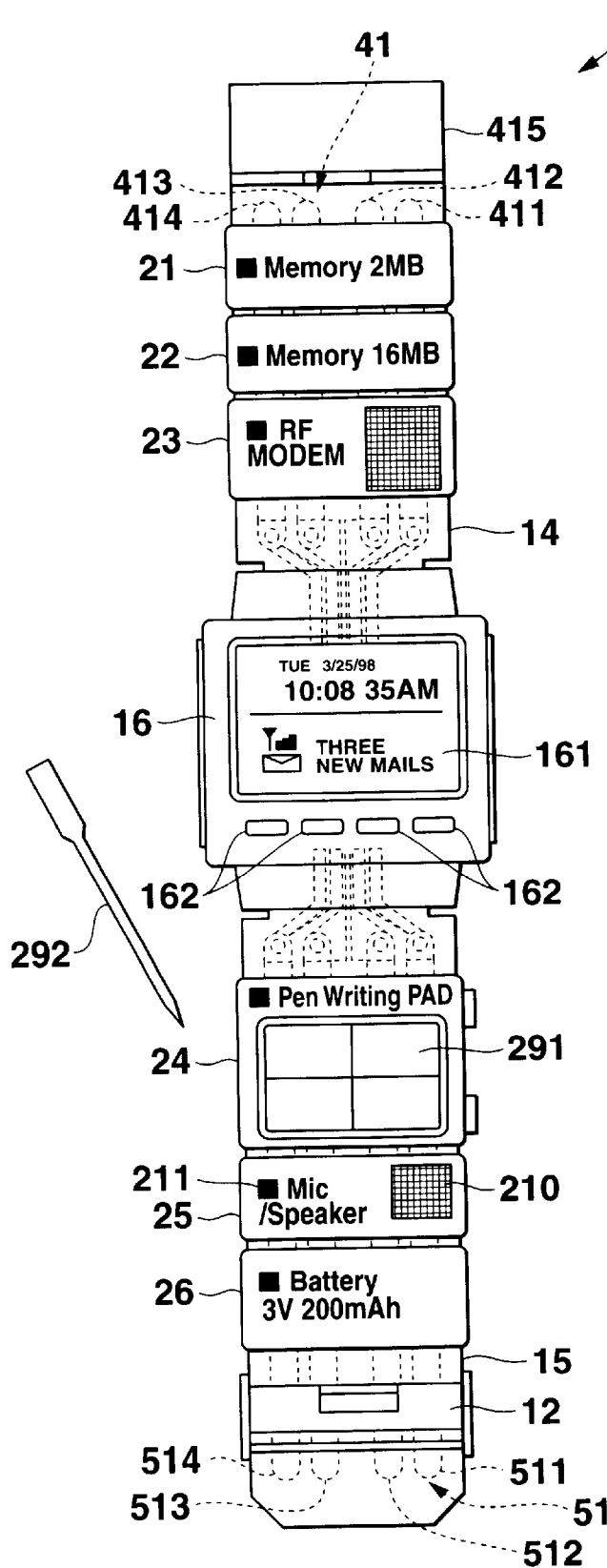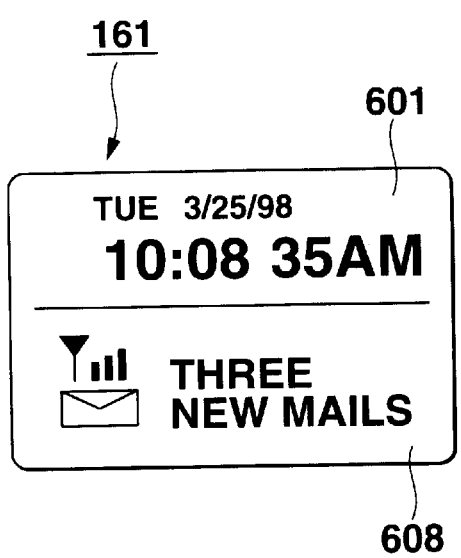

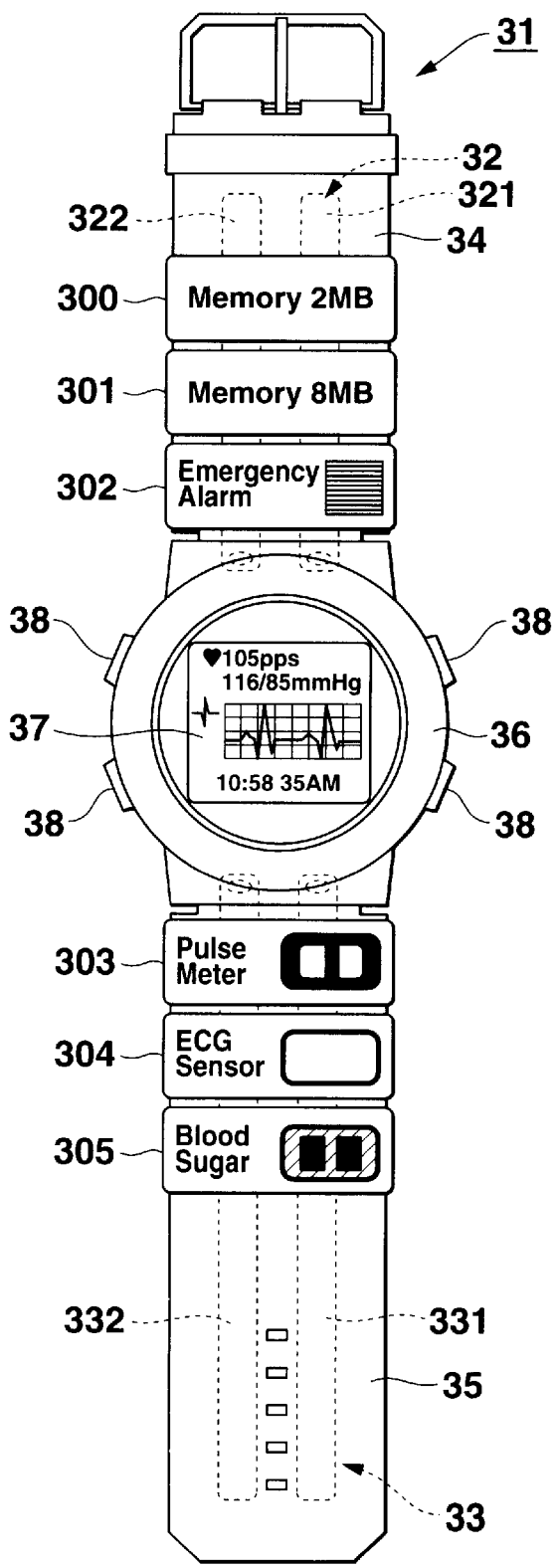
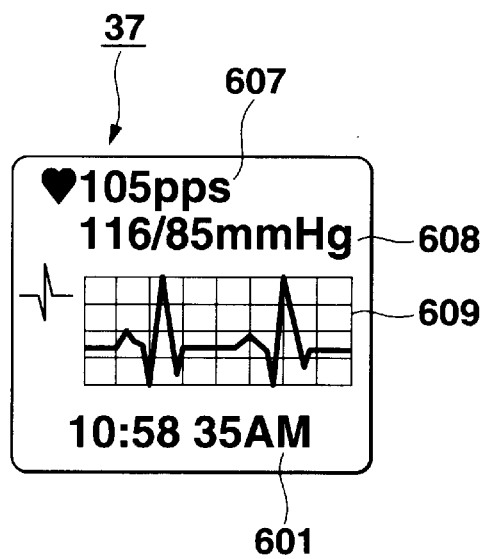
FIG.25A
FIG.25B

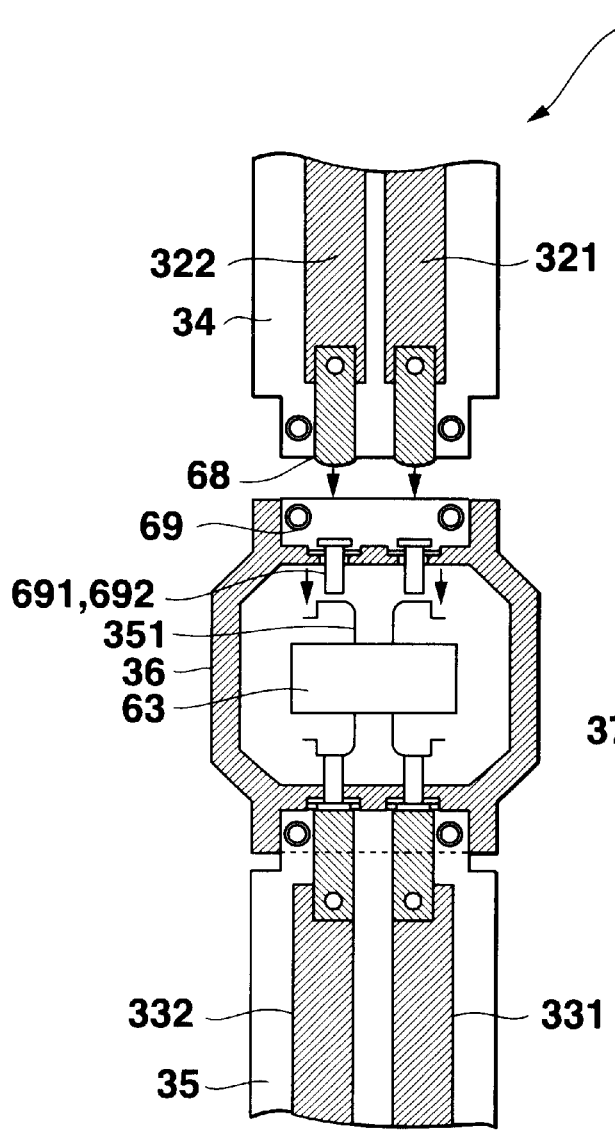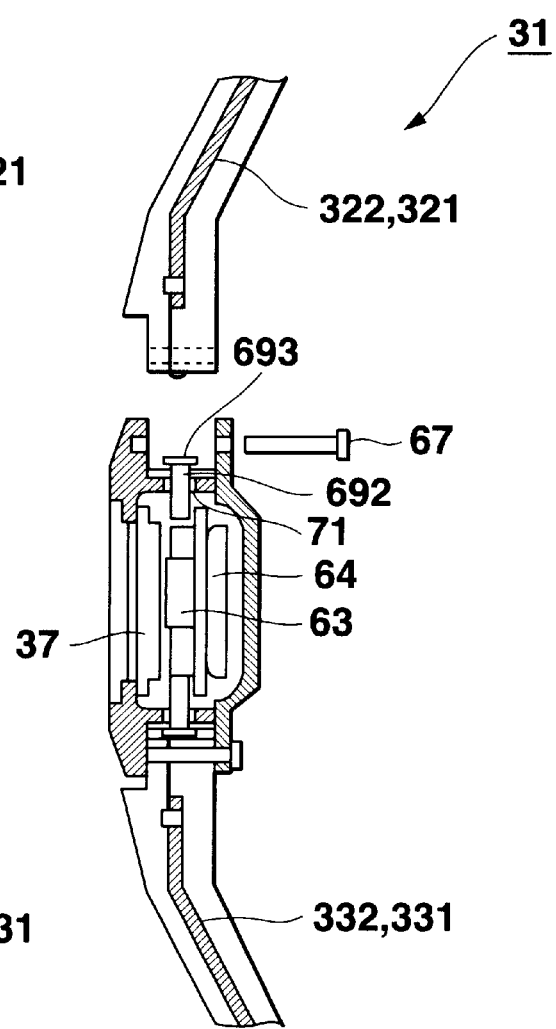

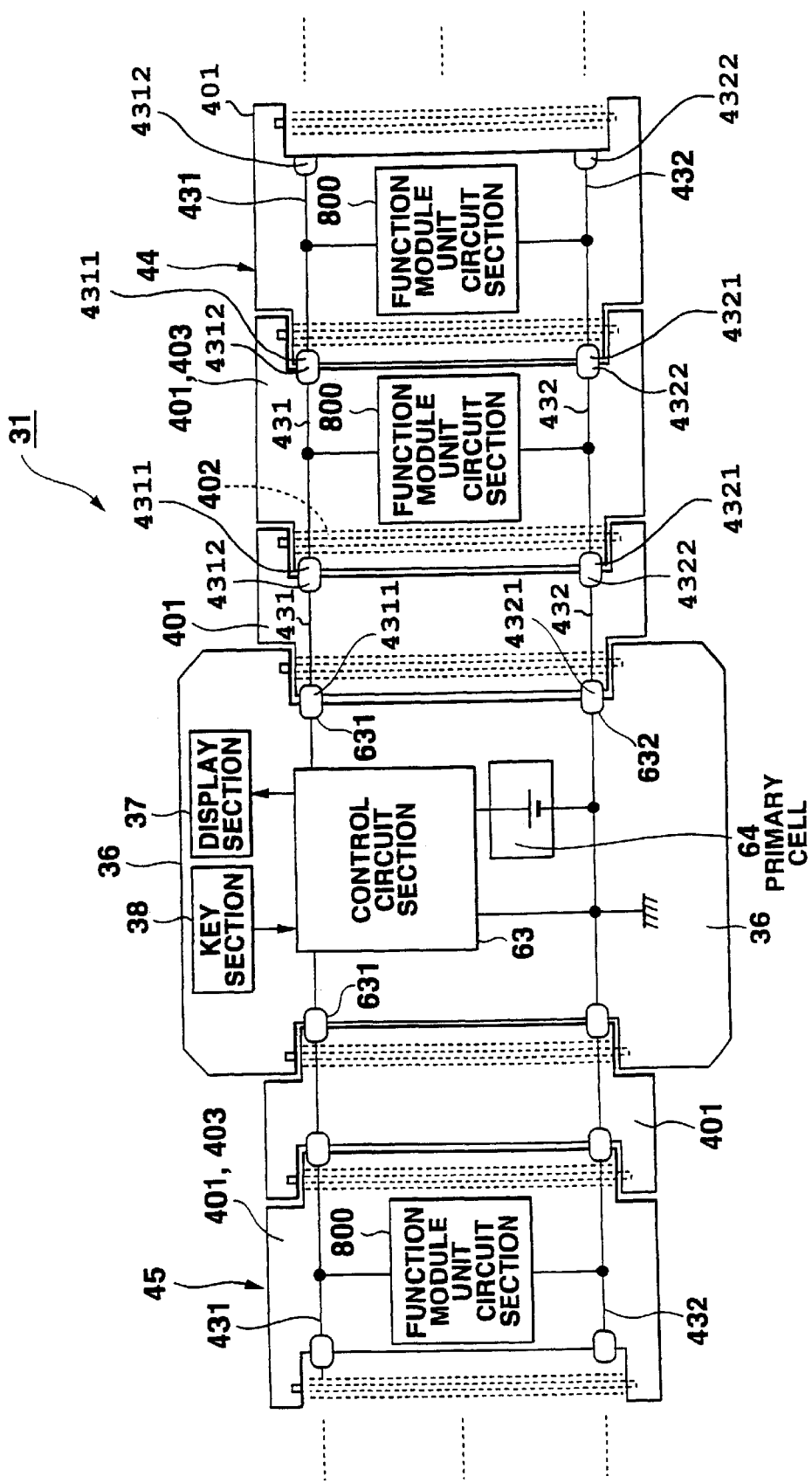

FIG.49

| MODULE ID CODE | MODULE SPECIFICATION CODE | FUNCTION |
|---|---|---|
| 0000 | 0000 | TIME MEASURING SYSTEM |
| 0000 | 0001 | SURF TIMER |
| 0000 | 0010 | YACHT TIMER |
| 0000 | 0011 | DUAL STOPWATCH |
| ⋮ | ⋮ | ⋮ |
| 0000 | 1111 | TIME MEASURING SYSTEM RESERVED |

| MODULE ID CODE | MODULE SPECIFICATION CODE | FUNCTION |
|---|---|---|
| 0001 | 0000 | CPU/PROCESSING PROGRAM SYSTEM |
| 0001 | 0001 | SUNRISE/SUNSET CALCULATION |
| 0001 | 0010 | MOON AGE CALCULATION |
| 0001 | 0011 | TIDE CALCULATION |
| 0001 | 0100 | BIORHYTHM |
| ⋮ | ⋮ | ⋮ |
| 0001 | 1111 | CPU/PROCESSING PROGRAM SYSTEM RESERVED |

FIG.51

| MODULE ID CODE | MODULE SPECIFICATION CODE | FUNCTION |
|---|---|---|
| 0010 | 0000 | MEMORY SYSTEM |
| 0010 | 0001 | 1MB/SRAM |
| 0010 | 0010 | 2MB/SRAM |
| 0010 | 0011 | 4MB/SRAM |
| 0010 | 0100 | 8MB/SRAM |
| 0010 | 0101 | 16MB/FLASH |
| 0010 | 0110 | 32MB/FLASH |
| 0010 | 0111 | 64MB/FLASH |
| ⋮ | ⋮ | ⋮ |
| 0010 | 1111 | MEMORY SYSTEM RESERVED |

| MODULE ID CODE | MODULE SPECIFICATION CODE | FUNCTION |
|---|---|---|
| 0011 | 0000 | DATA BANK SYSTEM |
| 0011 | 0001 | ADDRESS BOOK |
| 0011 | 0010 | SCHEDULE BOOK |
| 0011 | 0011 | TO-DO |
| 0011 | 0100 | URL |
| ⋮ | ⋮ | ⋮ |
| 0011 | 1111 | DATA BANK SYSTEM RESERVED |

| MODULE ID CODE | MODULE SPECIFICATION CODE | FUNCTION |
|---|---|---|
| 0100 | 0000 | SENSOR SYSTEM (MEASUREMENT PROCESSING) |
| 0100 | 0100 | THERMOMETER (°C) |
| 0100 | 0010 | BAROMETER (hPa) —ALTITUDE, DEPTH— |
| 0100 | 0011 | DIRECTION SENSOR (°) |
| 0100 | 0011 | POSITIONING METER (° ' ") |
| 0100 | 0101 | ACCELEROMETER (G) |
| 0100 | 0110 | SPEED METER (km/h) |
| 0100 | 0111 | RADIATION THERMOMETER (°C) |
| 0100 | 1000 | PULSE RATE MEASUREMENT (PULSE/SECOND) |
| 0100 | 1001 | SPHYGMOMANOMETER (mmHg) |
| ⋮ | ⋮ | ⋮ |
| 0100 | 1111 | SENSOR SYSTEM RESERVED |

| MODULE ID CODE | MODULE SPECIFICATION CODE | FUNCTION |
|---|---|---|
| 0101 | 0000 | INPUT PROCESSING SYSTEM (DEVICE) |
| 0101 | 0001 | INPUT VIA CONNECTOR (BINARY DATA) |
| 0101 | 0010 | KEY INPUT (KEYBORD) |
| 0101 | 0011 | 2D INPUT (MOUSE, STYLUS PEN, ETC) |
| 0101 | 0101 | AUDIO INPUT (MICROPHONE) |
| 0101 | 0110 | IMAGE INPUT (SCANNER) |
| 0101 | 0111 | IMAGE INPUT (CCD, CMOS) |
| ⋮ | ⋮ | ⋮ |
| 0101 | 1111 | INPUT PROCESSING SYSTEM RESERVED |

| MODULE ID CODE | MODULE SPECIFICATION CODE | FUNCTION |
|---|---|---|
| 0110 | 0000 | OUTPUT PROCESSING SYSTEM (DEVICE) |
| 0110 | 0001 | OUTPUT VIA CONNECTOR (BINARY DATA) |
| 0110 | 0010 | DISPLAY OUTPUT (MONOCHROME DISPLAY) |
| ⋮ | ⋮ | ⋮ |
| 0110 | 0101 | AUDIO OUTPUT (SPEAKER, EARPHONE) |
| 0110 | 0110 | PRINT OUTPUT (PRINTER) |
| 0110 | 0111 | VIDEO DISPALY OUTPUT (COLOR HIGH RESOLUTION DISPLAY) |
| ⋮ | ⋮ | ⋮ |
| 0110 | 1111 | OUTPUT PROCESSING SYSTEM RESERVED |

| MODULE ID CODE | MODULE SPECIFICATION CODE | FUNCTION |
|---|---|---|
| 0111 | 0000 | WIRELESS PROCESSING SYSTEM (COMMUNICATION SYSTEM) |
| 0111 | 0001 | GENERAL WIRELESS TRANSMISSION (POWER SAVING DIGITAL) |
| 0111 | 0010 | GENERAL WIRELESS RECEPTION (POWER SAVING DIGITAL) |
| 0111 | 0011 | DATA BROADCAST RECEPTION (TUNER) |
| ⋮ | ⋮ | ⋮ |
| 0111 | 0101 | PROXIMATE WIRELESS COMMUNICATION (BLUETOOTH) |
| 0111 | 0110 | WIRELESS LAN |
| 0111 | 0111 | INFRARED COMMUNICATION |
| 0111 | 1000 | TDMA/EDGE |
| 0111 | 1001 | TDMA/GSM |
| 0111 | 1010 | TDMA/NADC |
| 0111 | 1011 | CDMA/CDMA 2000 |
| 0111 | 1100 | CDMA/W-CDMA |
| ⋮ | ⋮ | ⋮ |
| 0111 | 1111 | WIRELESS PROCESSING SYSTEM RESERVED |

| MODULE ID CODE | MODULE SPECIFICATION CODE | FUNCTION |
|---|---|---|
| 1000 | 0000 | PRIMARY CELL |
| 1000 | 0001 | 1.5V, 80mAh |
| 1000 | 0010 | 3V, 150mAh |
| 1000 | 0101 | 3.6V, 200mAh |
| 1000 | 0110 | 4.2V, 250mAh |
| ⋮ | ⋮ | ⋮ |
| 1000 | 1111 | PRIMARY CELL RESERVED |

BODY WEARABLE INFORMATION PROCESSING TERMINAL DEVICE

CROSS-REFERENCE TO RELATED APPLICATIONS

This application is based upon and claims the benefit of priority from the prior Japanese Patent Applications No. 2000-144500, filed May 17, 2000; and No. 2001-106722, filed Apr. 5, 2001, the entire contents of both of which are incorporated herein by reference.

BACKGROUND OF THE INVENTION

1. Field of the Invention

The present invention relates to an information processing terminal device, and more particularly, to an information processing terminal device which is wearable on the body of and operable by a user.

2. Description of the Related Art

Conventionally, wristwatch type information processing terminal devices mountable on the user are available. Such information processing terminal devices contain, in addition to essential components as a watch, circuits for implementing a variety of circuits such as a variety of sensors for measuring a surrounding environment; a memory function for storing input data from the outside; a processor for performing special processing; and so on to previously provide a variety of additional functions, other than a time display function.

Other than the foregoing configuration, there also exists a case for adding functions by attaching units such as a magnetic compass on a wrist band of a wristwatch.

When a variety of functional circuits and so on are incorporated in a body case in the manner mentioned above, a built-in control circuit can control circuits which implement a variety of functions and display the results associated with the functions in parallel with the control of a watch circuit.

However, incorporation of the circuits for implementing a variety of functions in the body case would result in an increased size of the body case, thereby causing an inconvenience when it is worn on a wrist.

When an additional unit is attached to a wrist band, a control circuit unit contained in the body case cannot control this additional unit. Therefore, each of such additional circuits cannot be controlled using a display section which is originally provided on the body case, so that a display section must be provided on each additional unit.

BRIEF SUMMARY OF THE INVENTION

Accordingly, the present invention is directed to an apparatus that substantially obviates one or more of the problems due to limitations and disadvantages of the related art.

In accordance with the purpose of the invention, as embodied and broadly described, the invention is directed to a body wearable information processing terminal device which is capable of readily adding a variety of functions in a controllable manner without the need for a body case of a larger size.

To solve the problem, a body wearable information processing terminal device comprises a case body containing an electronic circuit having a predetermined function, a display section for displaying at least time information, and a band section joined to the case body, removably secured on a human body of a user to make the information processing terminal device wearable, wherein an electronic device is removably mounted on the band section, and the band section has a plurality of connection structures for electrically connecting the electronic device to the electric circuit.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 1A is a diagram illustrating an external appearance of a wristwatch according to a first embodiment of the present invention;

FIG. 1B is an enlarged view of a display section;

FIG. 11A shows the structure of serial data;

FIGS. 11B and 11C show the structures of serial data decoded in function module units 80 through 84;

FIGS. 11D, 11E, 11F, and 11G show exemplary structures of other serial data;

FIG. 12A is a diagram illustrating an external appearance of a wristwatch according to a first modification of the first embodiment;

FIG. 12B is an enlarged view of a display section of the wristwatch illustrated in FIG. 12A;

FIG. 18A is a diagram illustrating an external appearance of a wristwatch according to a second embodiment of the present invention;

FIG. 18B is an enlarged view of a display section of the wristwatch illustrated in FIG. 18A;

FIG. 25A is a diagram illustrating an external appearance of a wristwatch according to a third embodiment;

FIG. 25B is an enlarged view of a display section of the wristwatch illustrated in FIG. 25A;

FIG. 30A is a sectional plan view of a wristwatch according to a third modification of the third embodiment;

FIG. 30B is a sectional side view of the wristwatch illustrated in FIG. 30A;

FIG. 32 is a block diagram illustrating the circuit configuration of a wristwatch according to a fifth modification of the third embodiment;

FIG. 49 is a diagram showing contents stored in a time measuring function module table;

FIG. 50 is a diagram showing contents stored in a CPU/processing program function module table;

FIG. 51 is a diagram showing contents stored in a memory function module table;

FIG. 52 is a diagram showing contents stored in a data bank function module table;

FIG. 54 is a diagram showing contents stored in an input processing (device) function module table;

FIG. 55 is a diagram showing contents stored in an output processing (device) function module table;

FIG. 56 is a diagram showing contents stored in a wireless processing (communication scheme) function module table;

FIG. 57 is a diagram showing contents stored in a primary cell function module table;

DETAILED DESCRIPTION OF THE INVENTION

A preferred embodiment of an information processing terminal device according to the present invention will now be described with reference to the accompanying drawings.
First Embodiment FIG. 1A generally illustrates a wristwatch as a whole to which the present invention is applied, and FIG. 1B is an enlarged view of a display section 60.

As illustrated in FIG. 1A, the wristwatch 1 comprises a body case 6; and a pair of wrist bands 4 and 5 made of resin, which are attached to opposing ends of the body case 6 to serve as members for securely wearing the wristwatch 1 on a body (wrist).

Figure 2:
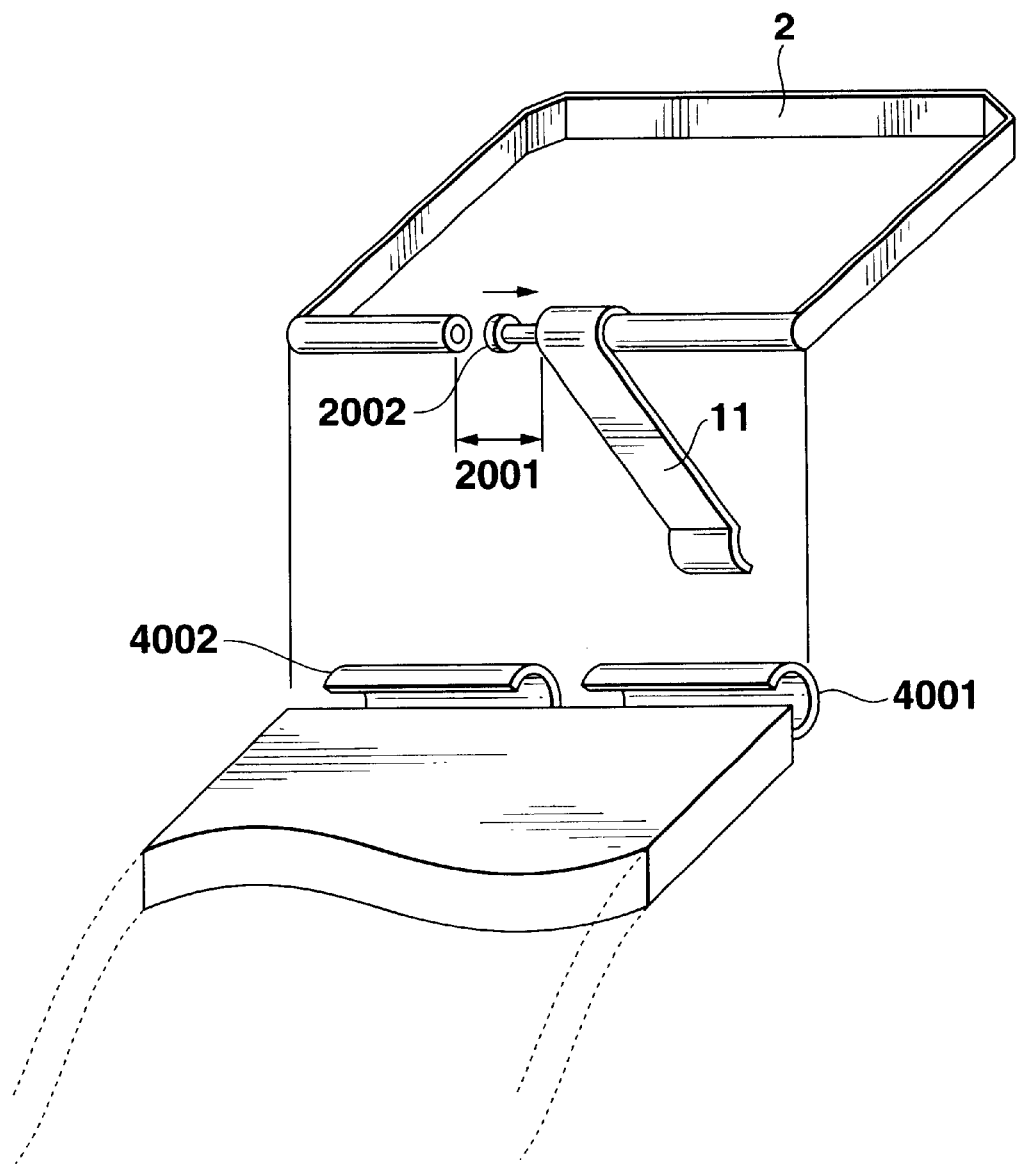
FIG. 2 is a perspective view illustrating how a buckle member and a center fastening pin are attached in the wristwatch according to the first embodiment.

As illustrated in FIG. 2, the wrist band 4 is removably joined to a buckle member 2 by means of a buckle member through hole 4001 and a notch 4002.

A center fastening pin 11 is inserted from a space 2001 of the buckle member 2 in the direction indicated by the arrow, and then is pivotably fixed to the buckle member 2 by a pin 2002 having a diameter sufficiently larger than that of the center fastening pin 11.

This structure is provided for facilitating connection or exchange of function module units 80 and 81 by removing the buckle member 2 and the center fastening pin 11.

The function module units 80 and 81 having a memory function are removably attached to the wrist band 4.

Attached to the other wrist band 5 are a function module unit 82 having a temperature sensor function; a function module unit 83 having a pressure sensor function; and a function module unit 84 having an electronic direction sensor.

On the top surface of the body case 6, a display section 60, comprised of LCD, is provided for displaying time information based on control from a control circuit section 63, later described, and information based on the respective functions of the function module units 80 through 84.

The body case 6 is provided with a plurality of key sections 62 on side surfaces thereof.

Figure 3:
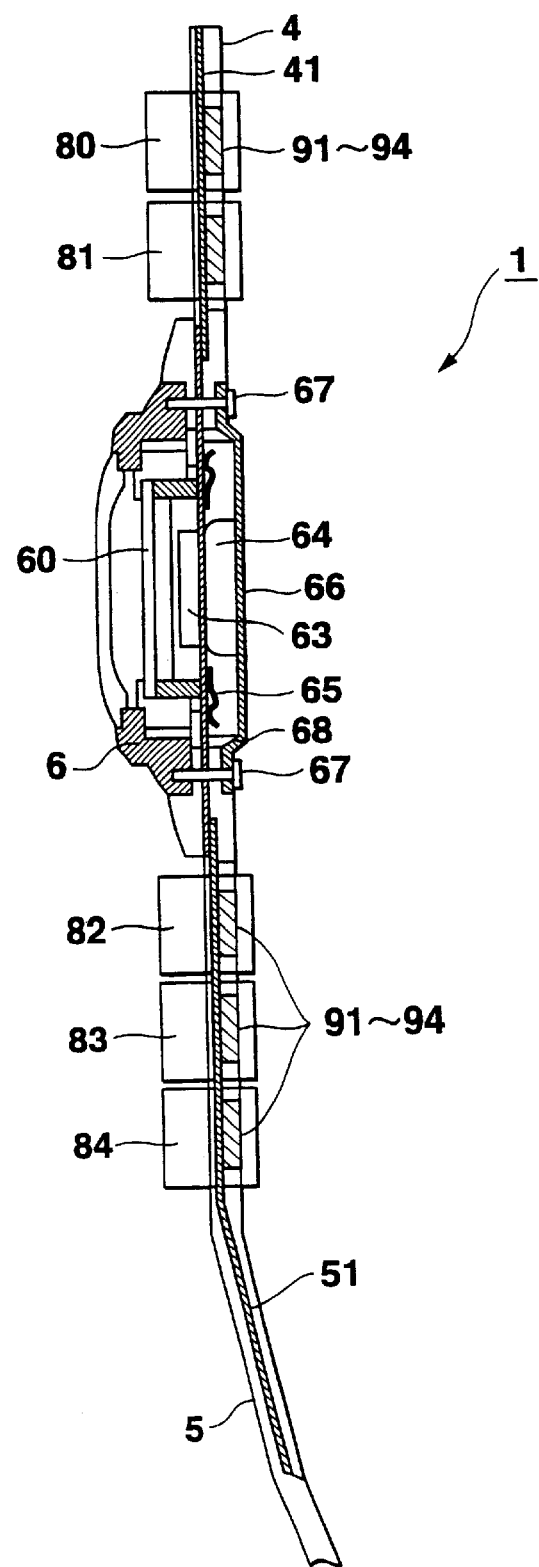
FIG. 3 is a cross-sectional view of the wristwatch according to the first embodiment of the present invention.

The body case 6 contains the control circuit section 63 and a primary cell (battery) 64 arranged in this order below the display section 60, as illustrated in FIG. 3. The body case 6 is closed by a back case 66.

Figure 4:
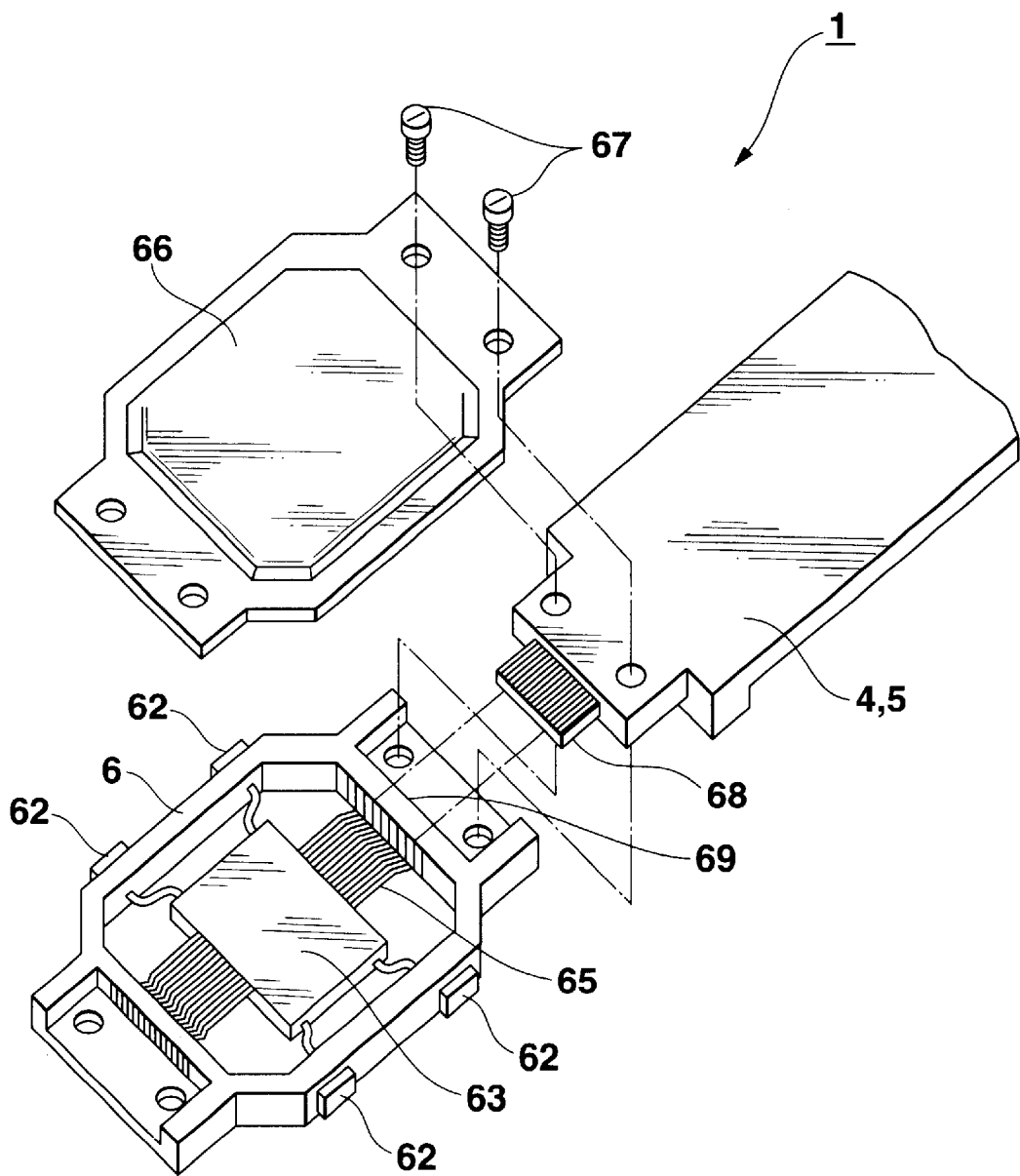
FIG. 4 is an exploded perspective view of a main portion of the wristwatch according to the first embodiment of the present invention.

As illustrated in FIG. 4, the control circuit section 63 is connected to the plurality of key sections 62 as well as is elastically connected to a connection plug member 68 arranged on the wrist bands 4 and 5 by means of four spring members 65 extending toward the ends at which the wrist bands 4 and 5 are attached.

A receptacle member 69 is arranged at each of opposing ends of the body case 6.

As illustrated in FIG. 1A, a band fastening loop member 3, the buckle member 2 and the center fastening pin 11 are attached to an end of the wrist band 4.

Bus line wires 41 and 51 are embedded in the wrist bands 4 and 5, respectively, in the longitudinal direction.

Each of the bus line wires 41 and 51 is comprised of a Vcc (power source) line 411, 511; a serial data line 412, 512; a clock data line 413, 513; and a ground (or earth) line 414, 514.

Figure 5A:
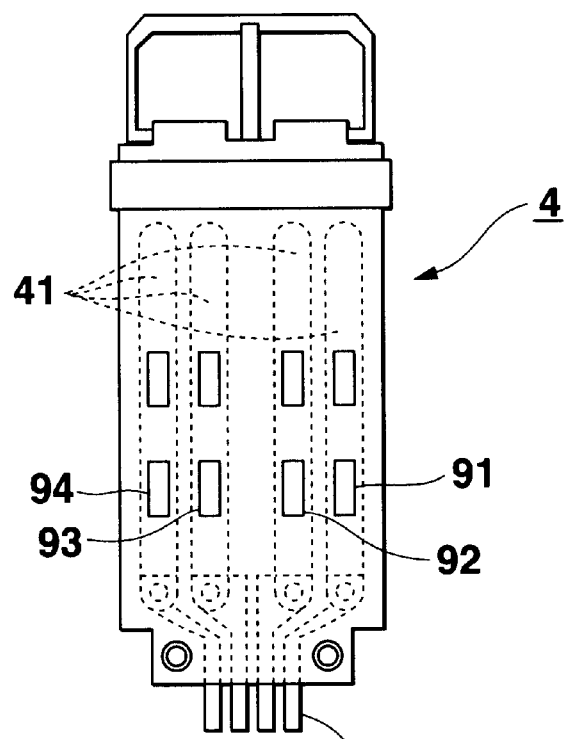
FIG. 5A is a plan view of a wrist band 4.
Figure 5B:
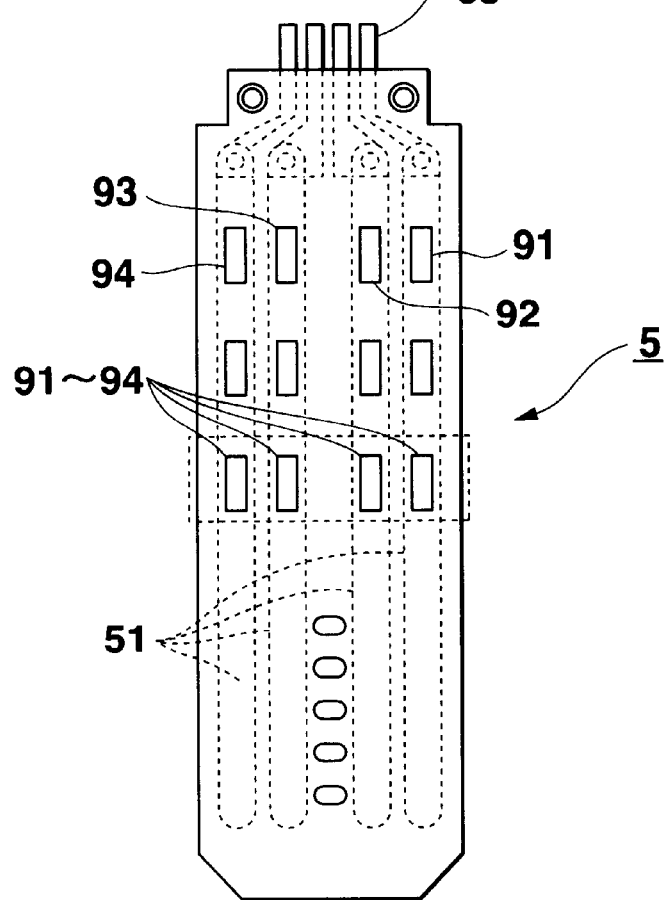
FIG. 5B is a plan view of a wrist band 5.

The respective lines 411 through 514 constituting these bus line wires 41 and 51 are provided with a connector member 91 (for the Vcc line); a connector member 92 (for the serial data line); a connector member 93 (for the clock data line); and a connector member 94 (for the ground line), all of which are exposed on the back surface of the wrist bands 4 and 5 at positions corresponding to the function module units 80 through 84, as illustrated in FIGS. 5A and 5B.

An end of each of the lines 411 through 514 constituting the bus line wires 41 and 51 is connected to the connection plug member 68 arranged at an end of each of the wrist bands 4 and 5.

As illustrated in FIG. 3, this connection plug member 68 is inserted into the receptacle member 69 for bringing an end into contact with the spring members 65.

In this state, the ends of the body case 6 and the ends of the wrist bands 4 and 5 are fastened together by fixing screws 67 for fixing a watch back case 66 to make an electric connection of the body case 6 with the wrist bands 4 and 5.

Figures 6A, 6B:
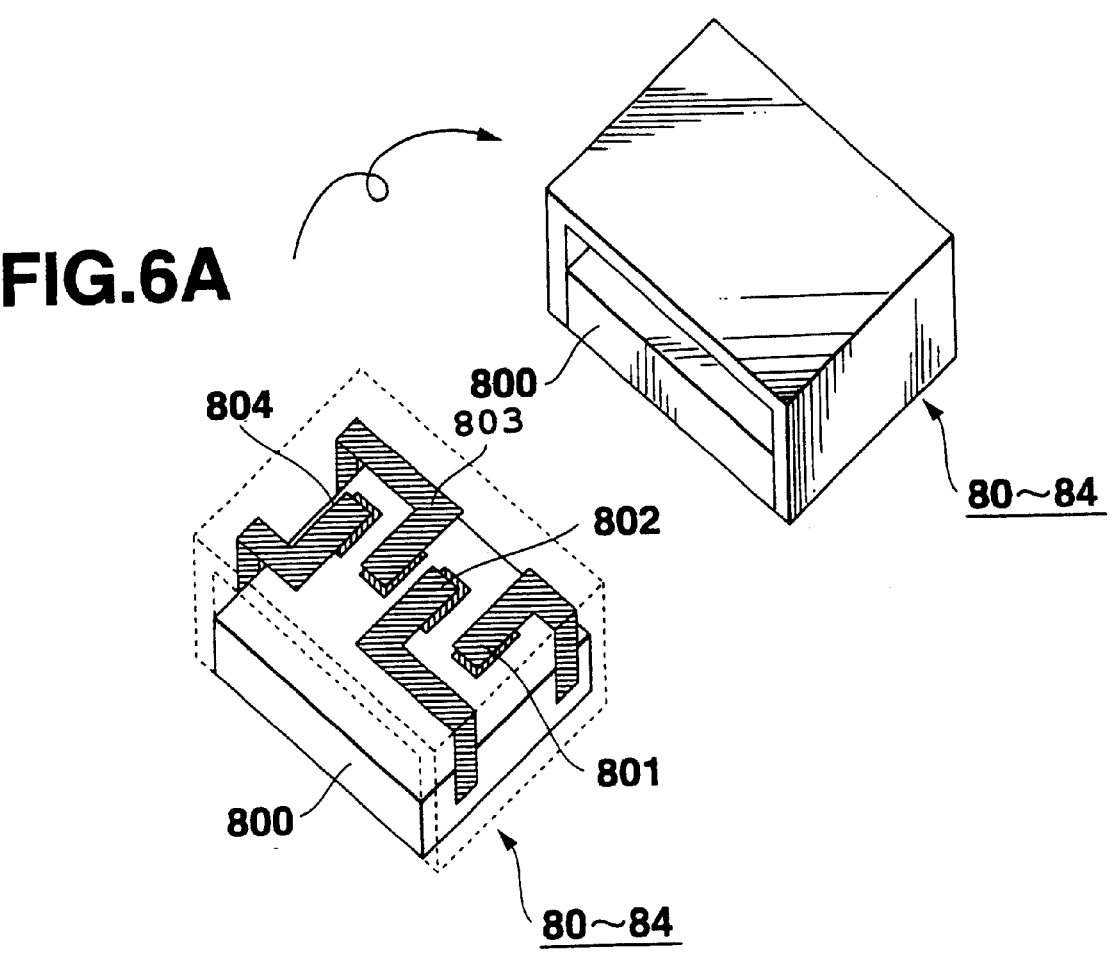
FIG. 6A is a perspective view, seen from the back side, of a function module unit (perspective view of internal line wires in the function module unit)
FIG. 6B is a perspective view of the function module unit, seen from the back side.

As illustrated in FIG. 6A, the function module units 80 through 84 are rectangular parallelepiped in external shape, and enclose circumference of the wrist bands 4 and 5 in direction of width. On one side surface, the function module units 80 through 84 each have a function module unit circuit section 800. In addition, as illustrated in FIG. 6B, the function module units 80 through 84 each have four connector members 801 through 804 on an inner surface opposing the function module unit circuit section 800. These four connector members 801 through 804 are arranged at positions at which they can come into contact with the respective connector members 91 through 94 in a state in which the function module units 80 through 84 are fitted on the wrist bands 4 and 5.

Figure 7:
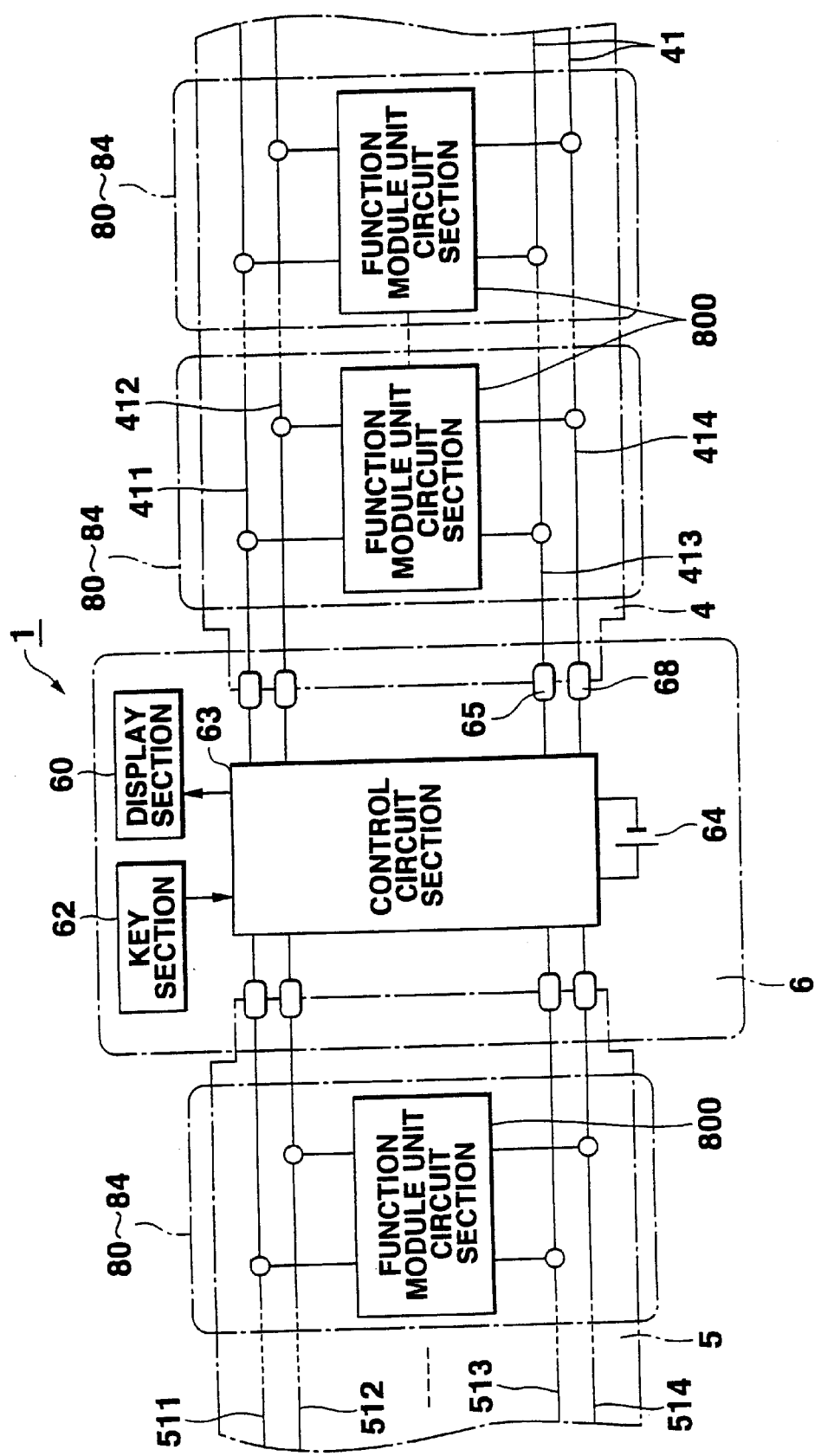
FIG. 7 is a diagram illustrating the circuit configuration of the first embodiment.
Figure 8:
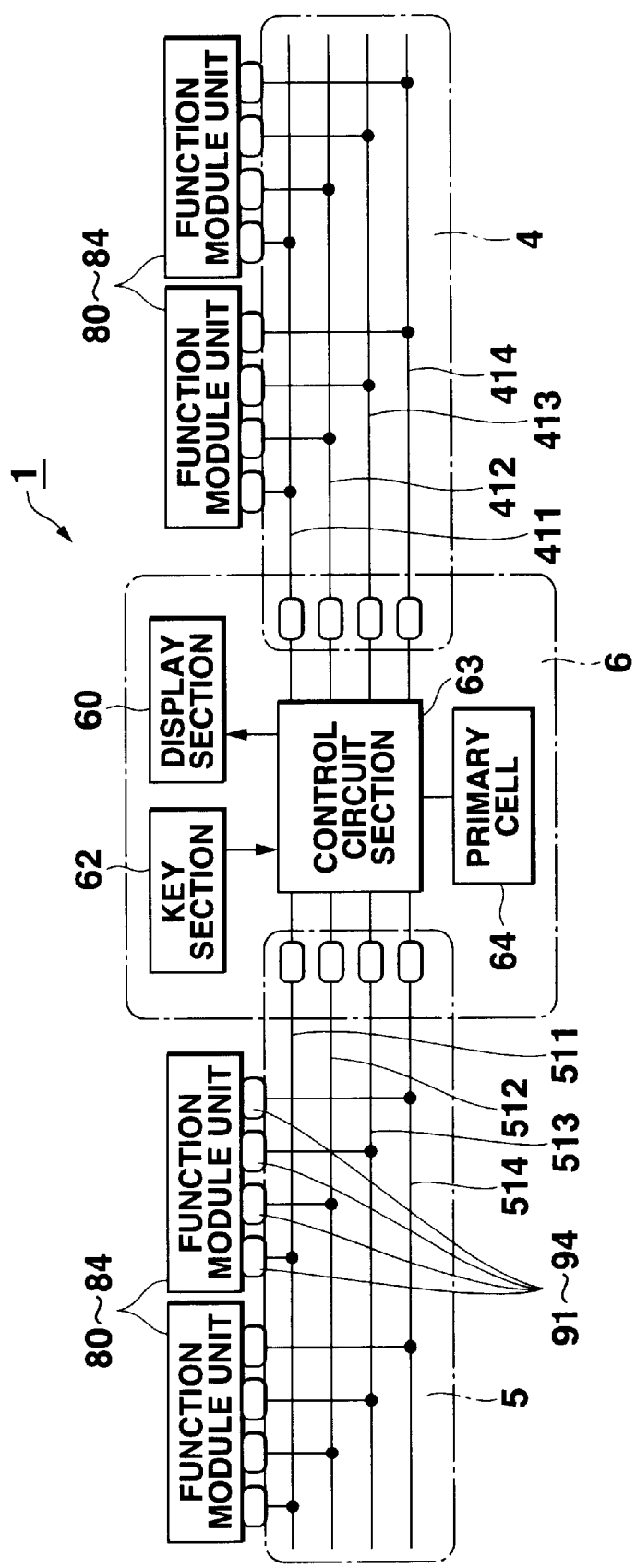
FIG. 8 is a diagram illustrating a connection structure of the first embodiment.

Therefore, as the function module units 80 through 84 are fitted on the wrist bands 4 and 5, the respective function module built-in circuits 800 of the function module units 80 through 84 are connected to the Vcc lines 411, 511; serial data lines 412, 512; clock data lines 413, 513; and ground lines 414, 514 through the connector members 91 through 94 and 801 through 804, as illustrated in FIGS. 7 and 8, and also connected to the control circuit section 63 within the body case 6 through the connection plug member 68 and the spring member 65.

As illustrated in FIGS. 7 and 8, the body case 6 contains the control circuit section 63 and the primary cell 64, and the display section 60 and the key sections 62 are positioned along the outer periphery of the body case 6.

Figures 9A, 9B:
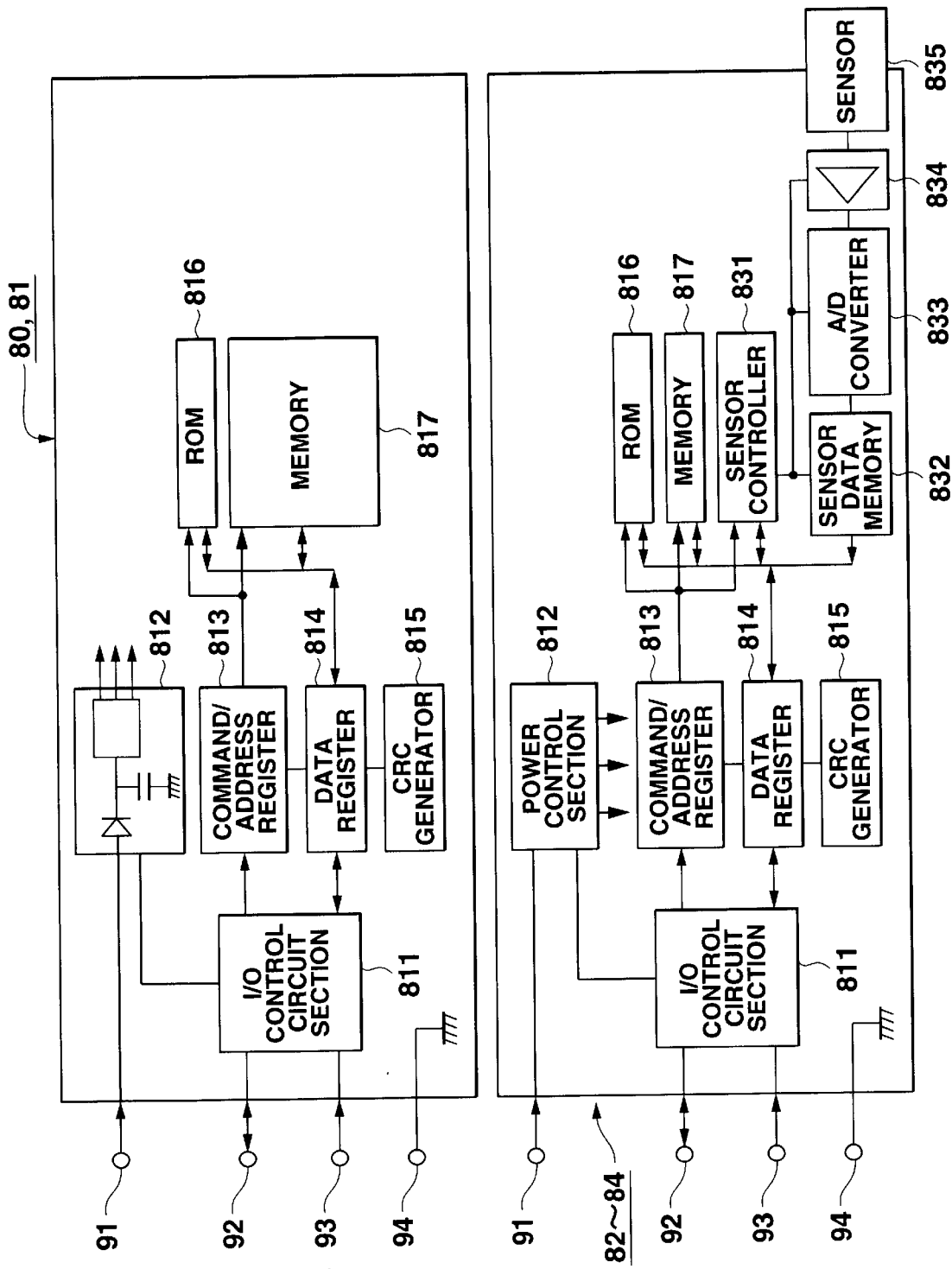
FIG. 9A is a block diagram illustrating the circuit configuration of a function module unit which has a memory function.
FIG. 9B is a block diagram illustrating the circuit configuration of a function module unit which has a sensor function.

FIG. 9A illustrates the circuit configuration of the function module units 80 and 81, and FIG. 9B illustrates the circuit configuration of the function module units 82 through 84. Each of the function module units 80 through 84 is connected to the Vcc line 411, serial data line 413, clock data line 413 and ground line 414 through the connector members 91 through 94.

As illustrated in FIG. 9A, the function module units 80 and 81 having a memory function each comprise a power control section 812 connected to the connector member 91, an I/O control circuit section 811 connected to the connector members 92 and 93; a command/address register 813; a data register 814; a CRC (Cyclic Redundancy Check) generator 815; a ROM 816; and a memory 817.

The ROM 816 stores identification data such as module ID data, serial No. data and so on which are unique to the associated function module unit.

Similarly, as illustrated in FIG. 9B, the function module units 82 through 84 having a sensor function each comprise a sensor controller 831, a sensor data memory 832, an A/D converter 833, an amplifier 834, and a sensor 835, as well as an I/O control circuit section 811, a power control section 812, a command/address register 813, a data register 814, a CRC generator 815, a ROM 816, and a memory 817.

Figure 10A:
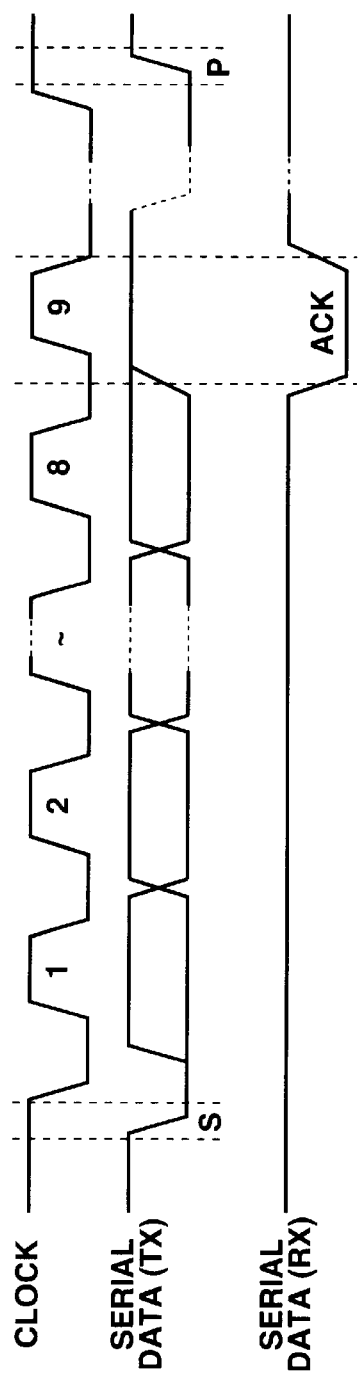
FIG. 10A is a transmission/reception timing chart of transmission/reception signals in the first embodiment.
Figure 10B:
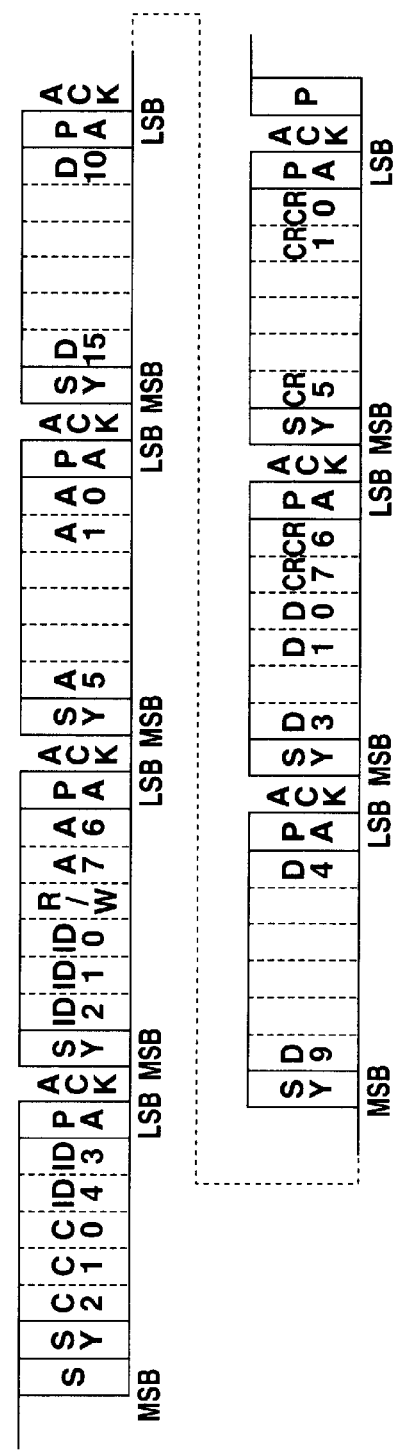
FIG. 10B shows the structure of serial data carried by transmission/reception signals.

FIGS. 10A and 10B show exemplary structures of data communicated between the body case 6 and the function module units 80 through 84.

As illustrated in a timing chart of FIG. 10A, serial data is communicated in accordance with an asynchronous transmission system using a start bit S and a stop bit P, wherein a transmission is started with the start bit S, every eight bits of data are serially transmitted, and the stop bit P is finally transmitted before the transmission is terminated.

On the reception side, as the reception of every eight bits of data is confirmed, an acknowledgement signal ACK is returned to the data transmission side.

In this event, as illustrated in FIG. 10B, the serial data transmitted from the control circuit section 63 has the start bit S set at the head, and the stop bit P set at the end, and is comprised of a command data signal (C0 through C2: three bits); a module ID data signal (ID0 through ID4: five bits); a read/write control signal (R/W: one bit); an address data signal (A0 through A7: eight bits); a data signal (D0 through D15: 16 bits) and a CRC code/error check code (CR0 through CR7: eight bits), which are set between a synchronization signal SY and a parity check bit PA in units of eight bits, such that the reception of the acknowledgement signal ACK transmitted from the reception side can be confirmed in units of eight bits.

FIG. 11A shows the data structure of serial data which is transmitted from the control circuit section 63 to the function module units 80 through 84 through the connector member 92. The serial data is comprised of a set of data in predetermined units which is made up of the synchronization signal SY, data signals C, ID, R/W, A, D, CR, and the parity check bit PA.

This serial data is decoded in the function module units 80 through 84, as shown in FIG. 11B.

As shown in FIG. 1C, these data signals C, ID, R/W, A, D, CR are comprised of command data, read/write control data, module ID data, address data, data (content data), and CRC code/error check code.

While in this embodiment, the synchronization signal SY is included in the data structure, the acknowledgement signal ACK may be included in the data structure in place of the synchronization signal SY, so that the synchronization signal SY is omitted.

ACK (acknowledgement) data and NAK (negative acknowledgement) data are comprised only of command data, as shown in FIG. 11D.

SOF, EOF, initial settings for the function module units 80 through 84, ON/OFF control, request for attribute information (properties) are comprised of command data, module ID data, and CRC code/error check code, as shown in FIG. 1E.

A read command for reading data stored in the memory 817 of the function module units 80 through 84, and an input command from the function module units 80 through 84 are comprised of command data, module ID data, address data, and CRC code/error check code, as shown in FIG. 11F.

A data write command for writing data into the memory 817 of the function module units 80 through 84, and an output command to the function module units is comprised of command data, module ID data, address data, data (output content data or data to be written), and CRC code/error check code, as shown in FIG. 11G.

Since the serial data is communicated between the body case 6 and the function module units 80 through 84 through the wrist bands in the manner mentioned above, it is not necessary to incorporate a memory or a sensor in the body case 6.

Also, the results of measurements made by the function module units 82 through 84 can be generated and displayed on the display section 60.

As illustrated in FIG. 1B, a current time 601 measured by the control circuit section 63; an altitude history 602 and an altitude of a current position generated based on data measured by the function module unit 83; a temperature 603 generated based on data measured by the function module unit 82; and a compass direction 605 generated based on data measured by the function module unit 84 are displayed on the display section 60.

It is therefore possible to readily add a plurality of functions to the wristwatch 1 without the need for increasing the size of the body case and to use the wristwatch 1 as an information processing terminal device which provides a wide variety of functions.

First Modification of First Embodiment

FIG. 12A generally illustrates the whole wristwatch according to the first modification of the first embodiment, and FIG. 12B is an enlarged view of a display section 60.

The wristwatch 1 illustrated in FIG. 12A, though substantially identical to that illustrated in FIG. 1A, differs in the functions of the function module units 85 through 88 and the circuit configuration.

The function module units 85 through 88 have a wireless communication function, an image capturing function, a music replay function, and a touch sensor function with a liquid crystal display, respectively. The function module unit 87 which has the music replay function is provided with a slot 879 for inserting a semiconductor memory chip 876 on which music data is recorded.

Figures 13A, 13B:
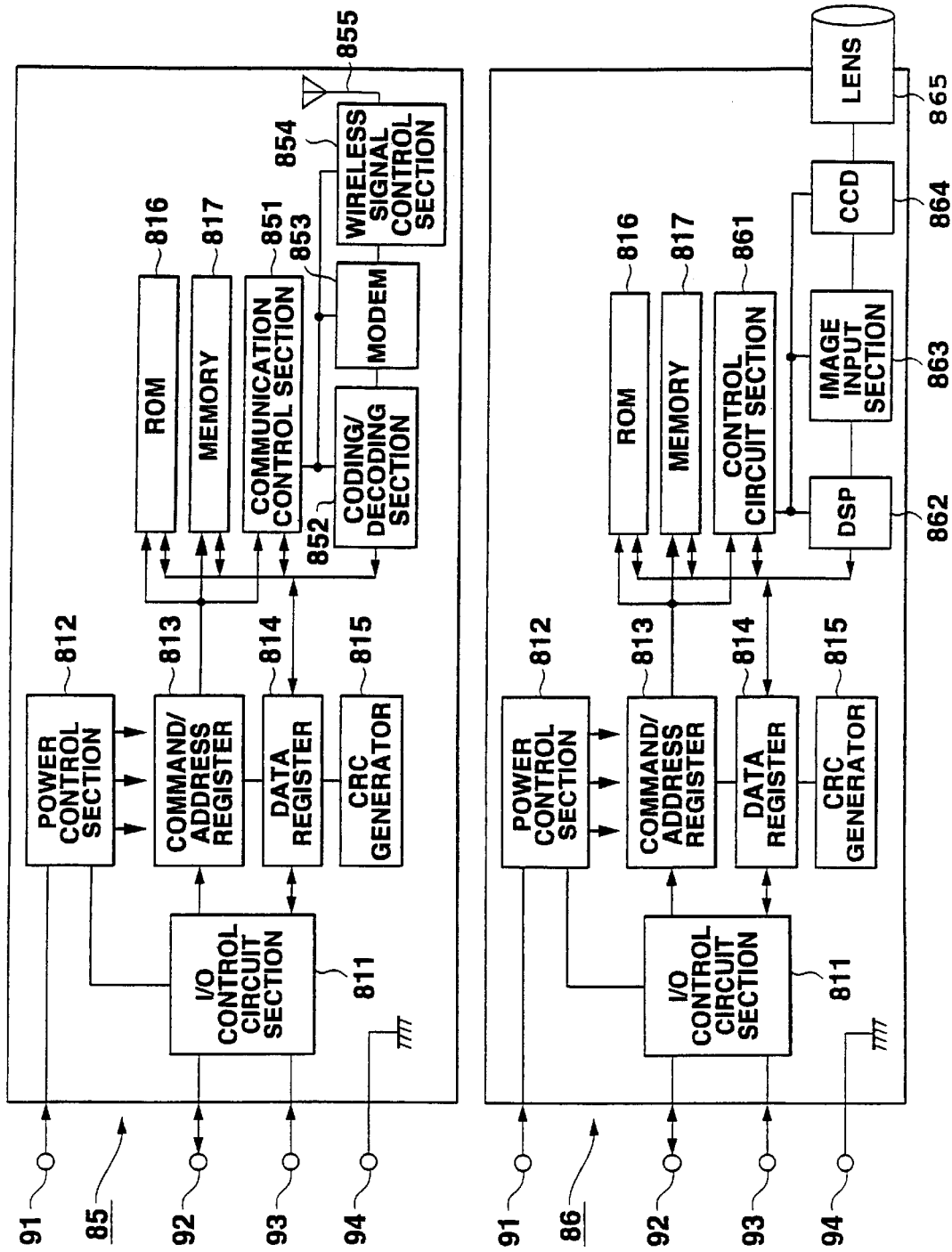
FIG. 13A is a block diagram illustrating the circuit configuration of a function module unit which has a communication function.
FIG. 13B is a block diagram illustrating the circuit configuration of a function module unit which has an input function.

The function module unit 85 having the wireless communication function, as illustrated in FIG. 13A, comprises an I/O control circuit section 811, a power control section 812, a command/address register 813, a data register 814, a CRC generator 815, a ROM 816, and a memory 817, as is the case with the function module units 80 through 84, and also comprises a communication control section 851, a coding/decoding section 852, a modem 853, a wireless signal control section 854, and an antenna 855.

Therefore, according to the function module unit 85 having the wireless communication function, data received by the wireless signal control section 854 through the antenna 855 can be transferred to the body case 6 through the wrist band 4 and displayed on the display section 60.

It is also possible to transmit data from the wireless signal control section 854 through the antenna 855 by manipulating the key sections 62 on the body case 6.

The function module unit 86 having the image capturing function, as illustrated in FIG. 13B, comprises the respective circuit sections from the I/O control circuit section 811 to the memory 817, and also comprises a control circuit section 861 for image capturing, a coding section 862 including a DSP (Digital Signal Processor), an image input section 863, an input device (CCD (Charge Coupled Device)) 864, and a lens 865.

Therefore, according to the function module unit 86 having the image capturing function, an image captured by the input device (CCD) 864 through the lens 865 is input to the image input section 863, and image data processed by the coding section (DSP) 862 can be transferred to the body case 6 by the I/O control circuit section 811 and displayed on the display section 60.

It is also possible to input image data from the coding section (DSP) 862 and stored in the memory 817 by manipulating the key sections 62 on the body case 6.

Figures 14A, 14B:
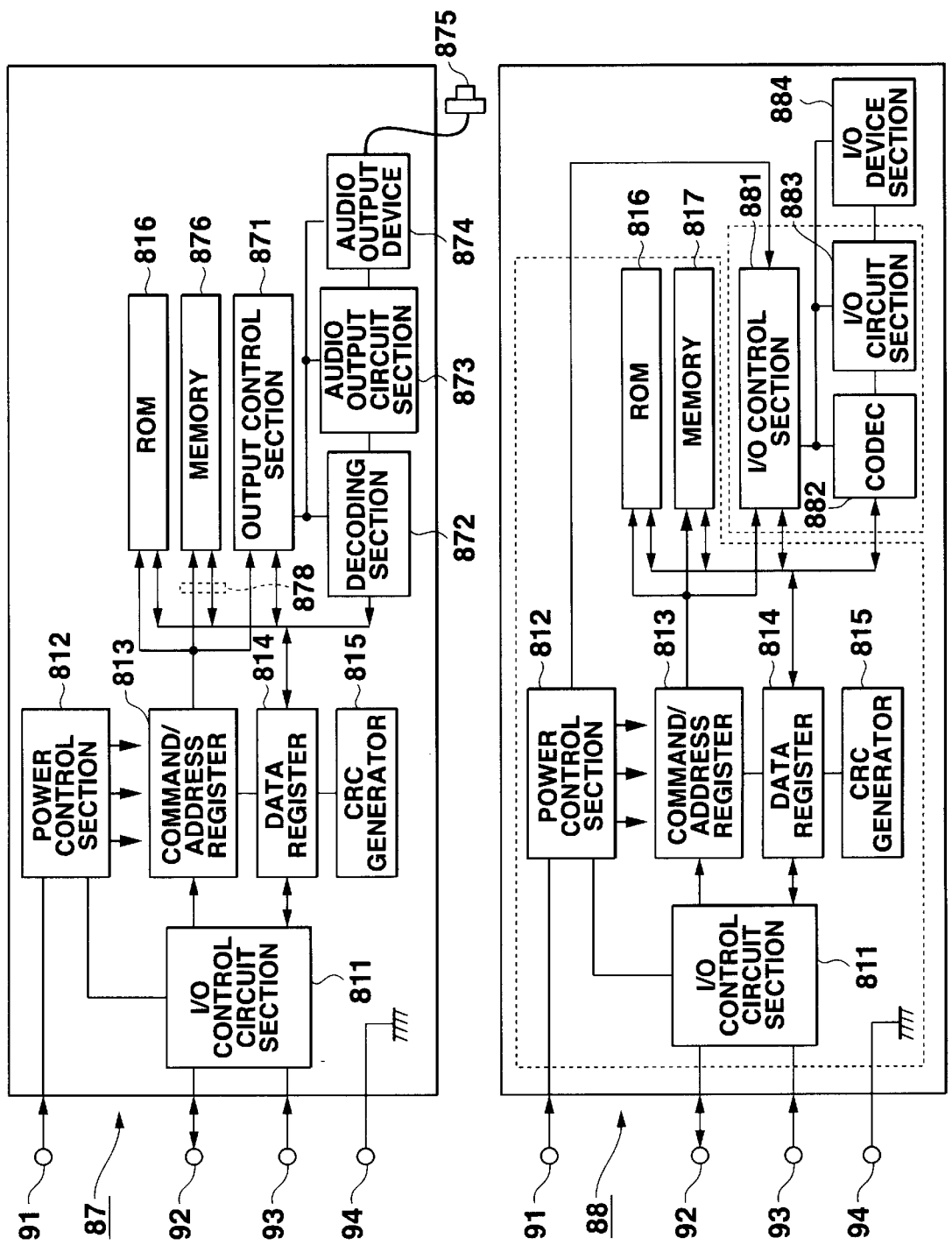
FIG. 14A is a block diagram illustrating the circuit configuration of a function module unit which has an output function.
FIG. 14B is a block diagram illustrating the circuit configuration of a function module unit which has an input/output function.

The function module unit 87 having the music replay function, as illustrated in FIG. 14A, comprises the respective circuit sections from the I/O control circuit section 811 to the ROM 816, and also comprises a connector 878 for making an electric connection with respective terminals (not shown) of the semiconductor memory chip 876 arranged deep in the slot 879, an output control section 871, a decoding section 872, an audio output circuit section 873, and an audio output device 874 comprising an ear phone jack to which an ear phone 875 is connected.

Therefore, according to the function module unit 87 having the music replay function, music data recorded on the semiconductor memory chip 876 can be replayed and listened to by the ear phone by manipulating the key sections 62 on the body case 6.

The function module unit 88 having the touch sensor function with a LCD (liquid crystal display), as illustrated in FIG. 14B, comprises the respective circuit sections from the I/O control circuit section 811 to the memory 817, and also comprises an input/output control section 881, an encoding/decoding section 882, an input/output circuit section 883, and an input/output device section 884 comprised of a LCD and a transparent touch panel arranged on the surface of the LCD.

Therefore, according to the function module unit 88 having the touch sensor function with the LCD, data can be output from or input to the input/output device 884. In this way, the wristwatch 1 can display the current time 601 measured by the control circuit section 63; an image 606 captured by the function module unit 86; and a manipulation icon 607 for manipulating the function module unit 87 on the display section 60, as illustrated in FIG. 12B.

Second Modification of First Embodiment

Figure 15A:
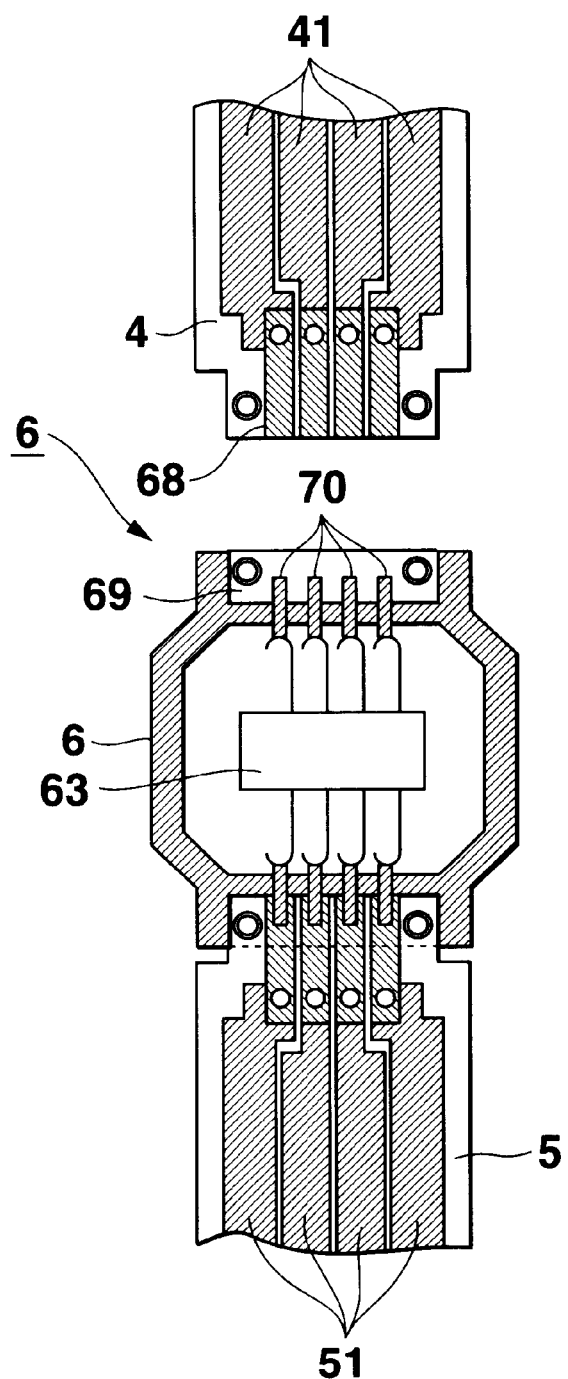
FIG. 15A is a sectional plan view of a wristwatch according to a second modification of the first embodiment.
Figure 15B:
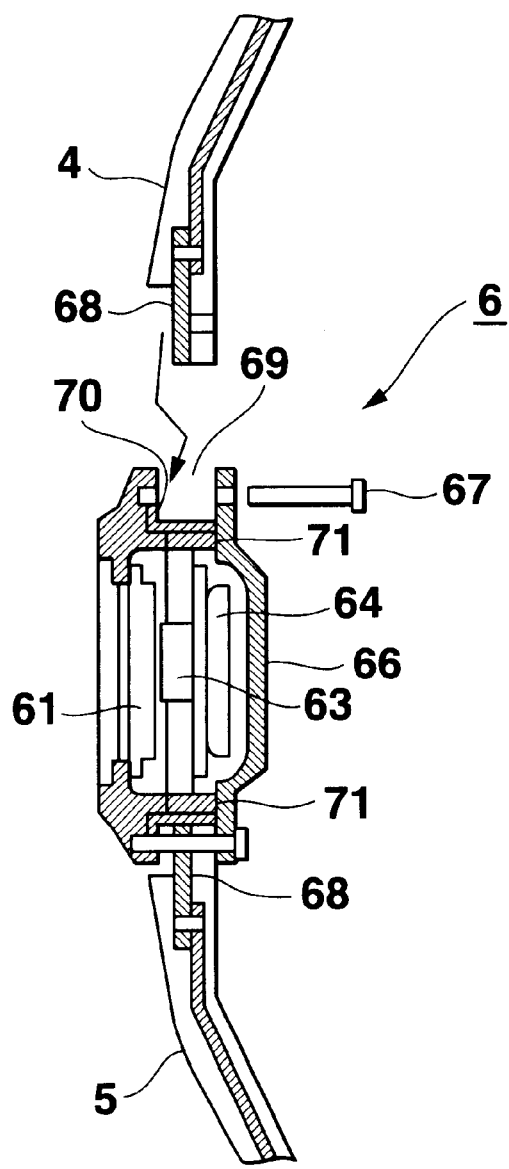
FIG. 15B is a sectional side view of the wristwatch illustrated in FIG. 15A.

FIGS. 15A and 15B illustrate the second modification of the first embodiment. The receptacle member 69 of the body case 6 is provided with four plate springs 70 connected to the control circuit section 63.

Water-proof packing 71 is interposed between the plate springs 70, back case 66 of the wristwatch 1, and body case 6.

The two wrist bands 4 and 5 are fixed by fixing screws 67 with the connection plug member 68 inserted in the receptacle member 69.

With this structure, the connection plug member 68 is elastically connected to the plate springs 70, causing the bus line wires 41 and 51 to be connected to the control circuit section 63 through the connection plug member 68 and the plate springs 70. According to this modification, the water-proof packing 71 can prevent a contact failure and so on due to immersion.

Third Modification of First Embodiment

Figure 16:
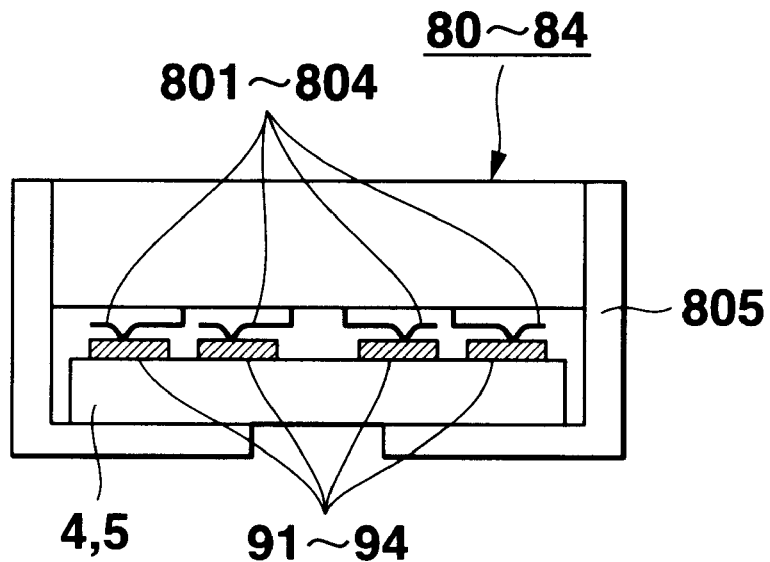
FIG. 16 is a schematic cross-sectional view of a wrist band in a third modification of the first embodiment.

FIG. 16 illustrates a third modification of the first embodiment. The wrist bands 4 and 5 are provided with connector members 91 through 94 protruding from the surfaces thereof.

On both sides of each function module unit 80 through 84, attachment members 805 having a substantially L-shape are provided for wrapping the wrist bands 4 and 5.

Connector members 801 through 804 are arranged on the bottom surface of each function module unit 80 through 84, and the connector members 801 through 804 have spring forces for elastic connection with the connector members 91 through 94 on the wrist bands 4 and 5.

Therefore, the connector members 801 through 804 can be brought into contact with the connector members 91 through 94 by the spring forces to ensure the conduction therebetween.

Fourth Modification of First Embodiment

Figure 17:
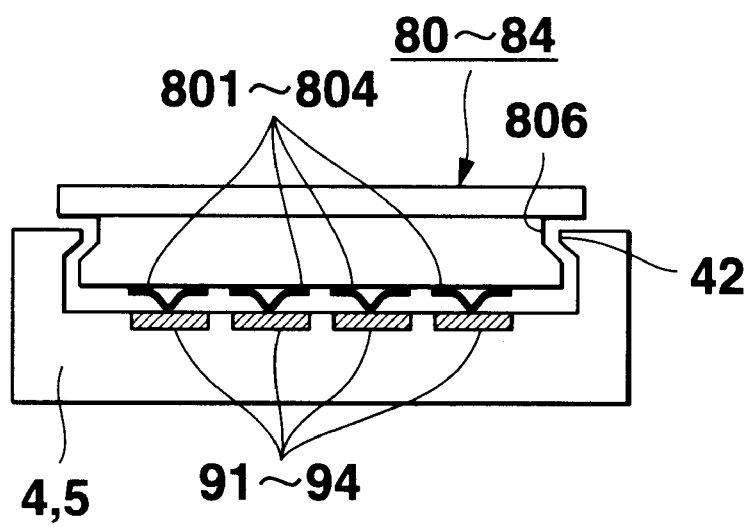
FIG. 17 is a schematic cross-sectional view of a wrist band in a fourth modification of the first embodiment.

FIG. 17 illustrates a fourth modification of the first embodiment, wherein connector members 91 through 94 are arranged in flush with the surfaces of the wrist bands 4 and 5.

Each of the wrist bands 4 and 5 is provided on both sides with protrusions 42 which extend outward in directions opposite to each other.

Each of the function module units 80 through 84 is provided with recesses 806 on both sides for engagement with the protrusions 42, and connector members 801 through 804 on the lower surface which come in contact with the connector members 91 through 94.

Each of the function module units 80 through 84 is mounted on the wrist band 4 or 5 by engaging the recesses 806 to the protrusions 42, with the connector members 801 through 804 in contact with the connector members 91 through 94.

Therefore, even with the function module units 80 through 84 mounted on the wrist bands, the entire thickness of the wrist bands can be reduced, thereby making it possible to carry the watch without discomfort.

Second Embodiment

FIG. 18A generally illustrates the whole wristwatch 101 according to the second embodiment of the present invention, and FIG. 18B is an enlarged view of a display section 161.

As illustrated in FIG. 18A, the wristwatch 101 comprises a body case 16, and a pair of wrist bands 14 and 15 which are attached to opposing ends of the body case 16.

One wrist band 14 is provided with a fixture 415 at an end for connection with a buckle member 12 of the wrist band 15 to fix both wrist bands 14 and 15.

Function module units 21 and 22 having a memory function, and a function module unit 23 having a wireless communication function are removably mounted on the wrist band 14, while a function module unit 24 having a hand-written character input function, a function module unit 25 having a speech input/output function, and a power supply module unit 26 are removably mounted on the other wrist band 15.

The display section 161 comprised of LCD and a plurality of key sections 162 are arranged on the top surface of the body case 16.

The function module unit 24 is provided with a touch panel 291 and a stylus pen 292 for entering handwritten characters and so on. The function module unit 25 is provided with a speaker 210 and a microphone 211.

The buckle member 12 is attached to an end of the wrist band 15.

Bus line wires 41 and 51 are embedded in both wrist bands 14 and 15, respectively, along the longitudinal direction.

Each of the bus line wires 41 and 51 is comprised of a Vcc line 411, 511; a serial data line 412, 512; a clock signal line 413, 513; and a ground line 414, 514.

A connection structure for connecting the wrist bands 14 and 15 to the body case 16 is similar to the first embodiment illustrated in FIGS. 3 and 4, and a connection structure for the Vcc line 411, 511, serial data lines 412, 512, clock data lines 413, 513, and ground lines 414, 514 are also similar to the first embodiment illustrated in FIGS. 4, 5A, and 5B.

Figure 19:
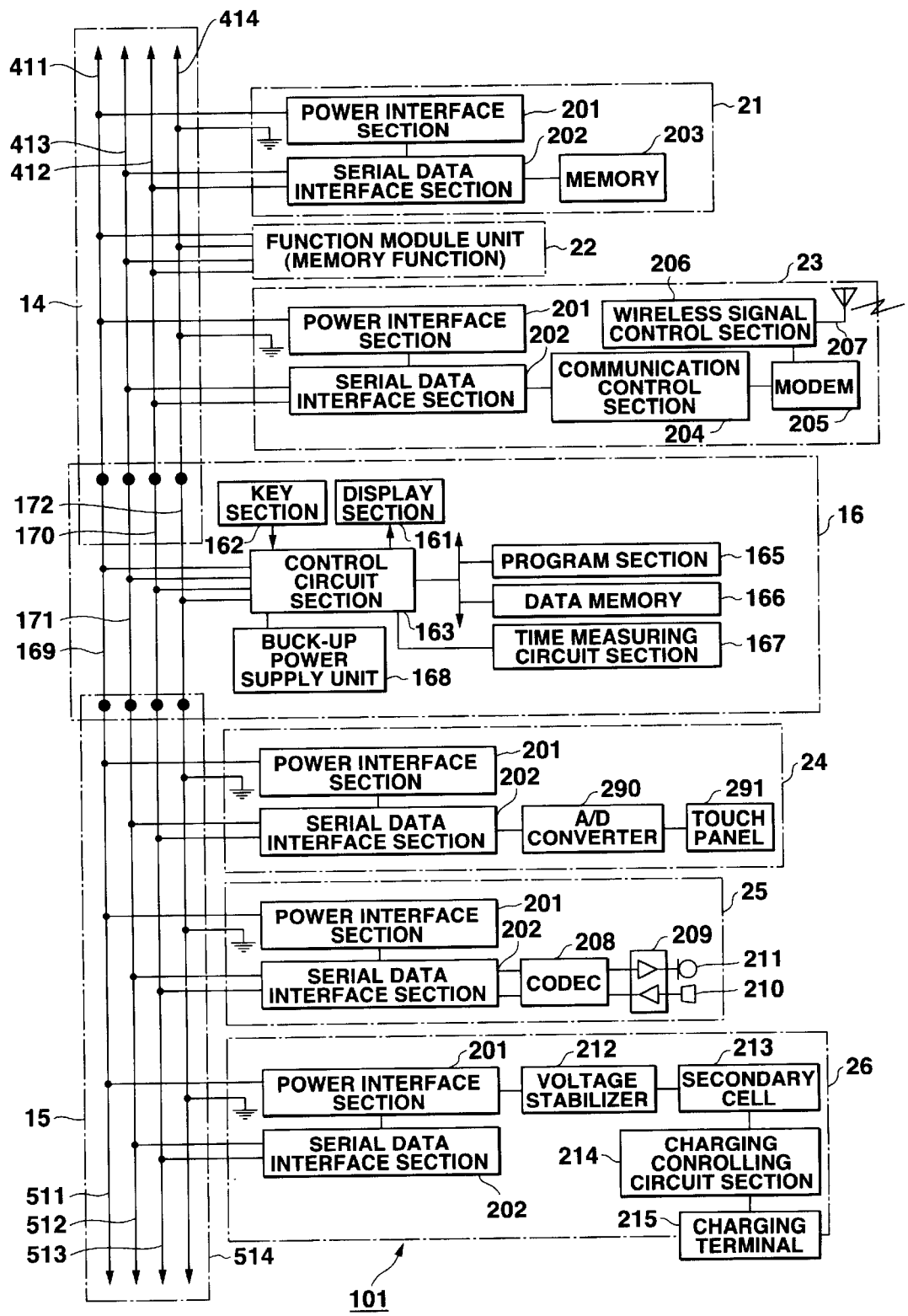
FIG. 19 is a block diagram illustrating the circuit diagram of a wristwatch according to the second embodiment.

As illustrated in FIG. 19, the body case 16 contains a control circuit section 163; a program memory 165 for storing control programs; a data memory 166 for storing arbitrarily generated data; a time measuring circuit section 167 for generating time information; and a back-up power supply unit 168. In addition, the display section 161 and the key sections 162 are arranged along the outer periphery of the body case 16.

The body case 16 is provided with a power supply (Vcc) connector member 169 for connection with the Vcc lines 411, 511; a serial data connector member 170 for connection with the serial data lines 412, 512; a clock data (Clock) connector member 171 for connection with the clock data lines 413, 513; and a ground (GND) connector member 172 for connection with the ground lines 414, 514.

The connector members 169 through 172 are connected to the control circuit section 163.

The function module units 21 and 22 each comprise a power interface section 201, a serial data interface section 202, and a memory 203. The power interface section 201 is connected to the Vcc line 411 and the ground line 414, while the serial data interface section 202 is connected to the serial data line 412 and the clock data line 413.

The function module unit 23 comprises a power interface section 201 and a serial data interface section 202, which are connected in a similar manner, as well as comprises a communication control section 204, a modem 205, a wireless signal control section 206, and an antenna 207.

The function module unit 24 comprises a power interface section 201, a serial data interface section 202, an A/D converter 290, and a touch panel 291. The power interface section 201 is connected to the Vcc liner 511 and the ground line 514, while the serial data interface section 202 is connected to the serial data line 512 and the clock data line 513.

The audio input/output module unit 25 comprises a power interface section 201 and a serial data interface section 202, which are connected in a similar manner as in the function module unit 24, as well as comprises an audio codec (CODEC) 208, an amplifying device 209, a speaker 210, and a microphone 211.

The power supply module unit 26 comprises a power interface section 201 and a serial data interface section 202, which are connected in a similar manner as in the function module unit 24, as well as comprises a voltage stabilizer 212, a secondary cell 213, a charging controlling circuit section 214, and a charging terminal 215.

In this embodiment configured as described above, the wristwatch 101 can display a current time 601 measured by the time measuring circuit section 167, and an image 606 received by the function module unit 23 on a display section 161, as illustrated in FIG. 18B.

The secondary cell 213 can be charged by connecting the charging terminal 215 of the power supply module unit 26 to an external power source.

The power charged in the secondary cell 213 can be supplied to respective circuits in the body case 16 and respective circuits in the function module units by way of the Vcc line 411 (511) and power (Vcc) connector member 169, and the ground line 414 (514) and ground (GND) connector member 172.

On the contrary, when the voltage supplied by the secondary cell 213 becomes lower than a normal operating voltage, the power from the back-up power supply unit 168 can be supplied to the respective circuits in the function module units 21 through 25 by way of the Vcc line 411 (511) and power (Vcc) connector member 169, and the ground line 414 (514) and ground (GND) connector member 172.

A speech recognition function provided in the control circuit section 163 may enable the control circuit section 163 to control the wristwatch body 11, function module units 21 through 24 and power supply module unit 26 based on speech information input through the function module unit 25.

For example, the control circuit section 163 recognizes speech information input through the function module unit 25 to control the function module unit 23, so that the wristwatch 101 may be used as a wireless communication device having the ability of speech recognition.

First Modification of Second Embodiment

Figure 20:
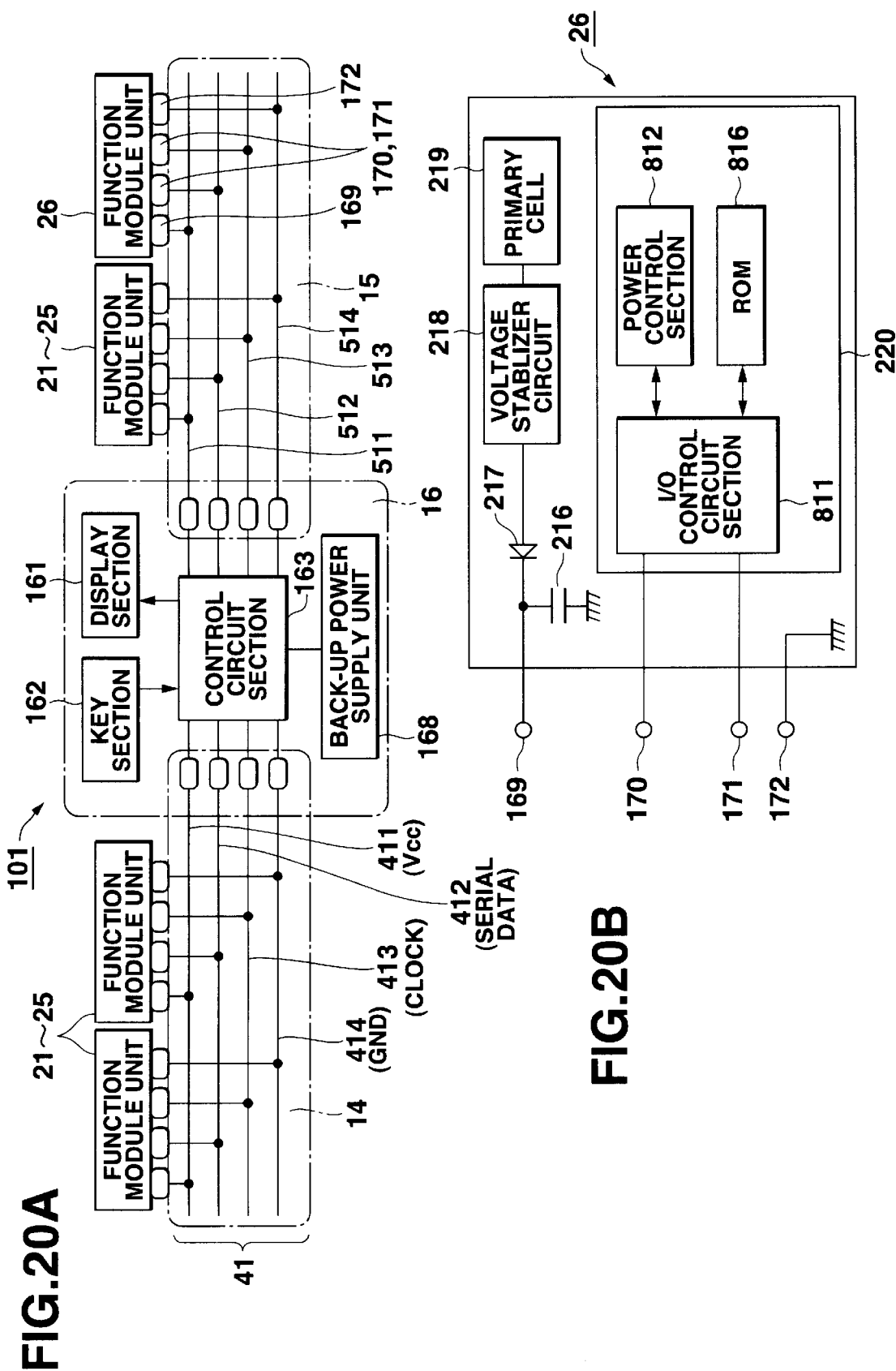
FIG. 20A is a diagram illustrating a connection structure for the circuit configuration in a first modification of the second embodiment.
FIG. 20B is a block diagram illustrating the circuit configuration of a function module unit.

FIGS. 20A and 20B illustrate the first modification of the second embodiment. FIG. 20A illustrates a connection structure, and FIG. 20B illustrates the circuit configuration of a function module unit.

The first modification features the use of an exchangeable primary cell.

The connection structure for connecting the wrist bands 14 and 15 to the body case 16, and the connection structure for connecting the respective function module units 21 through 26 to the body case 16 are similar to those of the second embodiment.

A power supply module unit 26 removably contains an exchangeable primary cell 219 which is connected to a power (Vcc) connector member 169 through a voltage stabilizer 218 and a diode 217. A grounded capacitor 216 is connected between the diode 217 and the power (Vcc) connector member 169.

The power supply module unit 26 further comprises a module controller 220 which is comprised of an I/O control circuit section 811, a power control section 812, and a ROM 816 which stores information unique to the function module unit such as module ID/serial number or the like.

The I/O control circuit section 811 is connected to a serial data connector member 107 and a clock data (Clock) connector member 171.

In the modification as described above, the power supplied from the primary cell 219 can be stored in the back-up power supply unit 168, so that even if the power in the primary cell 219 is exhausted, the operation of the module units 21 through 25 can be compensated for by the power from the back-up power supply unit 168 until the primary cell 219 is exchanged.

Second Modification of Second Embodiment

Figure 21:
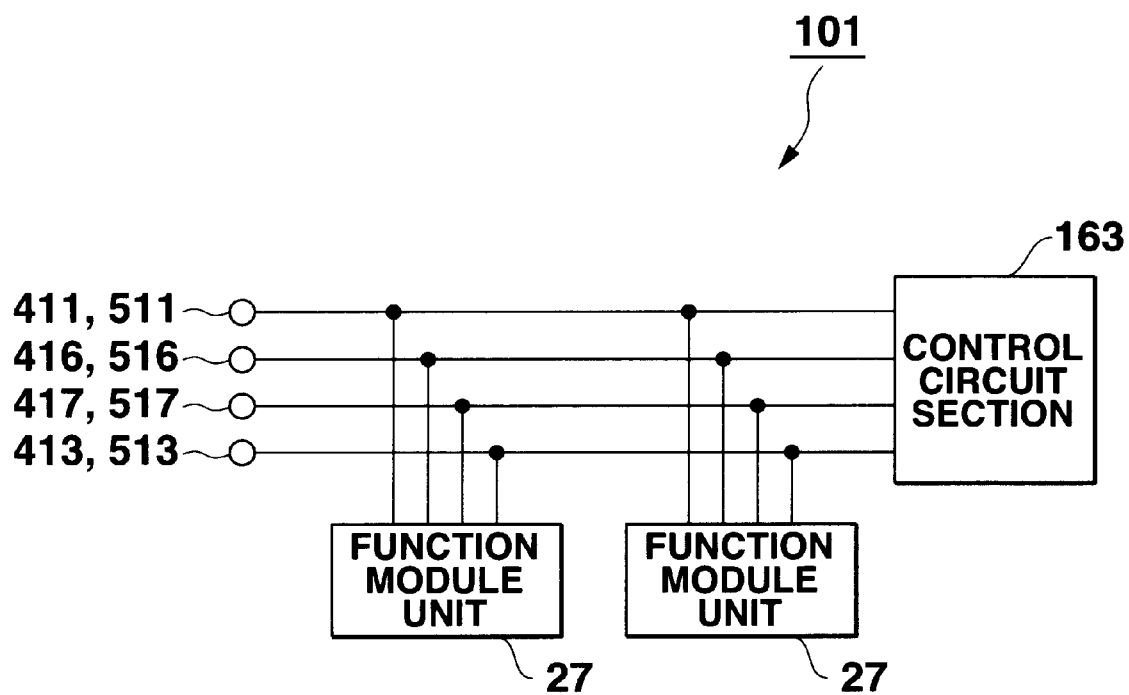
FIG. 21 is a diagram illustrating a connection structure for the circuit configuration in a second modification of the second embodiment.

FIG. 21 illustrates the second modification of the second embodiment, and more specifically, the configuration of a serial bus connection of the control circuit section 163 of the body case 16 with each function module unit 27 when a balance (differential) data transmission system is implemented by a two-wire serial bus, instead of the aforementioned asynchronous transmission system.

The balance differential data transmission system implemented by a two-wire serial bus divides data signal lines into two, instead of using the clock data lines 413 and 513, and communicates data with the control circuit section 163 through transmission (Tx) lines 416 and 516 and reception (Rx) lines 417 and 517.

This permits faster communication of data than the aforementioned asynchronous system.

Though not shown, the control circuit section 163 and the function module unit 27 are previously provided with a circuit configuration associated with the transmission (Tx) lines 416 and 516 and the reception (Rx) lines 417 and 517.

Third Modification of Second Embodiment

Figure 22A:
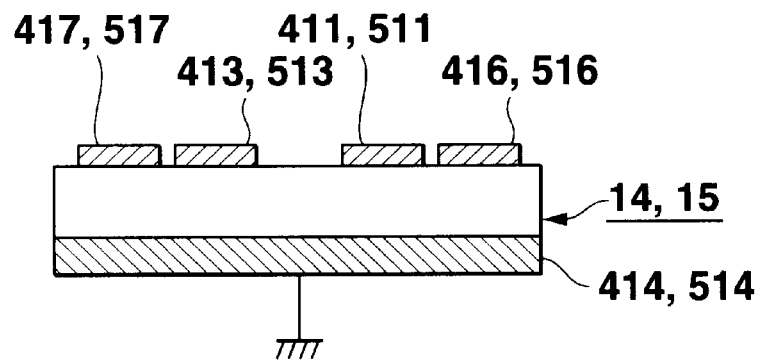
FIG. 22A is a cross-sectional view of a wrist band in a third modification of the second embodiment.
Figure 22B:
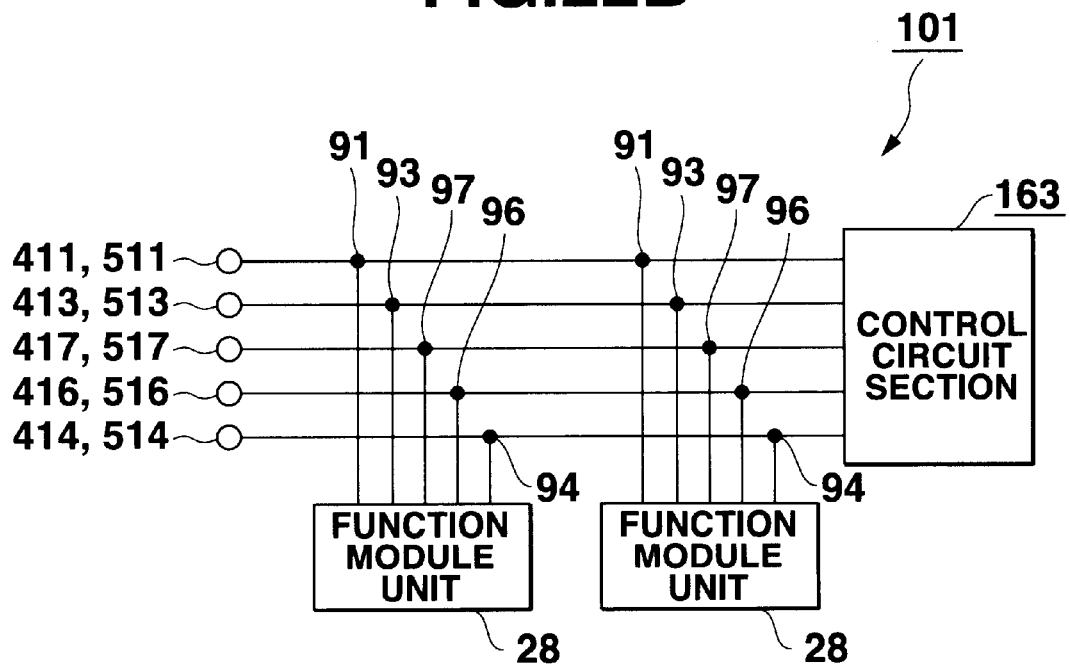
FIG. 22B is a diagram illustrating a connection structure for a serial bus connection of a control circuit section of a body case with respective function module units.

FIGS. 22A and 22B illustrate a third modification of the second embodiment. FIG. 22A is a cross-sectional view of the wrist bands 14 and 15, and FIG. 22B illustrates a connection structure for a serial connection of the control circuit section 163 of the body case 16 with each function module unit 28.

In FIG. 22A, the wrist bands 14 and 15 comprise, on their front sides, Vcc lines 411 and 511, clock data lines 413 and 513, and transmission (Tx) lines 416 and 516 and reception (Rx) lines 417 and 517 from the control circuit section 163, and comprises ground lines 414 and 514 on their entire back sides.

This causes the ground lines 414 and 514 to come into contact with a human body (wrist) for grounding. The function module section 28 in turn comprises a connector member (for the Vcc line) 91; a connector member (for the clock data line) 93; a connector member (for the ground line) 94; a connector member (for the transmission (Tx) line) 96; and a connection member (for the reception (Rx) line) 97.

Therefore, in addition to the advantage of the second modification of the second embodiment, since the clock signal can also be transmitted to the function module units, not only data can be more smoothly transmitted and received, but also a good solution is provided for possible problems related to the grounding.

Though not shown, the control circuit section 163 and the function module unit 28 are previously provided with a circuit configuration associated with the transmission (Tx) lines 416 and 516 and the reception (Rx) lines 417 and 517.

Fourth Modification of Second Embodiment

Figure 23:
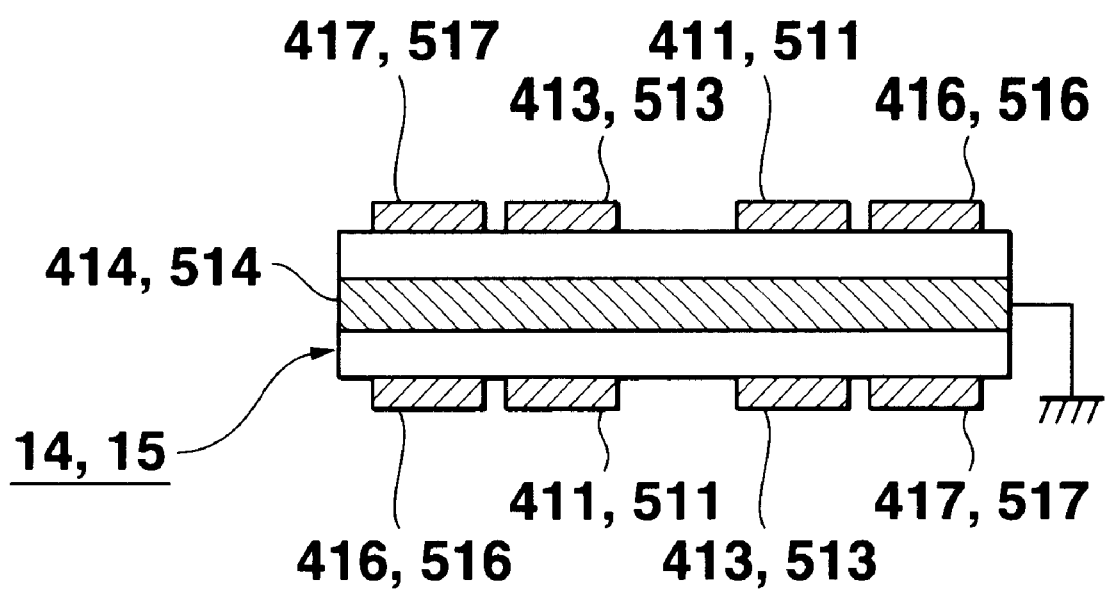
FIG. 23 is a cross-sectional view of a wrist band in a fourth modification of the second embodiment.

FIG. 23 illustrates the fourth modification of the second embodiment, and specifically is a cross-sectional view of the wrist bands 14 and 15.

The wrist bands 14 and 15 additionally comprise clock data lines 413 and 513, respectively, in the aforementioned balance differential data transmission system.

The wrist bands 14 and 15 comprise, on both sides thereof, Vcc lines 411 and 511; clock data lines 413, 513; transmission (Tx) lines 416 and 516 and reception (Rx) lines 417 and 517 from the control circuit section 163; and ground lines 414 and 514, respectively. These lines are made of an electrically conductive material having elasticity. The ground lines 414 and 514 are sandwiched by members which form parts of the wrist bands.

According to the configuration as described, in addition to the advantages provided by the second modification of the second embodiment, function module units 28 can be connected on both front and back sides of the wrist bands 14 and 15, and the wrist bands become more robust because the ground lines 414 and 514 are sandwiched by the elastic electrically conductive members in portions which are cores of the wrist bands.

Figure 24:
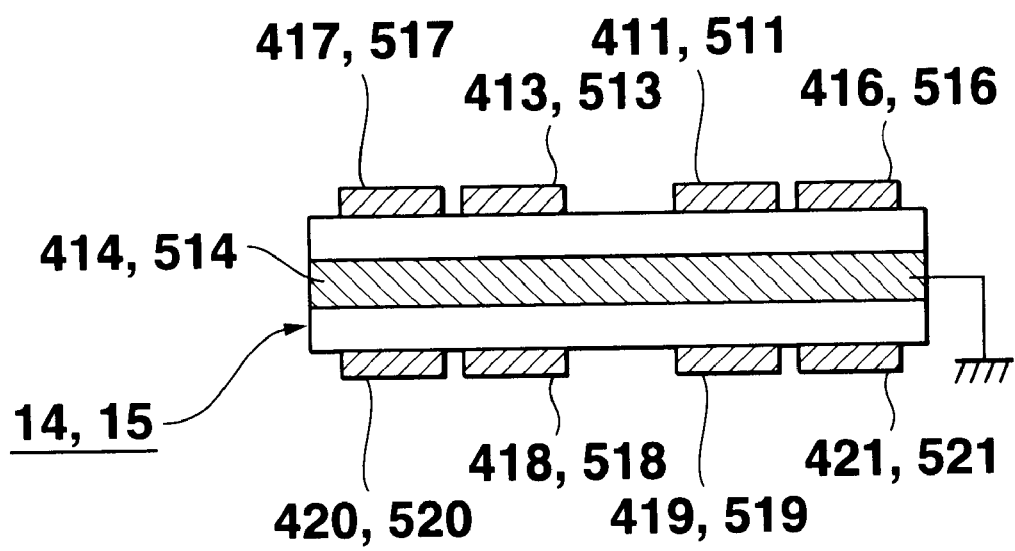
FIG. 24 is a cross-sectional view of a wrist band in another modification of the second embodiment.

In FIG. 23, the function module units 28 are connected on both front and back sides of the wrist bands 14 and 15. Additionally, as illustrated in FIG. 24, the wrist bands 14 and 15 may be further provided, on both front and back sides thereof, with transmission strobe (Txs) lines 418 and 518; reception strobe (Rxs) lines 419 and 519; and reserve data (Rsv) lines 420, 421, 520, and 521, in addition to the Vcc lines 411 and 511; clock data lines 413 and 513; transmission (Tx) lines 416 and 516 and reception (Rx) lines 419 and 519, and the ground lines 414 and 514 may be made of an electrically conductive material having elasticity.

With the configuration as described, a large amount of information can be smoothly transmitted between the control circuit section 163 and the function module units 28.

In terms of the transmission system, data transmission can be performed in accordance with half duplex transmission or full duplex transmission.

It should be understood that the routing of the respective signal lines on the wrist bands is not limited to the foregoing embodiments or modifications, but may be arbitrarily modified in accordance with members which form parts of the wrist bands, and the usability of particular users.

Third Embodiment

FIGS. 25A and 25B illustrate external appearances of a wristwatch 31 according to the third embodiment of the present invention. FIG. 25A generally illustrates the wristwatch 31, and FIG. 25B is an enlarged view of a display section 37.

As illustrated in FIG. 25A, the wristwatch 31 employs a common line for a serial data line and a Vcc line routed to wrist bands 34 and 35, so that the wristwatch 31 only incorporates this line and a ground line.

The wristwatch 31 according to this embodiment comprises a body case 36, and a pair of wrist bands 34 and 35 attached to opposing ends of the body case 36.

Function module units 300 and 301 having a memory function, and a function module unit 302 having an emergency alarm wireless transmission function are removably attached to one wrist band 34, while a function module unit 303 having a heart rate sensing function, a function module unit 304 having an electrocardiograph sensing function, and a function module unit 305 having a glucose sensing function are removably attached to the other wrist band 35.

A display section 37 comprised of LCD is arranged on the top surface of the body case 36, and a plurality of key sections 38 are arranged on side surfaces of the same.

Each of bus line wires 32 and 33 is comprised of a serial data line 321, 331 and a ground (GND) line 322, 332. In this embodiment, the serial data lines 321 and 331 also serve as Vcc lines in addition to as input/output lines for such data as serial data, address data and command data.

Figure 26:
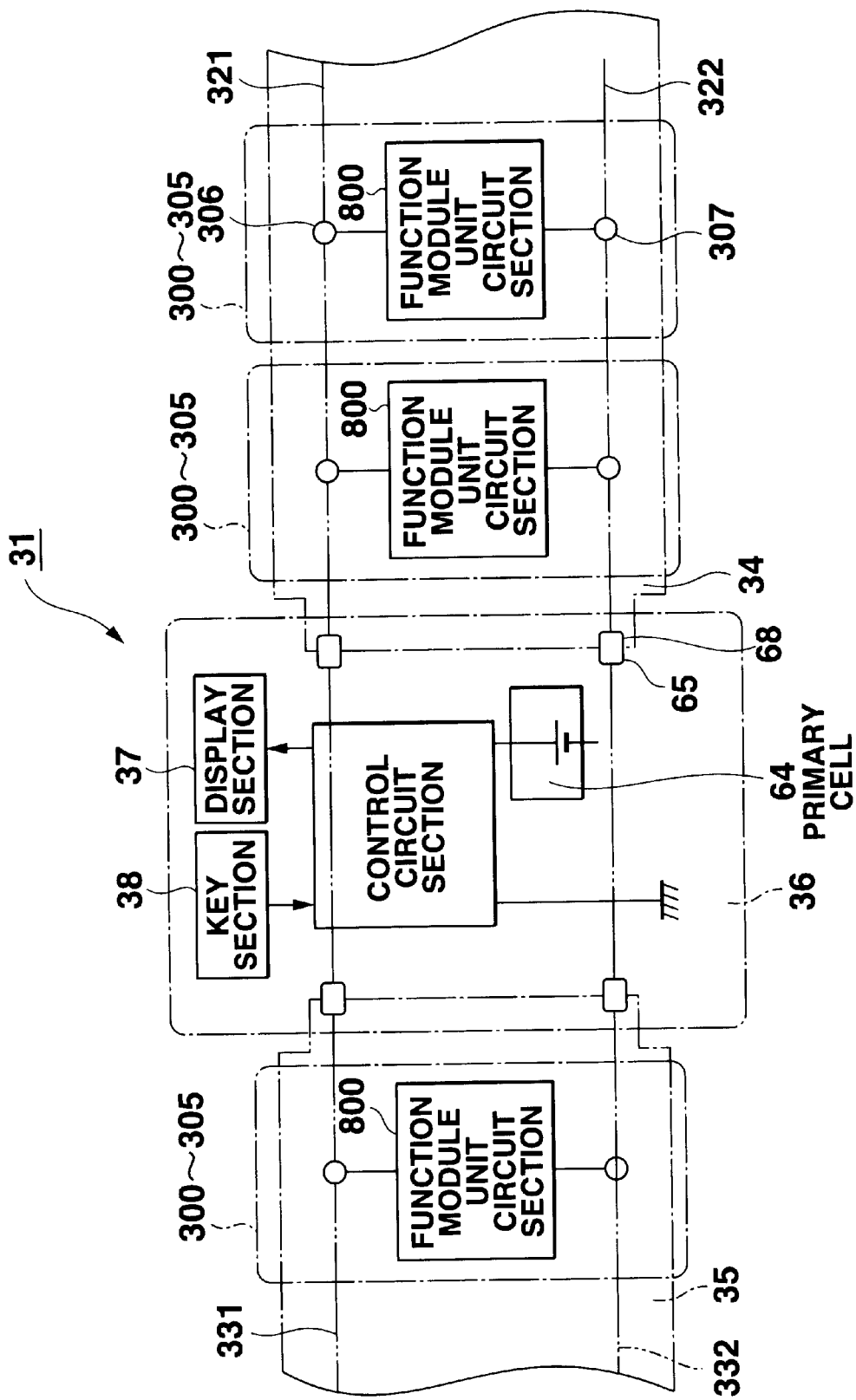
FIG. 26 is a block diagram illustrating the circuit configuration of a wristwatch according to the third embodiment.

As illustrated in FIG. 26, a function module unit circuit section 800 contained in each of the function module units 300 through 305 is connected to the serial data lines 321 and 331 through a data connector member 306, and also connected to the ground lines 322 and 332 through a ground connector member 307.

The body case 36 is provided therein with a control circuit section 63, and a primary cell 64 for supplying power to the control circuit section 63. The display section 37 and the key sections 38 are arranged along the outer periphery of the body case 36.

Figure 27A:
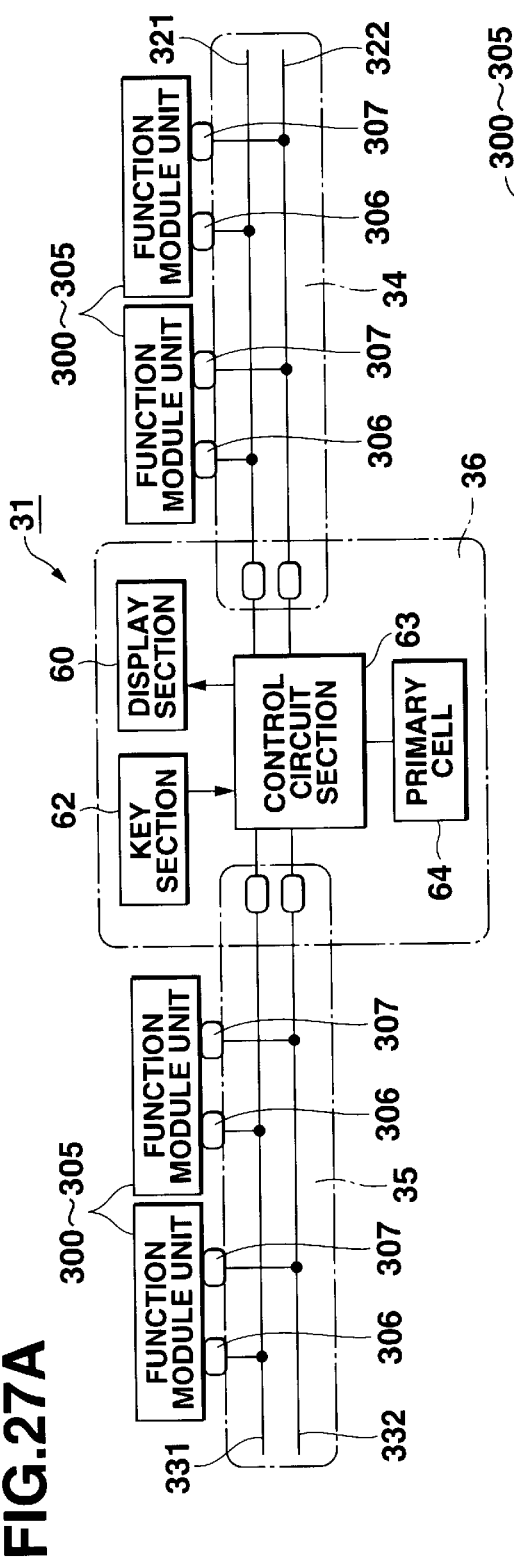
FIG. 27A is a diagram illustrating a connection structure for the circuit configuration in the third embodiment.
Figure 27B:
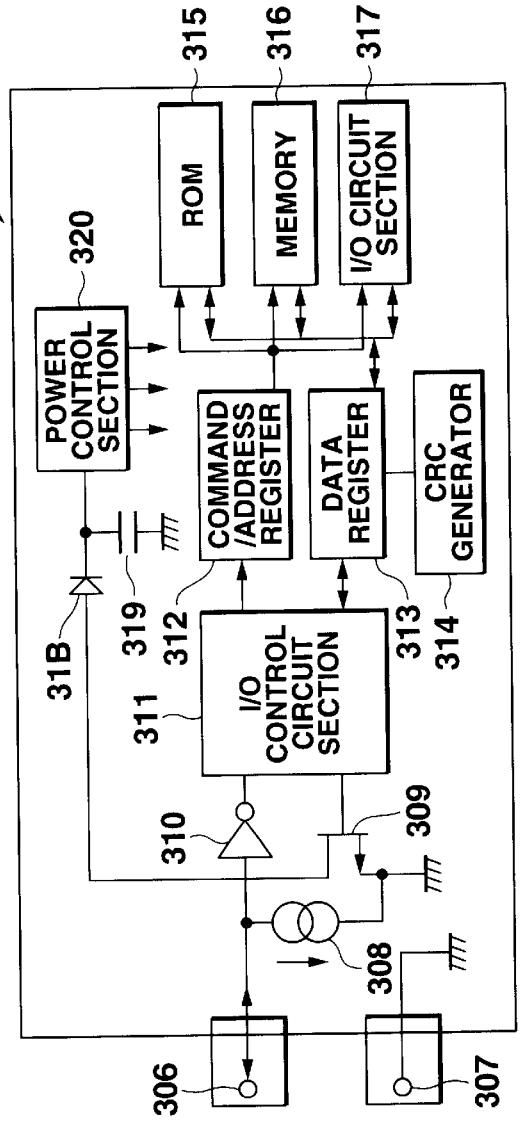
FIG. 27B is a block diagram illustrating the circuit configuration of a function module unit.

Each of the function module units 300 through 305 has a data connector member 306 connected to an I/O control circuit section 311 by way of a current source 308, an FET (Field-Effect Transistor) 309, and an inverter 310, and also connected to a power control section 320 through a diode 318, as shown in FIGS. 27A and 27B. A grounded capacitor 319 is arranged between the diode 318 and the power control section 320.

The I/O control circuit section 311 is connected to a command/address register 312 and a data register 313, and the data register 313 is connected to a CRC generator 314.

The command/address register 312 and the data register 313 are connected to a ROM 315 which stores information unique to an associated function module section such as module ID/serial number or the like, a memory 316, and an I/O circuit section 317.

In this embodiment configured as described above, the serial data lines 321 and 331 supply the power in a manner similar to the Vcc lines 411 and 511 in the first embodiment.

Therefore, the function module units 300 through 305 enter a charging state when they do not communicate data with the control circuit section 63. Data, when communicated between any of the function module units 300 through 305 and the control circuit section 63, is communicated in the form of a signal such as Morse codes which are a combination of time intervals of negative pulses.

More specifically, a reset pulse of a fixed duration is transmitted from the control circuit section 63 of the body case 36 to the function module units 300 through 305 to notify them of the start of data communication, and the function module units 300 through 305, upon receipt of the reset pulse, transmit an acknowledgement signal (ACK) back to the control circuit section 63.

Upon receipt of the acknowledge signal (ACK), the control circuit section 63 transmits a command, a module ID and an address signal, when data is transmitted, in sequence, and then transmits again the reset signal as a communication end code.

Thus, the function module units 300 through 305 can be controlled only by routing two bus line wires comprised of the serial data line 321, 311 and the ground (GND) line 322, 332. As a result, the wristwatch 31 can display information generated based on a variety of vital information data detected from the user by the function module units 303 through 305, as illustrated in FIG. 25B.

In FIG. 25B, the display section 37 displays a current time 601 measured by the control circuit section 63; heart rate 608; maximum/minimum blood pressures 608; and pulsation trend 609. These measurement results may be stored in the function module units 300 and 301 that have a memory function.

If an abnormal value is detected in any of a variety of vital information data, or if a certain data exceeds a predetermined fixed value, the function module unit 302 that has the emergency alarm wireless communication function can automatically send an urgent alarm to a destination or an emergency center which may be previously stored in the memory.

Accordingly, the wristwatch 31 can be utilized as a measuring monitor for a variety of vital information data in applications such as medical health management, in-house nursing care, security and so on.

First Modification of Third Embodiment

Figure 28:
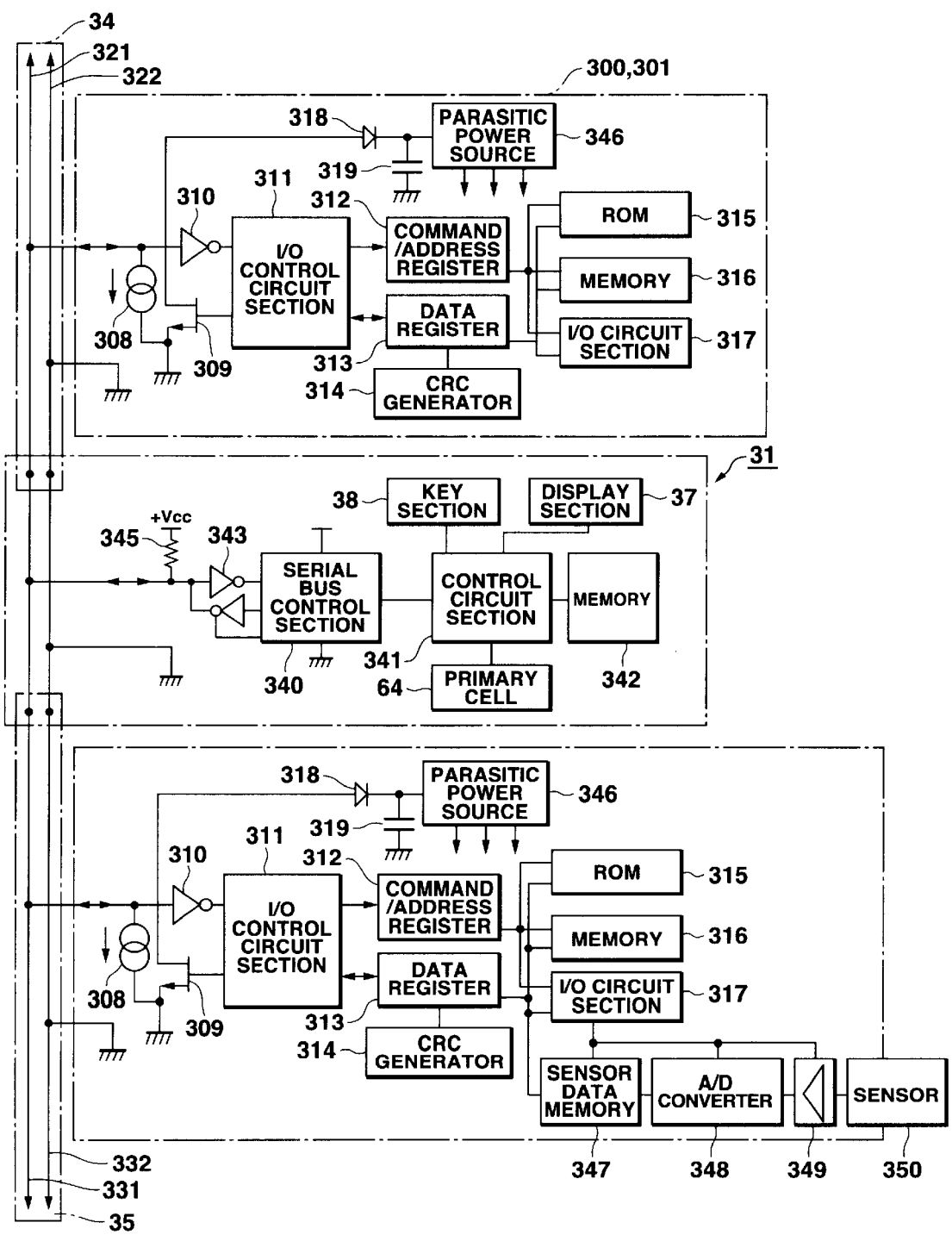
FIG. 28 is a block diagram illustrating the circuit configuration of a wristwatch according to a first modification of the third embodiment.

FIG. 28 illustrates the first modification of the third embodiment of the present invention, in which the function module units 300 through 305 each comprise a parasitic power source circuit section comprised of a capacitor.

A body case 36 contains a serial bus control section 340, a control circuit section 341, and a memory 342, as well as a display section 37, key sections 38, and a primary cell 64, similar to the foregoing embodiment.

The serial bus control section 340 is connected to serial data lines 321 and 331 through inverters 343 and 344, respectively. A resistor 345 having one end connected to a power supply (+Vcc) has the other end connected between the serial data line 321 and the inverter 343.

Function module units 300 and 301, which have a memory function, each comprise a parasitic power source 346 comprised of a capacitor, in place of the power control section 320, as well as comprises the respective sections from the source of current 308 to the I/O circuit 317, similarly to the function module units illustrated in FIGS. 27A and 27B.

The function module units 303 through 305, which have a sensor function, each comprise a sensor data memory 347, an A/D converter 348, an amplifying device 349, and a sensor 350, as well as the respective sections from the source of current 308 to the I/O circuit 317 and the parasitic power source 346 in a similar manner as in FIGS. 27A and 27B.

In this modification, the power from the primary cell 64 in the body case 36 is supplied to the respective function module units 300, 301, 303 through 305 through the Vcc line 411, and charged in the parasitic power source 346.

Thus, the respective function module units 300, 301, 303 through 305 can operate with the power from the parasitic power source 346, and similarly to the foregoing, can also communicate data with the body case 36 through a signal comprised of a combination of time intervals of negative direction pulses.

Second Modification of Third Embodiment

Figure 29A:
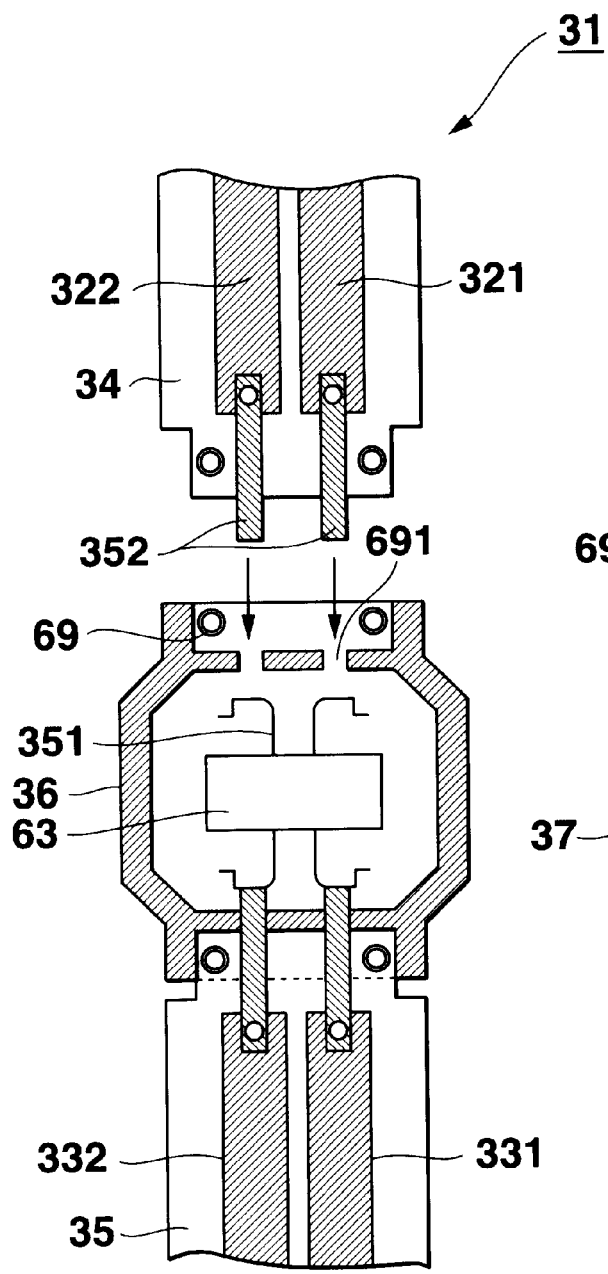
FIG. 29A is a sectional plan view of a wristwatch according to a second modification of the third embodiment.
Figure 29B:
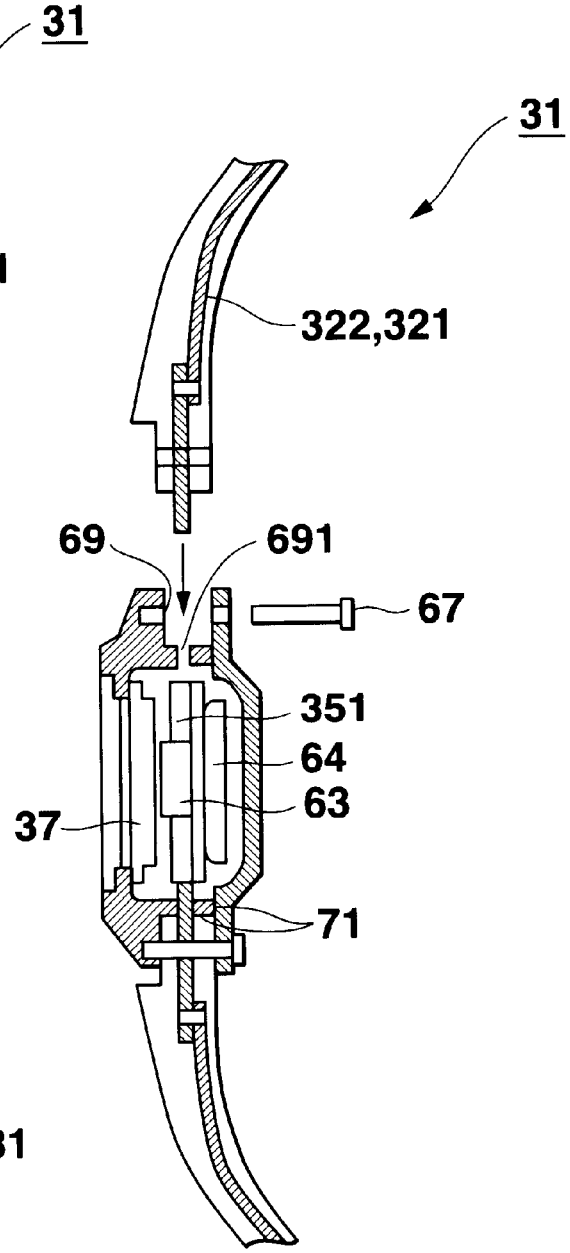
FIG. 29B is a sectional side view of the wristwatch illustrated in FIG. 29A.

FIGS. 29A and 29B illustrate the second modification of the third embodiment. FIG. 29A is a sectional plan view, and FIG. 29B is a sectional side view.

A body case 36 is provided with receptacle members 69 each having a pair of through holes 691.

A control circuit section 63 arranged in the body case 36 is provided with body connector members 351, each comprised of a pair of plate springs, at opposing ends of the control circuit section 63.

On the other hand, both wrist bands 34 and 35 are provided with connector plugs 352 at their respective ends for connection with serial data lines 321 and 331 and ground lines 322 and 332, respectively.

Water-proof packing 71 is interposed over the inner peripheral surfaces of the through holes 691, body case 36 and watch back case 66.

With the connector plugs 352 inserted in the through holes 691 of the receptacle members 69, the ends of both wrist bands 34 and 35 are fixed to bus connecting receptacle members 69 with fixing screws 67.

This causes the connector plugs 352 to elastically come into contact with the body connector members 351, so that the serial data lines 321 and 331 and the ground lines 322 and 332 are connected to the control circuit section 63 through the connector plugs 352 and the body connector members 351.

According to this modification, the water-proof packing 71 can prevent a contact failure and so on due to immersion.

Third Modification of Third Embodiment

FIGS. 30A and 30B illustrate the third modification of the third embodiment. FIG. 30A is a sectional plan view, and FIG. 30B is a sectional side view.

In each of the through holes 691 formed through receptacle members 69, a coil spring 692 is fitted. Also, a push button type terminal 693 of substantially T-shape in cross-section is fitted in the coil spring 692.

Both wrist bands 34 and 35 are fixed to the receptacle members 69 with fixing screws 67 with connection plugs pressed onto the heads of the push button type terminals 693.

This causes the coil springs 692 to contract, and also causes the push button type terminals 693 to elastically come into contact with the body connector members 351 to make connection of serial data lines 321 and 331 and ground lines 322 and 332 to the control circuit section 63 through the push button type terminals 693 and the body connector members 351.

According to this modification, since the contact state is maintained with spring forces of the body connector members 351 and spring forces of the coil springs 692, the wristwatch 31 is resistant to a shock, and can properly maintain the contact state.

Fourth Modification of Third Embodiment

Figure 31A:
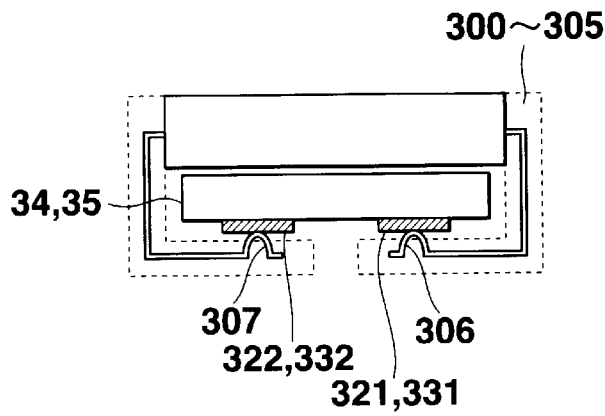
FIGS. 31A, 31B, 31C, 31D, and 31E are cross-sectional views of wrist bands according to a fourth modification of the third embodiment.

FIGS. 31A through 31E illustrate the fourth modification of the third embodiment. In FIG. 31A, serial data lines 321 and 331 and ground lines 322 and 332 are routed on the back side of wrist bands 34 and 35, and function module units 300 through 305, which have a substantially inverted C-shape in cross section, wrap the wrist bands 34 and 35, respectively.

Connector members 306 and 307 are arranged at locations at which the function module unit gets in contact with the serial data lines 321 and 331 and the ground lines 322 and 332.

Therefore, with the employment of the connection structure as described above, the function module units 300 through 305 are held on the wrist bands 34 and 35 without fail, and a secure conduction can be provided through contacts of the serial data lines 321 and 331 and the ground lines 322 and 332 with the connector members 306 and 307.

Figure 31B:
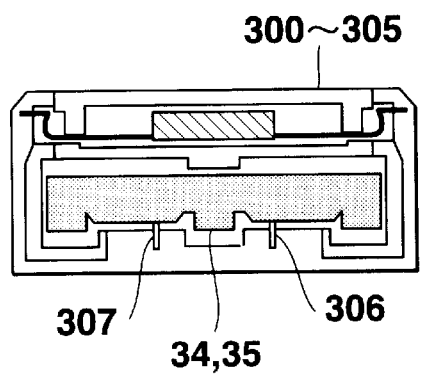
Figure 31C:
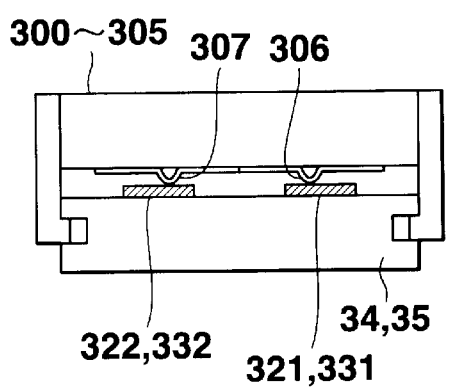
Figure 31D:
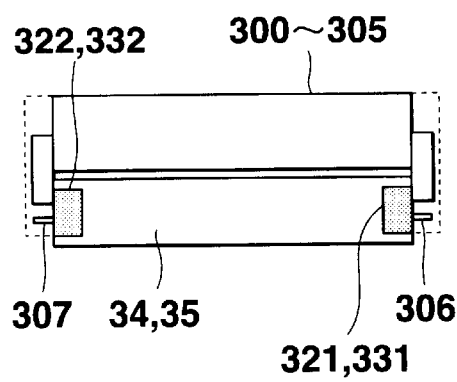

In FIG. 31B, function module units 300 through 305 are each constructed to surround the periphery of wrist bands 34 and 35. In addition, portions of the connector members 306 and 307, which come in contact with the serial data lines 321 and 331 and the ground lines 322 and 332, have spring forces.

Thus, as compared with the structure illustrated in FIG. 31A, more secure holding and conduction can be provided.

Figure 31E:
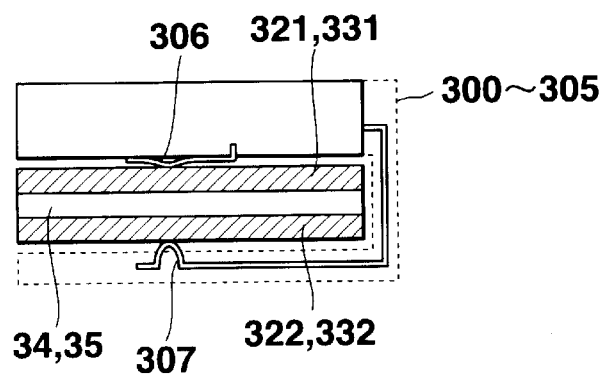

In addition, it is contemplated that the serial data lines 321 and 331 and the ground lines 322 and 332 are routed on the front side of the wrist bands 34 and 35, and the function module units 300 through 305 are held on side surfaces of the wrist bands 34 and 35 (FIG. 31C); the data lines 321 and 331 and the ground lines 322 and 332 are routed on side surfaces of the wrist bands 34 and 35, and the function module units 300 through 305 are held by the side surfaces as well (FIG. 31D); and the data lines 321 and 331 are routed on the entire front side of the wrist bands 34 and 35, while the ground lines 322 and 332 are routed on the entire back side of the wrist bands 34 and 35, and the function module units 300 through 305, formed in an inverted C-shape, are fitted thereon (FIG. 31E).

Therefore, with the employment of the connection structure as described above, the function module units 300 through 305 can be held on the wrist bands 34 and 35 without fail, and a secure conduction can be provided through contacts of the serial data lines 321 and 331 and the ground lines 322 and 332 with the connector members 306 and 307 of the function module units 300 through 305.

Fifth Modification of Third Embodiment

FIG. 32 illustrates the fifth modification of the third embodiment of the present invention, wherein a function module unit is built in a block which forms part of a wrist band.

A body case 36 is similar in circuit configuration to that illustrated in FIG. 26, and comprises a display section 37, key sections 62, a control circuit section 63, and a primary cell 64.

The body case 36 is provided at both ends with a serial data terminal 631 connected to the control circuit section 63, and a ground terminal 632 connected to the control circuit section 63 and the primary cell 64 as well as to the ground.

Wrist bands 44 and 45, connected to both ends of the body case 36, are each comprised of a plurality of blocks which are removably joined in sequence by spring rods 402. A function module unit 403 is comprised of the block 401 and a function module unit circuit section 800 arranged in the block 401.

Figure 33:
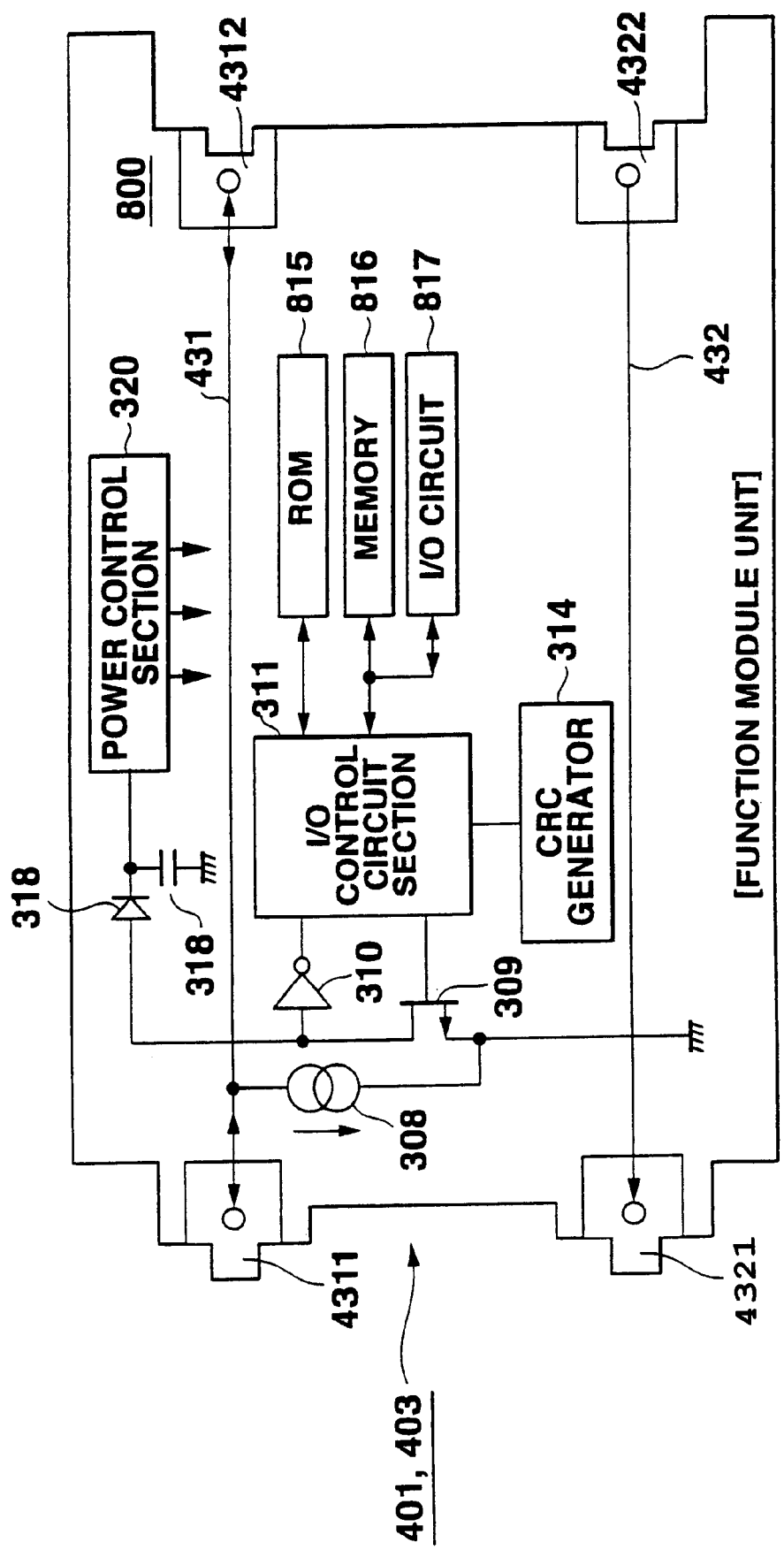
FIG. 33 is a block diagram illustrating the circuit configuration of a function module unit according to a fifth modification of the third embodiment.

The function module unit 403 integrally formed with the block 401 is provided with a serial data line (Serial Data) 431 and a ground line 432, as illustrated in FIG. 33.

The serial data line (Serial Data) 431 is connected at two ends to a serial data male terminal 4311 and a serial data female terminal 4312, arranged at both ends of the block 401, respectively. The ground line 432 is connected at two ends to a ground male terminal 4321 and a ground female terminal 4322, respectively.

The serial data line 431 is connected to an I/O control circuit section 311 through a current source 308, an FET 309 and an inverter 310, and also connected to a power control section 320 through a diode 318. A grounded capacitor 319 is arranged between the diode 318 and the power control section 320.

The I/O control circuit section 311 is connected to a CRC generator 314, a ROM 315 which stores information unique to the associated function module unit such as module ID/serial number or the like, a memory 316, and an I/O circuit 317.

The ground line 432 is connected to the current source 308 and the FET 309 as well as to the ground.

A block 401 which is not provided with the function module unit circuit section 800, i.e., a block 401 which does not serve as the function module unit 403 is provided only with a serial data line 431 and a ground line 432; a serial data male terminal 4311 and a serial data female terminal 4312; and a ground male terminal 4321 and a ground female terminal 4322.

As the block 401 at one end is connected to the body case 36 by a spring rod 402, the serial data male terminal 4311 and the ground male terminal 4321 of the block 401 are brought into contact with the serial data terminal 631 and the ground terminal 632 of the body case 36.

Then, as blocks 401 are sequentially connected by spring rods 402, the serial data male terminal 4311 and the ground male terminal 4321 of the subsequent block 401 are brought into contact with the serial data female terminal 4312 and the ground female terminal 4322 of the preceding block 401.

This results in the formation of connection between the serial data lines 431 and the ground lines 431 routed on the respective blocks 401 as well as the formation of connection with the body case 36.

Thus, in this modification, the function module units 403 can be controlled only by routing two bus line wires, i.e., the serial data line 431 and the ground line 432, on the wrist bands 44 and 45, as is the case with the third embodiment.

In addition, in this modification, since the blocks 401 themselves, which make up the wrist bands 44 and 45, serve as function module units 403, the function module units themselves do not protrude from the wrist bands 44 and 45, so that the user can carry the wristwatch 31 as if the user carries an ordinary watch.

Fourth Embodiment

In the first through third embodiments, the bus line wires are routed on the list bands, such that the wristwatch body is electrically connected directly to respective function modules through the bus line wires. Alternatively, data may be communicated between the watch body and function module units mounted on the wrist bands through a proximate wireless communication scheme such as Bluetooth.

Figure 34A:
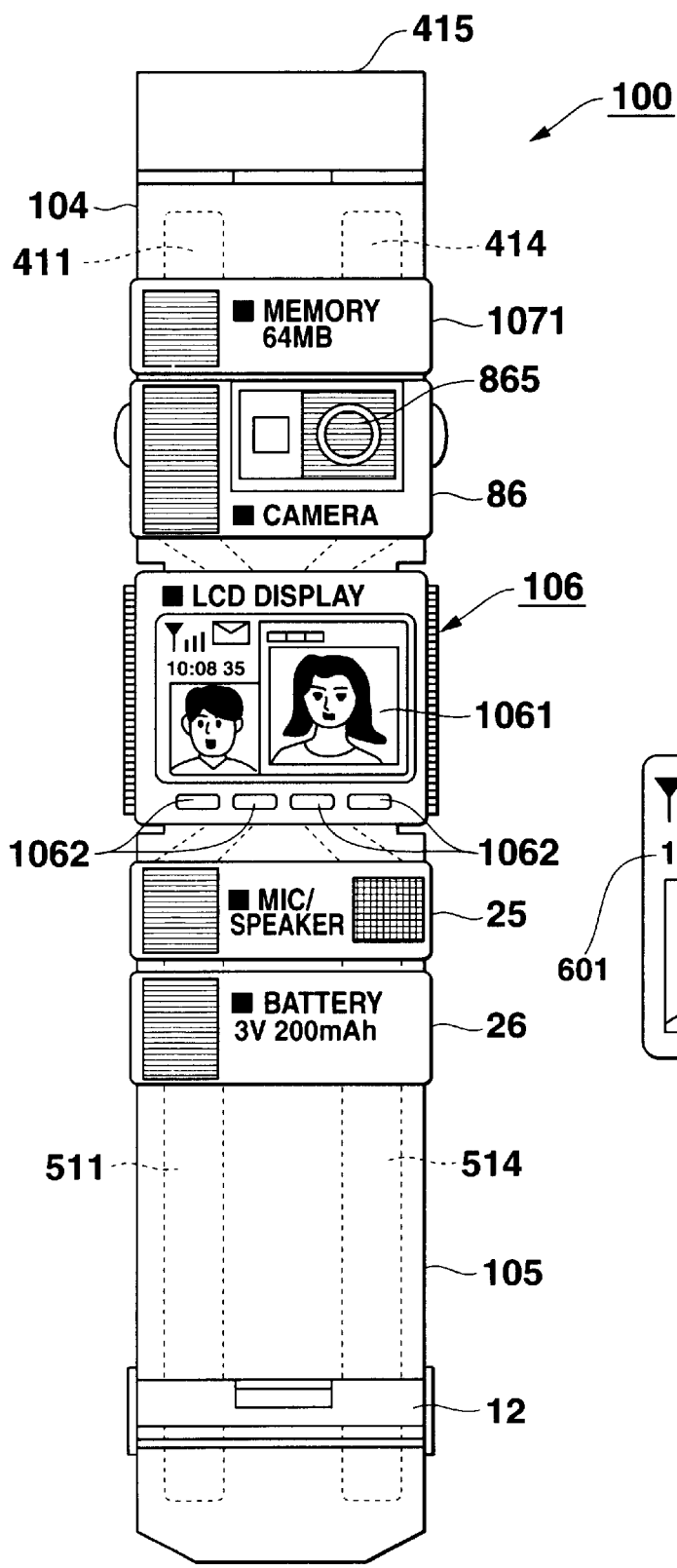
FIG. 34A is a diagram illustrating an external appearance of a wristwatch according to a fourth embodiment of the present invention.
Figure 34B:
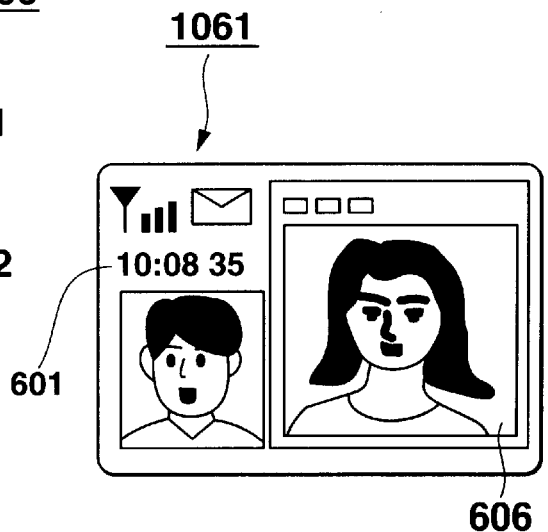
FIG. 34B is an enlarged view of a display section of the wristwatch illustrated in FIG. 34A.

In the following, a fourth embodiment of the present invention in which the foregoing scheme is applied will be described in detail with reference to the drawings. FIGS. 34A and 34B illustrate external appearances of a wristwatch 100 according to the fourth embodiment of the present invention. FIG. 34A generally illustrates the wristwatch 100, and FIG. 34B is an enlarged view of a display section 1061.

In describing the figures, the configuration previously described in the first through third embodiments is basically identical in the fourth embodiment as well, so that description thereon is omitted.

As illustrated in FIG. 34A, the wristwatch 100 according to the fourth embodiment of the present invention comprises a body case 106, and a pair of resin-made wrist bands 104 and 105 attached to opposing ends of the body case 106.

A function module unit 1071 having a memory function and a function module unit 86 having an image capturing function are removably attached to one wrist band 104, while a function module unit 25 having an audio input/output function and a power supply module unit 26 are removably attached to the other wrist band 105.

The display section 1061 comprised of LCD and a plurality of key sections 1062 are arranged on the top surface of the body case 106.

On both wrist bands 104 and 105, Vcc lines 411 and 511 and ground lines 414 and 514 are routed in the longitudinal direction as bus line wires, respectively. The structure for connecting the wrist bands 104 and 105 to the body case 16 is similar to that of the third embodiment illustrated in FIGS. 29A, 29B, 30A and 30B.

Figure 35:
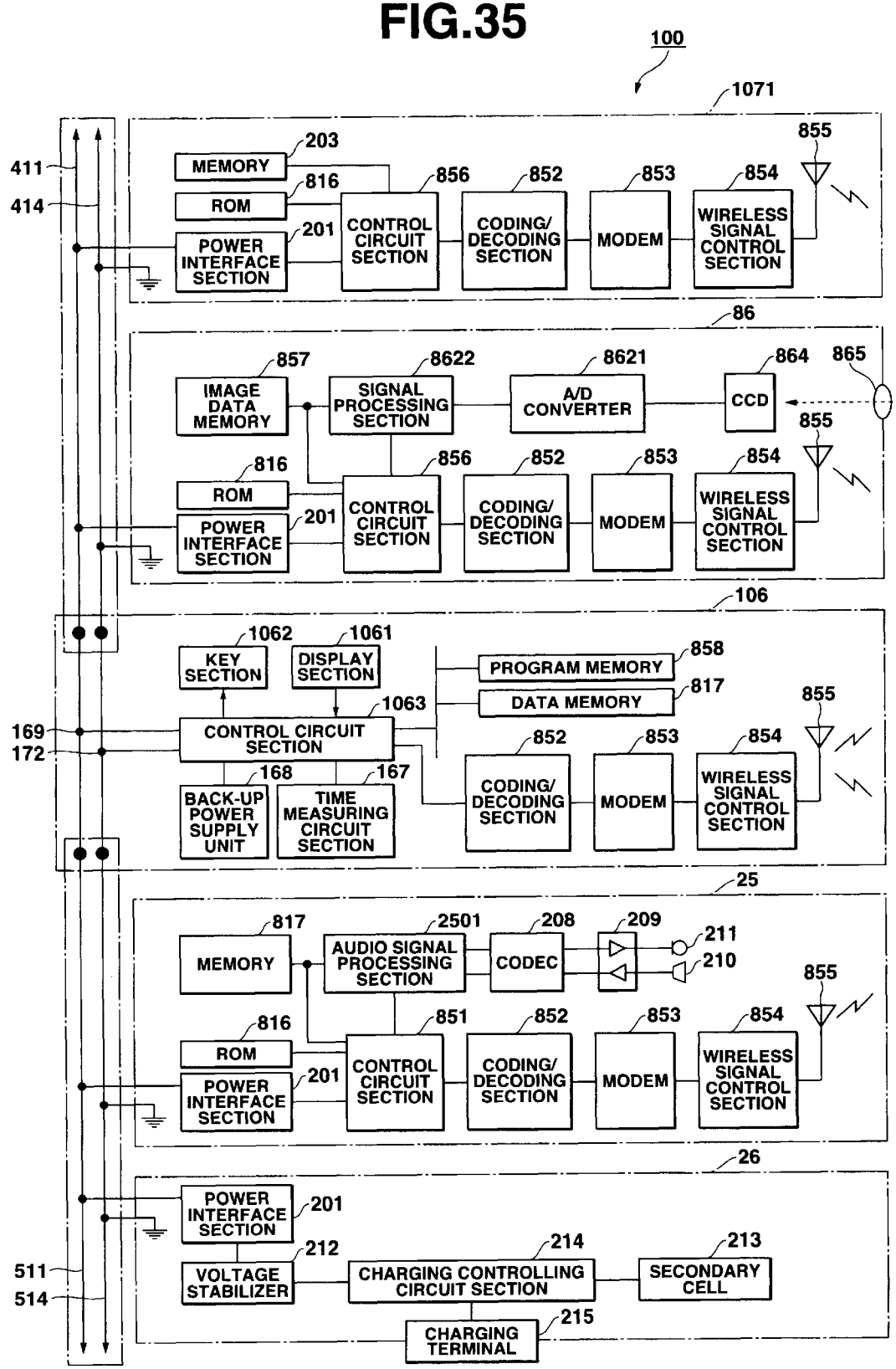
FIG. 35 is a block diagram illustrating the circuit configuration of a wristwatch according to a fourth embodiment.

As illustrated in FIG. 35, the body case 106 contains a control circuit section 1063; a program memory 858 for storing control programs; a data memory 817 for storing data; a time measuring circuit section 167 for generating time information; and a back-up power supply unit 168. Also, the display section 1061 and the key sections 1062 are arranged along the outer periphery of the body case 106.

The body case 106 further comprises power (Vcc) connector members 169 for connection with the Vcc lines 411 and 511 of both wrist bands 104 and 105; and ground (GND) connector members 172 for connection with the ground lines 414 and 514 of the wrist bands 104 and 105.

The function module unit 1071 comprises a power interface section 201; a ROM 816 which stores information unique to the associated function module unit such as module ID/serial number or the like; and a memory 203.

The power interface section 201 is connected to the Vcc line 411 and the ground line 414.

These power interface section 201, ROM 816 and memory 203 are sequentially connected to a coding/decoding section 852, a modem 853, a wireless signal control section 854, and an antenna 855.

The function module unit 86 having the image capturing function similarly comprises a power interface section 201 and a ROM 816 which stores information unique to the associated function module unit such as module ID/serial number or the like, as well as an image data memory 857, a control circuit section 856, a coding/decoding section 852, a modem 853, a wireless signal control section 854, and an antenna 855.

The function module unit 86 further comprises a signal processing section 8622, an A/D converter 8621, an input device 864 comprised of CCD, and a lens 865.

The function module unit 25 comprises a power interface section 201 and a ROM 816 which stores information unique to the function module unit 25 such as module ID/serial number or the like, connected in a similar manner, as well as an audio signal processing section 2501, a codec 208, an amplifying device 209, a speaker 210 and a microphone 211. The audio input/output function module unit 25 further comprises a control circuit section 861, a coding/decoding section 852, a modem 853, a wireless signal control section 854, and an antenna 855.

The power supply module unit 26 comprises a power interface section 201 connected in a similar manner, a voltage stabilizer 212, a charging controlling circuit section 214, a charging terminal 215 and a secondary cell 213.

In the fourth embodiment configured as described above, as the charging terminal 215 of the power supply module unit 26 is connected to an external power source, the secondary cell 213 can be charged.

The power charged in the secondary cell 213 can be supplied to the body case 106, function module unit 1071, function module unit 86 having the image capturing function, and function module unit 25 by way of the Vcc lines 411 and 511 and power (Vcc) connector member 169, and the ground lines 414 and 514 and ground (GND) connector member 172.

As illustrated in FIG. 34B, the wristwatch 100 can display a current time 601 measured by the control circuit section 167, and an image 610 input by the function module unit 86 on the display section 1061.

When the voltage supplied by the secondary cell 213 becomes lower than a normal operating voltage, the power from the back-up power supply unit 168 can be supplied to the respective function module units 1071, 86, and 25 by way of the Vcc lines 411 and 511 and power (Vcc) connector member 169, and the ground lines 414 and 514 and ground (GND) connector member 172.

Fifth Embodiment

In the first through third embodiments, the bus line wires are routed on the list bands, such that the wristwatch body is electrically connected to respective function module units through the bus line wires. Alternatively, the connection between the watch body and function module units mounted on the wrist bands may be made through infrared communications.

In the following, a fifth embodiment of the present invention in which the infrared communication as mentioned is applied will be described in detail with reference to the drawings. In describing the figures, the configuration previously described in the first through third embodiments is basically identical in the fifth embodiment as well, so that description thereon is omitted.

Figure 36A:
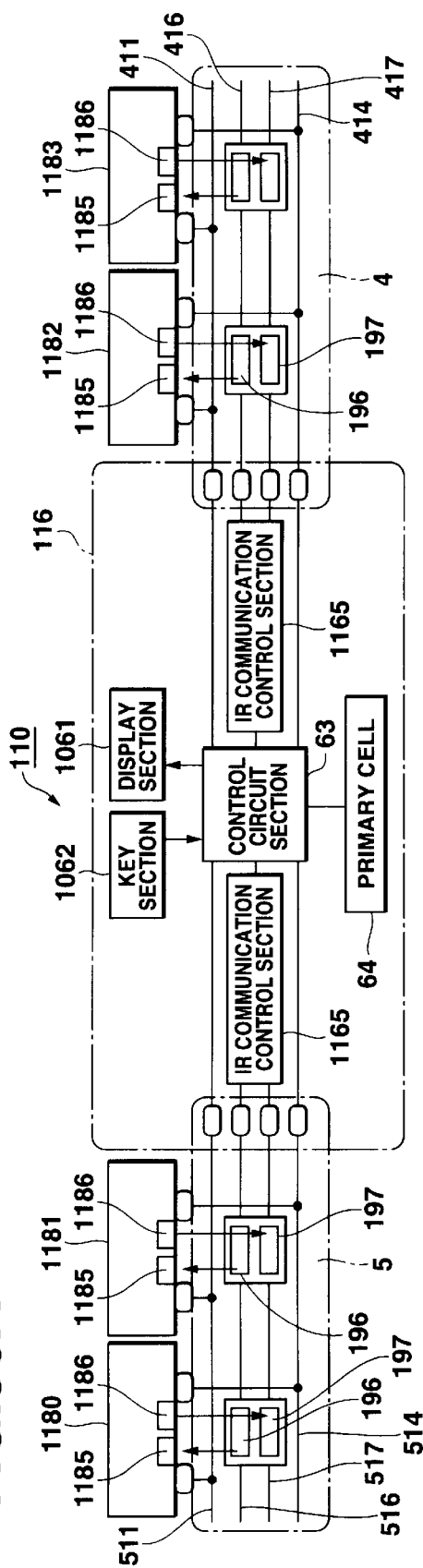
FIG. 36A is a diagram illustrating a connection structure for the circuit configuration in a fifth embodiment.

As illustrated in FIG. 36A, a body case 116 of a wristwatch 110 contains a control circuit section 63, a power supply 64, and an Ir communication control section 1165 for infrared-based data communications. Also, similarly to the fourth embodiment, a display section 1061 and key sections 1062 are arranged along the outer periphery of the body case 116.

Wrist bands 4 and 5 comprise bus line wires similar to those in the third modification of the second embodiment; a light emitting section 196 having an infrared light emitting device in place of the connector member (for the (TX) line) 96 at a position opposite to an infrared input section 1185 of each function module unit 1180 through 1184; and a light receiving section 197 having an infrared receiving device in place of the connector member (for the (Rx) line) 97 at a position oppose to an infrared output section 1186.

Each of the module units 1180 through 1183 is connected to the Vcc lines 411 and 511 and to the ground lines 414 and 515, and has the light receiving section 1185 opposing the light emitting section 196 of the wrist bands 4 and 5 and the light emitting section 1186 opposing the light receiving section 197 of the wrist bands 4 and 5.

Figure 36B:
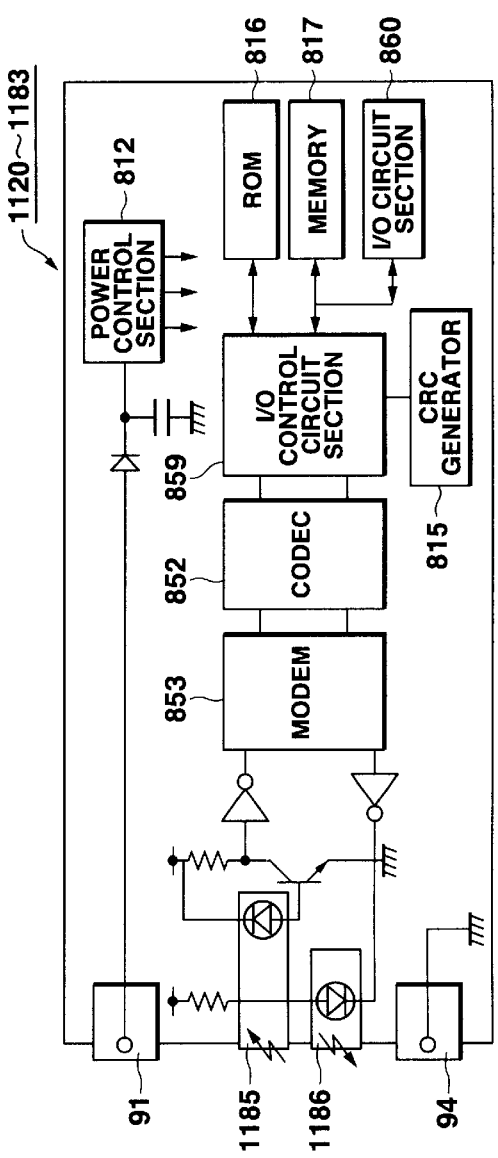
FIG. 36B is a block diagram illustrating the circuit configuration of a function module unit.

As illustrated in FIG. 36B, the function module unit 1180 comprises connector members 91 and 94, light receiving section 1185 and light emitting section 1186, as well as a power control section 812, a modem 853, a coding/decoding section 852, an I/O control circuit section 859, a ROM 816, a memory 817, an I/O circuit and so on 860 for controlling data communications with a variety of devices such as sensor devices for acquiring surrounding environment and vital information, an imaging device, an audio input/output device, and so on.

Therefore, according to these function module units 1180 through 1183, data communications with the body case 116 through infrared communication can be made through the light receiving section 1185 and the light emitting section 1186 in the function module unit and the light emitting section and the light receiving section 197 in the wrist bands 4 and 5.

Sixth Embodiment

Figure 37A:
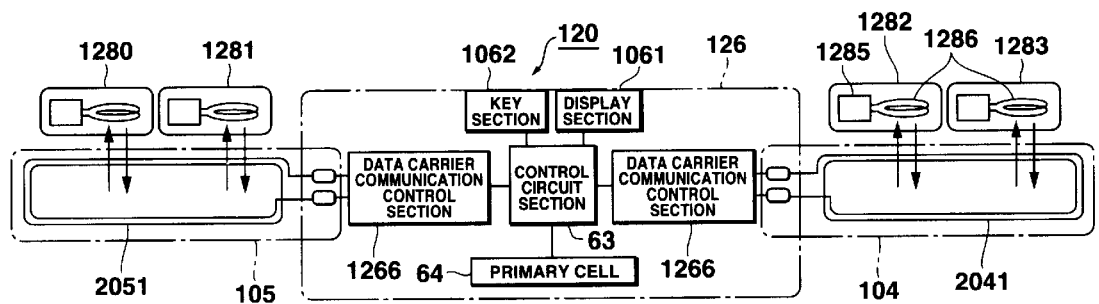
FIG. 37A is a diagram illustrating a connection structure in a sixth embodiment of the present invention.
Figure 37B:
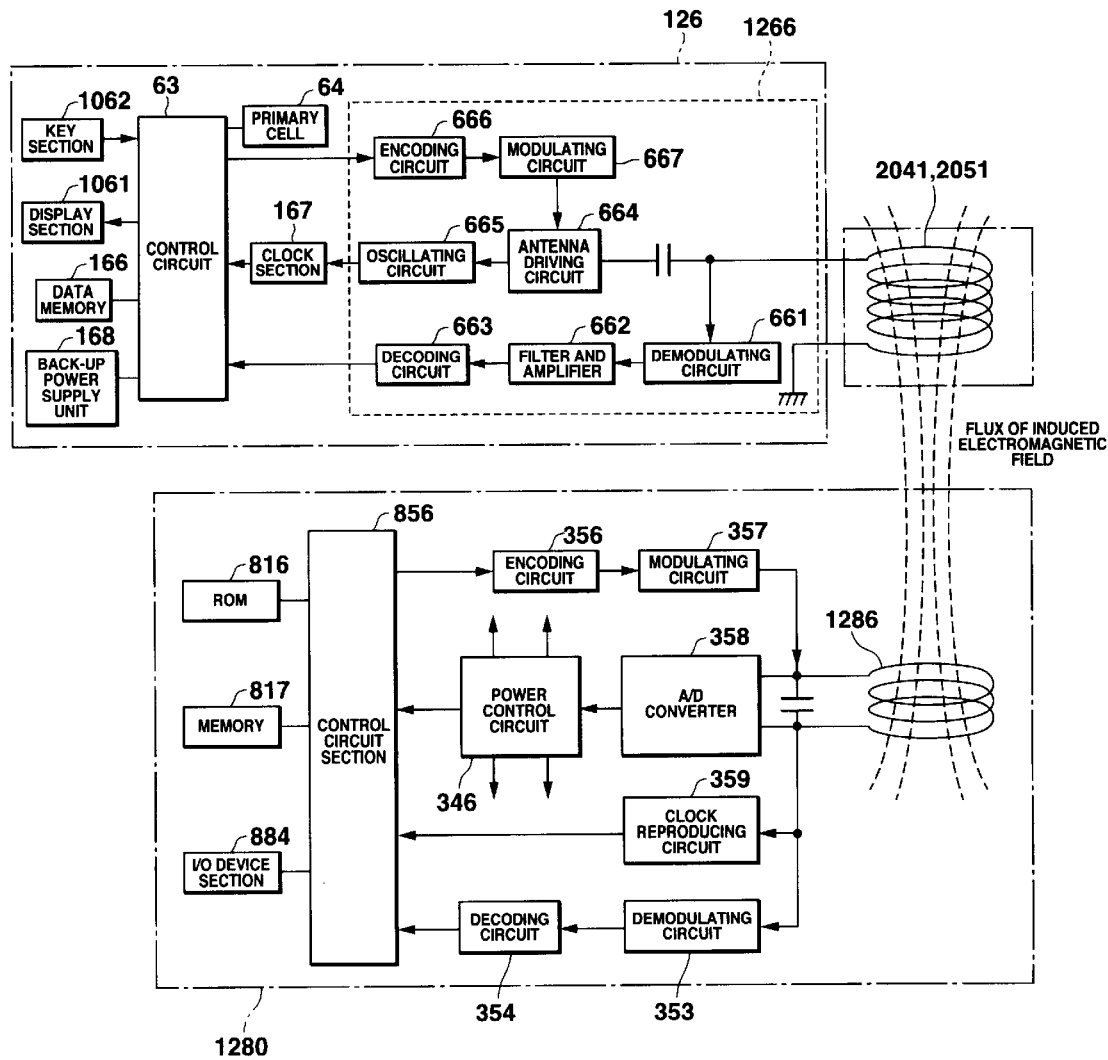
FIG. 37B is a block diagram illustrating the circuit configuration of a function module unit.

FIGS. 37A and 37B illustrate a sixth embodiment of the present invention, wherein an induced electromagnetic field generated by electromagnetic induction is used to communicate data between antenna coils in wrist bands and an antenna coil built in each module unit.

As illustrated in FIG. 37A, a body case 126 of a wristwatch 120 contains a control circuit section 63 and a power supply 64. Similarly to the fourth embodiment, a display section 1061 and key sections 1062 are arrange along the outer periphery of the body case 126. The control circuit section 63 is connected to antenna coils 2041 and 2051 arranged in wrist bands 4 and 5, respectively, through a data carrier communication control section 1266.

As illustrated in FIG. 37B, the data carrier communication section 1266 comprises a demodulating circuit 661, a filter and amplifier circuit 662, a decoding circuit 663, an antenna driving circuit 664, an oscillating circuit 665, a modulating circuit 667, and an encoding circuit 666.

The decoding circuit 663 and the encoding circuit 666 are connected to the control circuit section 63, while the oscillating circuit 665 is connected to the control circuit section 63 through a time measuring circuit section 167 for generating time information.

The control circuit section 63 is connected to the key sections 1062 and the display section 1061, as well as to a data memory 166 and a back-up power supply unit 168.

On the other hand, function module units 1280 through 1283 are removably mounted to wrist bands 104 and 105 by appropriate mounting means.

Each of the module units 1280 through 1284 comprises a module antenna 1286, a demodulating circuit 353, a decoding circuit 354, a clock recovering circuit 359, an A/D converter 358 which additionally provides a rectifying function, a parasitic power source 346, an encoding circuit 356, a modulating circuit 357, a control circuit section 856, a ROM 816, a memory 817, and an input/output device 884.

Therefore, according to the sixth embodiment, the electromagnetic induction between the antenna coil 2041 (2051) on the wrist band side and the module antenna coil 1286 in each of the function module units 1280 through 1283 enables data to be communicated between the control circuit section 63 and each of the function module units 1280 through 1283 as well as enables the power of the primary cell 64 to be supplied to each of the function module units 1280 through 1283 without contact, thereby making it possible to eliminate wired bus line and accordingly simplify the wiring structure.

Seventh Embodiment

Figure 38:
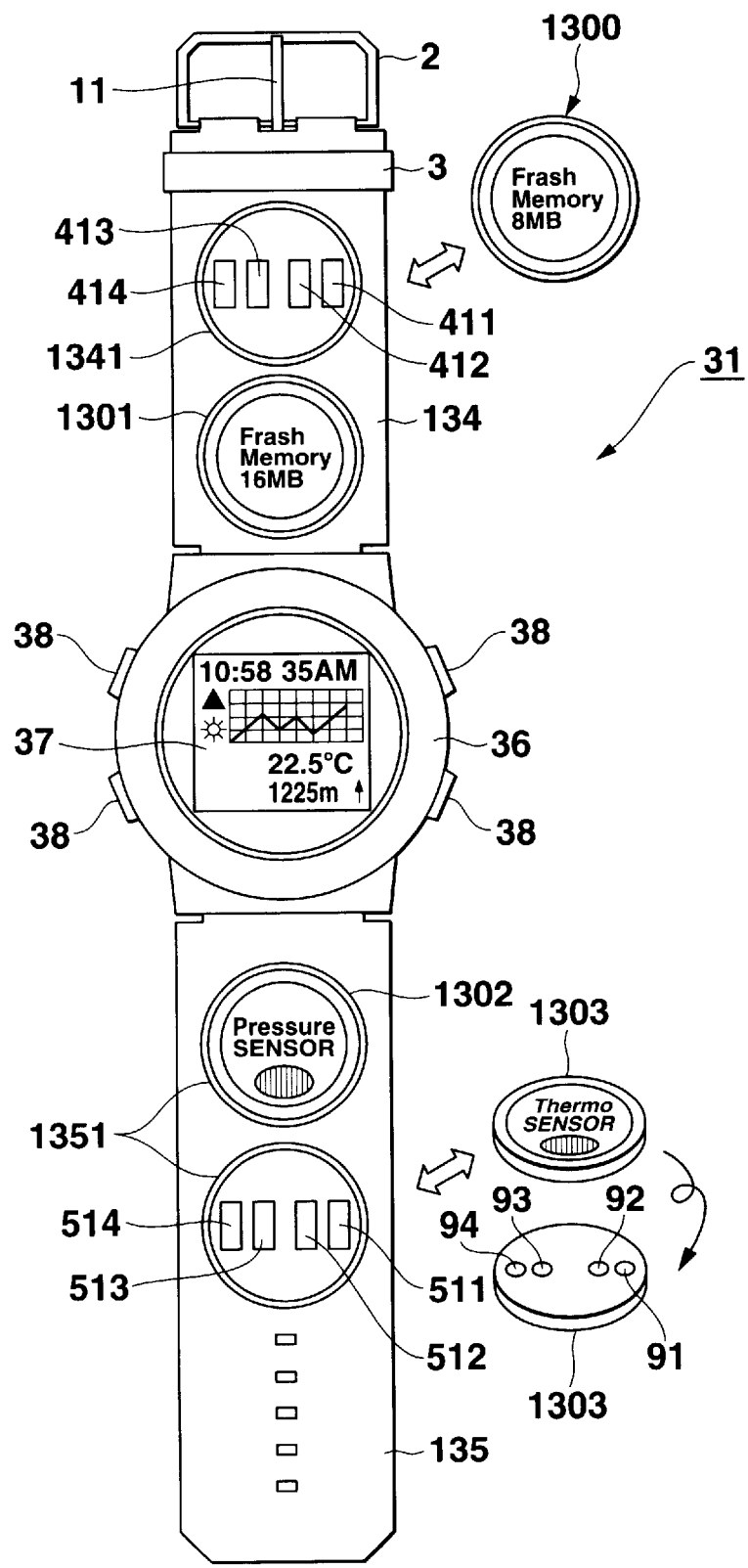
FIG. 38 is a diagram generally illustrating a wristwatch according to a seventh embodiment of the present invention with a function module unit additionally illustrated in a perspective view.

FIG. 38 illustrates the seventh embodiment of the present invention, wherein function module units are made in a coin shape so that they are removably fitted in wrist bands.

In the following, the seventh embodiment of the present invention will be described with reference to FIG. 38. In describing the figures, the configuration previously described in the first through third embodiments is basically identical in the seventh embodiment as well, so that description thereon is omitted.

Wrist bands 134 and 135 joined to both ends of a body case 36 are formed with a plurality of function module unit fitting holes 1341 and 1351 which are circular in shape, when seen on a plan view, and in which function module units 1300 through 1303 can be removably fitted.

On the bottom of each module unit fitting hole 1341, 1351, portions of a Vcc line 511, a serial data line 512, a clock data line 513, and a ground line 514 are exposed.

On the other hand, each of the function module units 1300 through 1303 is provided on the bottom with connector members 91 through 94 at positions corresponding to the exposed portions of the respective lines 511 through 514.

Therefore, according to the seventh embodiment, functions can be readily added by fitting the function module units 1300 through 1302 into the module unit fitting holes 1341 and 1351 as required.

Modification of Seventh Embodiment

In the foregoing seventh embodiment, while the function module unit 1300 is made circular in shape, when seen on a plan view, the function module unit 1300 may be made in any appropriate shape, not limited to the circular shape (FIG. 39A) on a plan view, such as oval (FIG. 39B), square (FIG. 39C), rectangle with curved corners (FIG. 39D), rectangle with a particular corner cut away (FIGS. 39E and 39F), semicircle (FIG. 39G), wedge shape (FIG. 39H), and so on.

Figure 39:
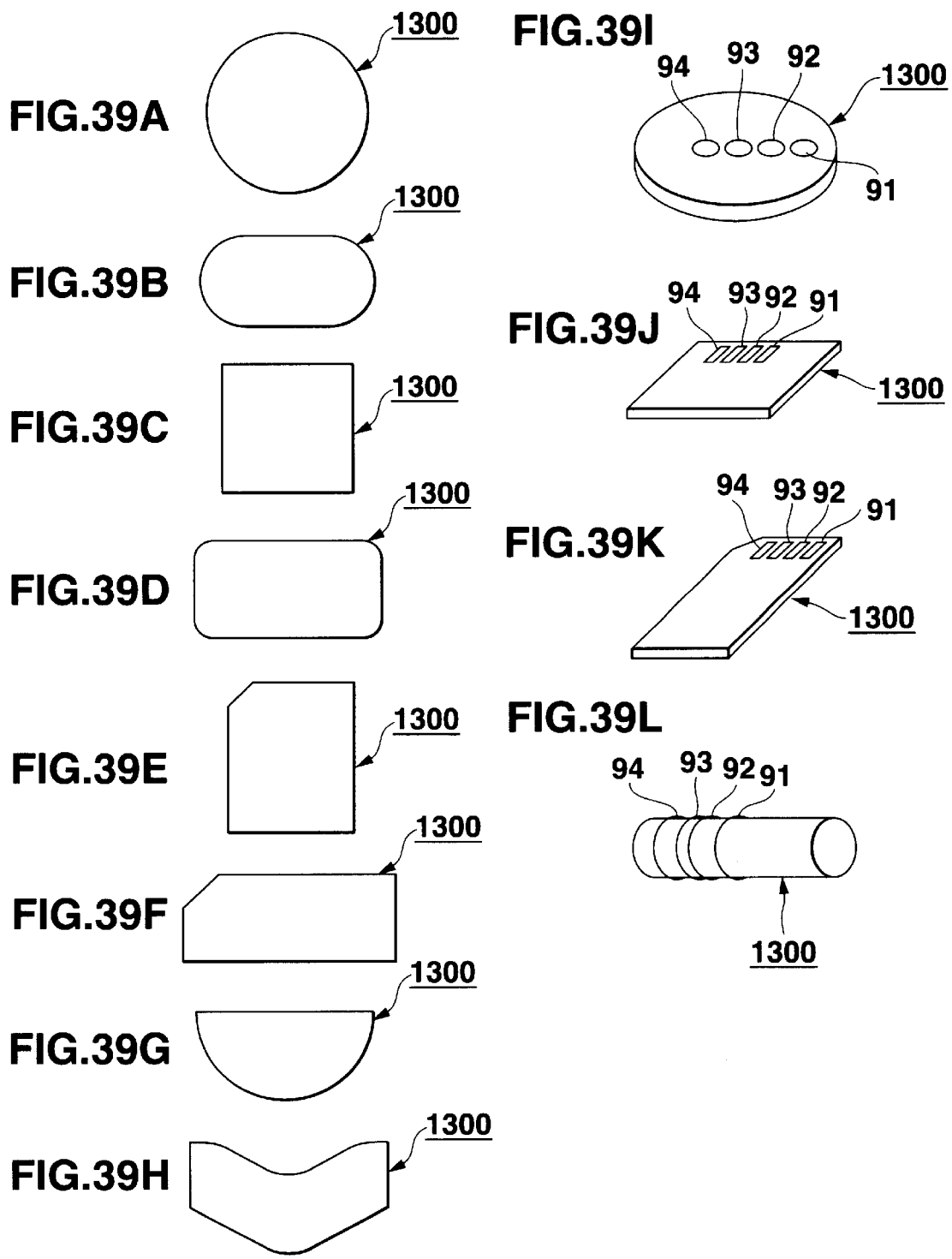
FIGS. 39A, 39B, 39C, 39D, 39E, 39F, 39G, and 39H are plan views of function module units, respectively, in modifications of the seventh embodiment of the present invention.
FIGS. 39I, 39J, 39K, and 39L are perspective views of function module units, respectively, in modifications of the seventh embodiment of the present invention.

Also, in terms of the positions at which the connector members 91 through 94 are formed, they may be aligned along a base line (FIG. 39I), or placed along one side of the function module unit (FIGS. 39J and 39K). When the function module 1300 is cylindrical, the connector members 91 through 94 may be formed on its peripheral surface (FIG. 39L).

Eighth Embodiment

An eighth embodiment describes control processing in detail in the first embodiment when data is communicated between the control circuit section 63 contained in a body case 5006 (6) and each of the function module units 80 through 84. In describing figures, since the configuration previously described in the first embodiment is basically identical, description thereon is omitted.

Figure 40:
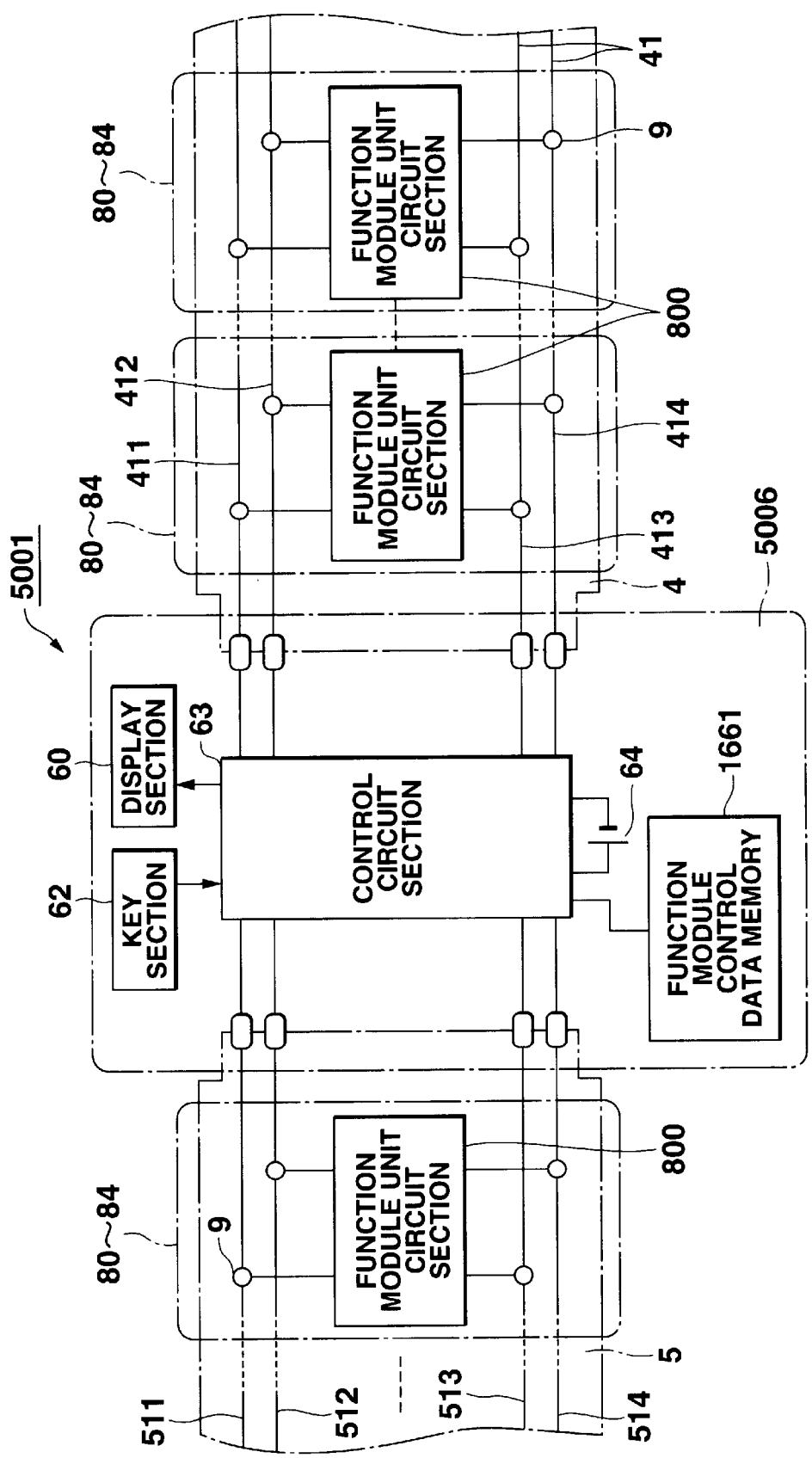
FIG. 40 is a block diagram illustrating the circuit configuration of a wristwatch according to an eighth embodiment of the present invention.

As illustrated in FIG. 40, in the eighth embodiment, the body case 5006 of a wristwatch 5001 contains a function module unit control data memory 1661, later described, in addition to the configuration described in the first embodiment.

Figures 41A, 41B:
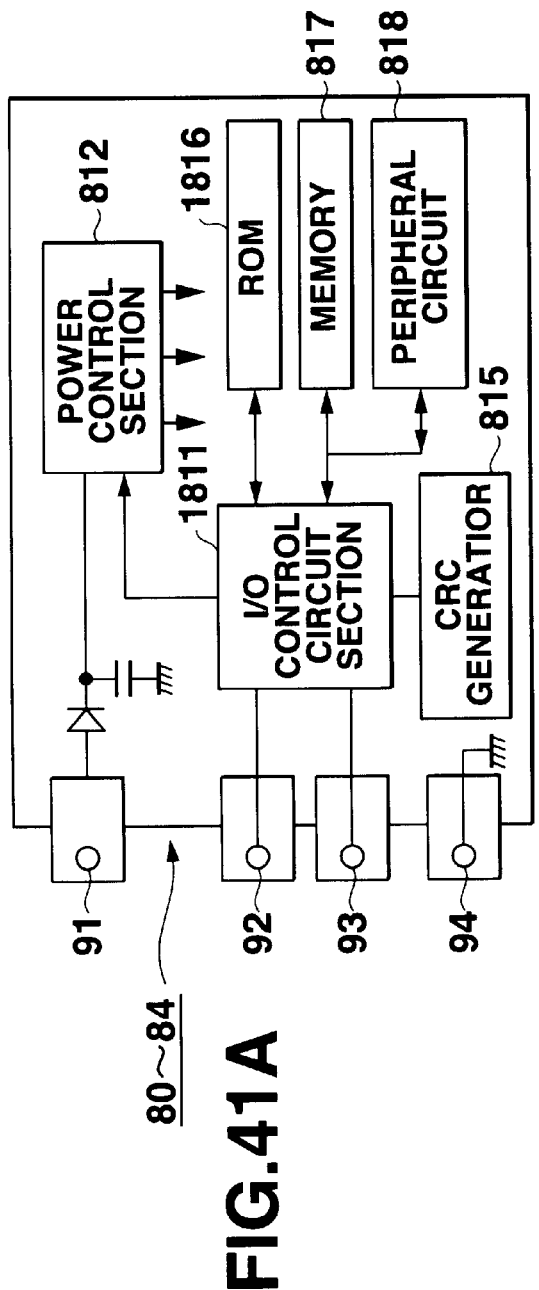
FIG. 41A is a block diagram illustrating the circuit configuration of a function module unit according to the eighth embodiment.
FIG. 41B is a diagram showing data stored in ROM.

FIG. 41A illustrates the circuit configuration of each function module unit 80 through 84. In describing the figure, since components previously described in the first embodiment are basically identical in configuration, they are omitted in the following description.

An I/O control circuit section 1811 is connected to connector members 92 and 93 for reading, storing or searching data on a ROM 1816 and a memory 817 as well as data on peripheral circuits such as an I/O circuit, a communication circuit and so on in accordance with a received command. The I/O control circuit section 1811 manages the power in a power control section 812.

The ROM 1816 stores a manufacturer/series code (Family Code) 8160 indicative of the manufacturer which has manufactured an associated function module unit, and a model number or the like in the manufacturer; a product serial number (Serial No.) 8161; a power supply/primary cell module bit (PS) 8162 for setting whether or not the associated function module unit includes a power supply module unit or a power supply with 1-bit data (flag) information; an input (data readable) module bit (IN) 8163 for setting whether or not the associated function module unit can read data from the outside with 1-bit data (flag) information; an output (data writable) module bit (OUT) 8164 for setting whether or not the associated function module unit can write data to the outside; display format setting data (DF) 8165; a module type code (Module Code) 8166; a module specification code (Module Spec) 8167; power consumption information data 8168 (PCI: Power Consumption Information); and an error check (CRC cyclic correction code) 8169.

Among these data stored in the ROM 1816, the module type code (Module Code) 8166 and the module specification code (Module Spec) 8167 are defined in each table stored in the function module unit control data memory 1661.

The display format setting data (DF) 8165 is data for defining a display format when items related to an associated function module unit is displayed on a display section 60 of the wristwatch 5001. The power consumption information data (PCI) 8186 is data related to power consumption required for an associated function module unit to normally operate (power consumption when the function module unit is off; average power consumption when on; maximum power consumption when on; and so on).

The module type code (Module Code) 8166 is a code indicative of the type of an associated function module unit, while the module specification code (Module Spec) 8167 is a code indicative of specifications of the associated function module unit.

The module type code 8166 and the module specification code 8167 will be described later in greater detail.

When these data and codes are communicated between the respective function module units and the watch body, the data structure conforms to those shown in FIGS. 10A and 10B, 11A through 11G. Each of the data and codes, however, is modified.

Figure 42:
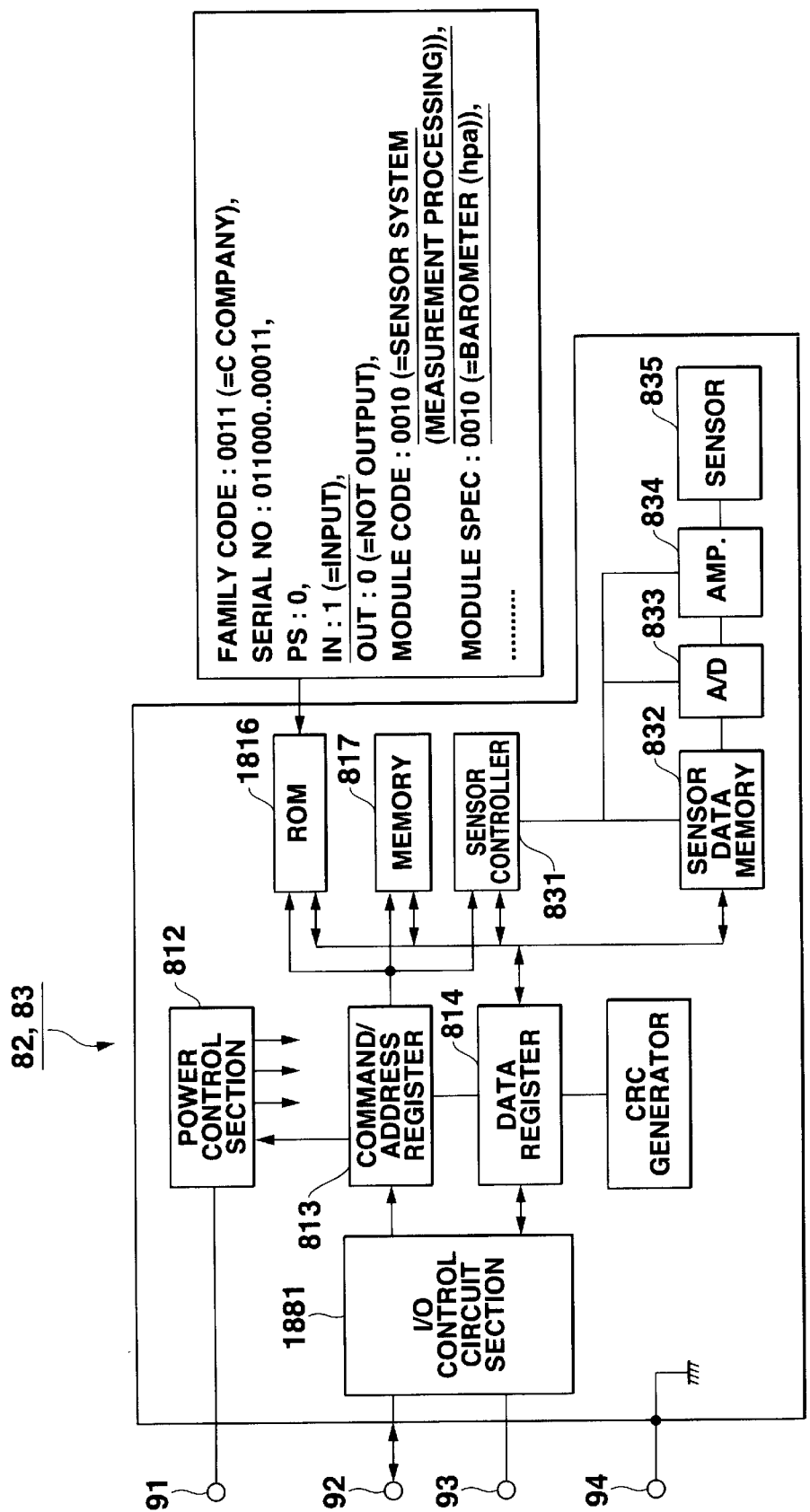
FIG. 42 is a block diagram illustrating the circuit configuration of a sensor function module unit in the eighth embodiment.

FIG. 42 is a block diagram illustrating in detail the circuit configuration of function module units 82 and 83 as an example.

The ROM 1816 of the function module units 82 and 83 stores information from the manufacturer/series code 8160 of the function module unit to the error check (CRC cyclic correction code) 8169 shown in FIG. 41B.

In the information 8160 through 8169, the code type code 8166 for the function module unit 82 and 83 is defined as "Module Code=0100 (=sensor system (measurement processing)" on the right side of FIG. 42. The module specification code 8167 for the function module unit 83 is defined as "Module Spec=0010 (barometer (hPa))".

Modification of Eighth Embodiment

Figure 43:
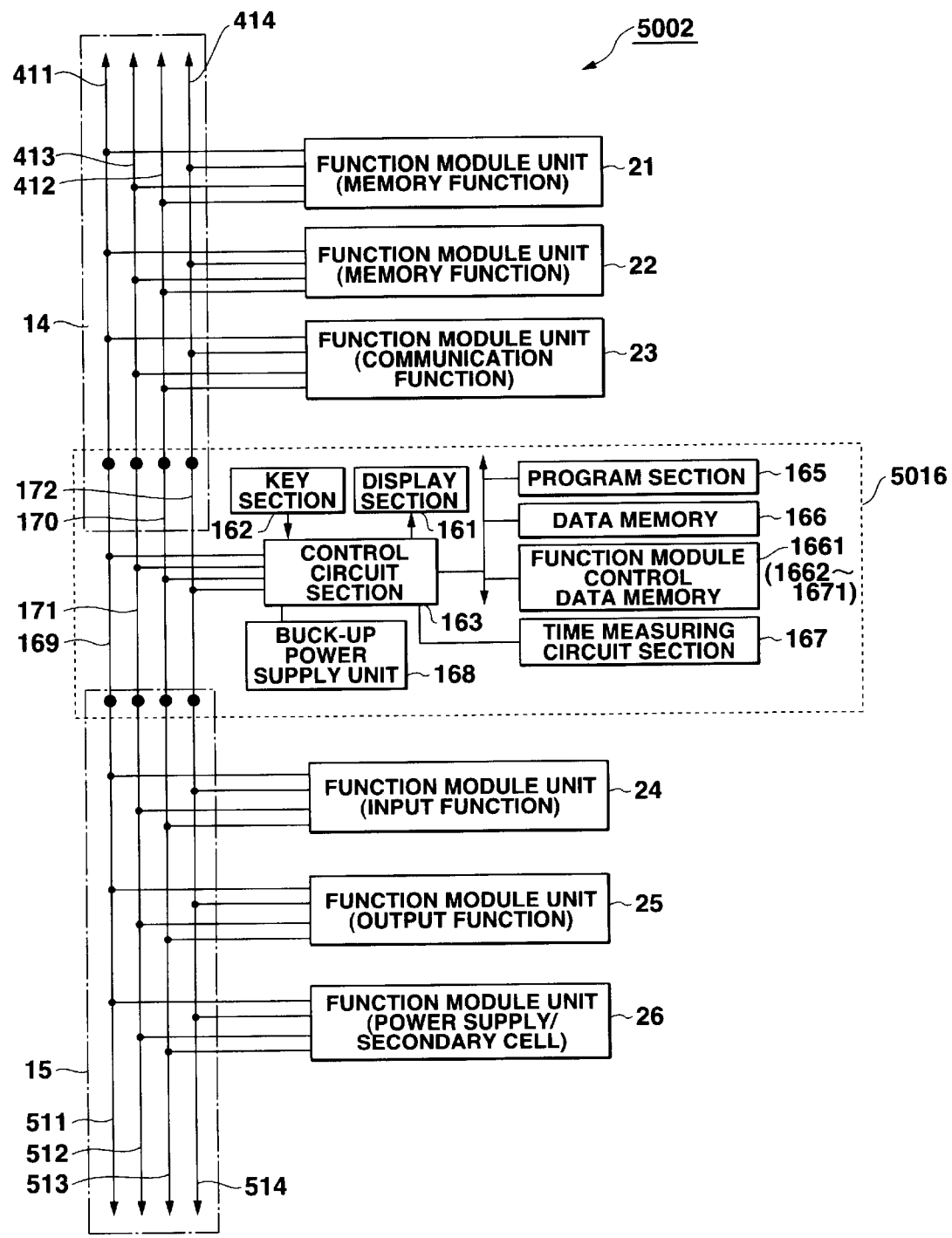
FIG. 43 is a block diagram illustrating the circuit configuration of a wristwatch according to a modification of the eighth embodiment of the present invention.

FIG. 43 illustrates a modification in the eighth embodiment of the present invention, which describes control processing in detail in the second embodiment when data is communicated between the control circuit section 163 contained in a body case 5016 (6) and each of the function module units 21 through 26. In describing figures, since the configuration previously described in the second embodiment is basically identical, description thereon is omitted.

In the modification of the eighth embodiment, as illustrated in FIG. 43, the body case 5016 of a wristwatch 5002 contains a function module unit control data memory 1661, later described, in addition to the configuration previously described in the first embodiment.

The function modules 21 through 26 are each connected to Vcc lines 411 and 511; serial data lines 412 and 512; clock data lines 413 and 513; and ground lines 414 and 514.

Figure 44:
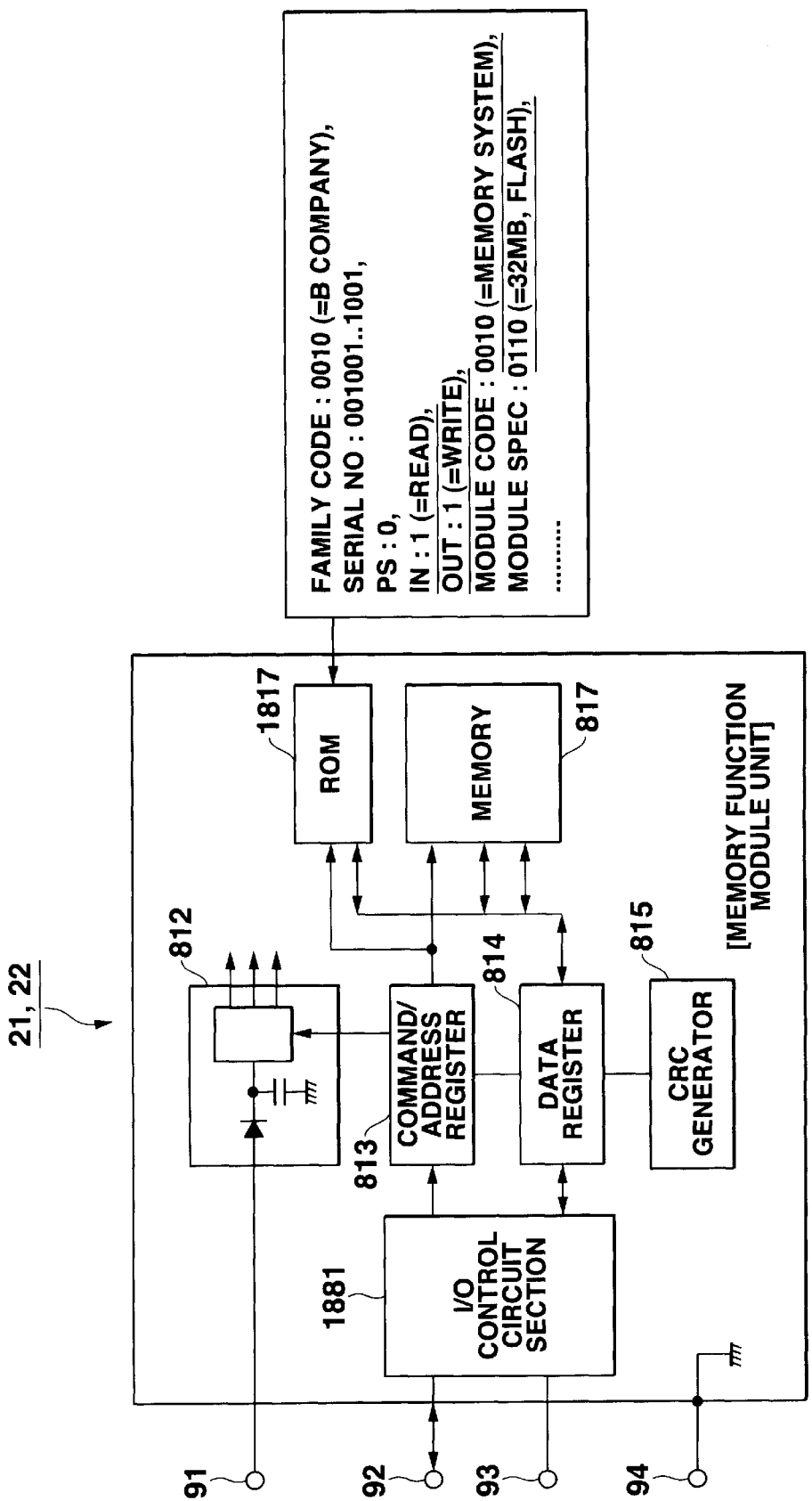
FIG. 44 is a block diagram illustrating the circuit configuration of memory function module units 21 and 22 in the modification of the eighth embodiment.

FIG. 44 is a block diagram illustrating in detail the circuit configuration of the function module units 21 and 22. In describing the figure, since components previously described in the second embodiment are basically identical in configuration, they are omitted in the following description.

A ROM 1817 stores information from the manufacturer/series code 8160 of the function module unit to the error check (CRC cyclic correction code) 8169, which are similar to those shown in FIG. 41B. Among the information 8160 through 8169, the module type code 8166 of the function module unit 21 and 22, which has a memory function, is defined as "Module Code=0010 (=memory system)". Also, the module specification code 8167 of the function module unit 21 is defined as "Module Spec=0110 (32 MB/Flash (memory device))".

Figure 45:
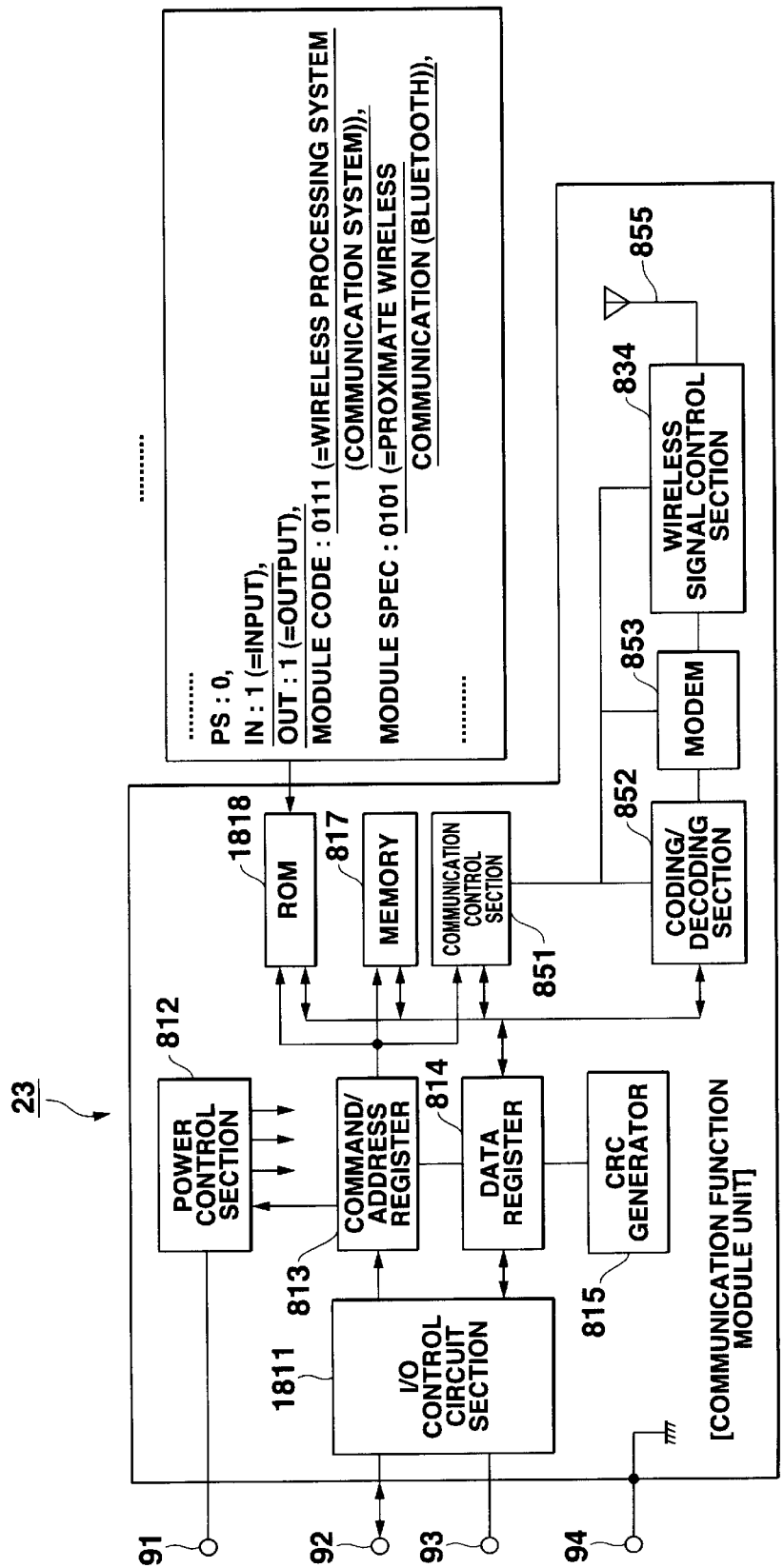
FIG. 45 is a block diagram illustrating the circuit configuration of a wireless processing module unit 23 in the modification of the eighth embodiment.

FIG. 45 is a block diagram illustrating in detail the circuit configuration of the function module unit 23. Since components previously described in the second embodiment are basically identical in configuration, they are omitted in the following description.

A ROM 1818 stores information from the manufacturer/series code 8160 of the function module unit to the error check (CRC cyclic correction code) 8169, which are similar to those shown in FIG. 41B.

Among the information 8160 through 8169, the module type code 8166 of the function module unit 23 is defined as "Module Code=0111 (=wireless processing system (communication system))".

The module specification code 8167 of the function module unit 23 is defined as "Module Spec=0101 (=proximate wireless communication (Bluetooth))".

Figure 46:
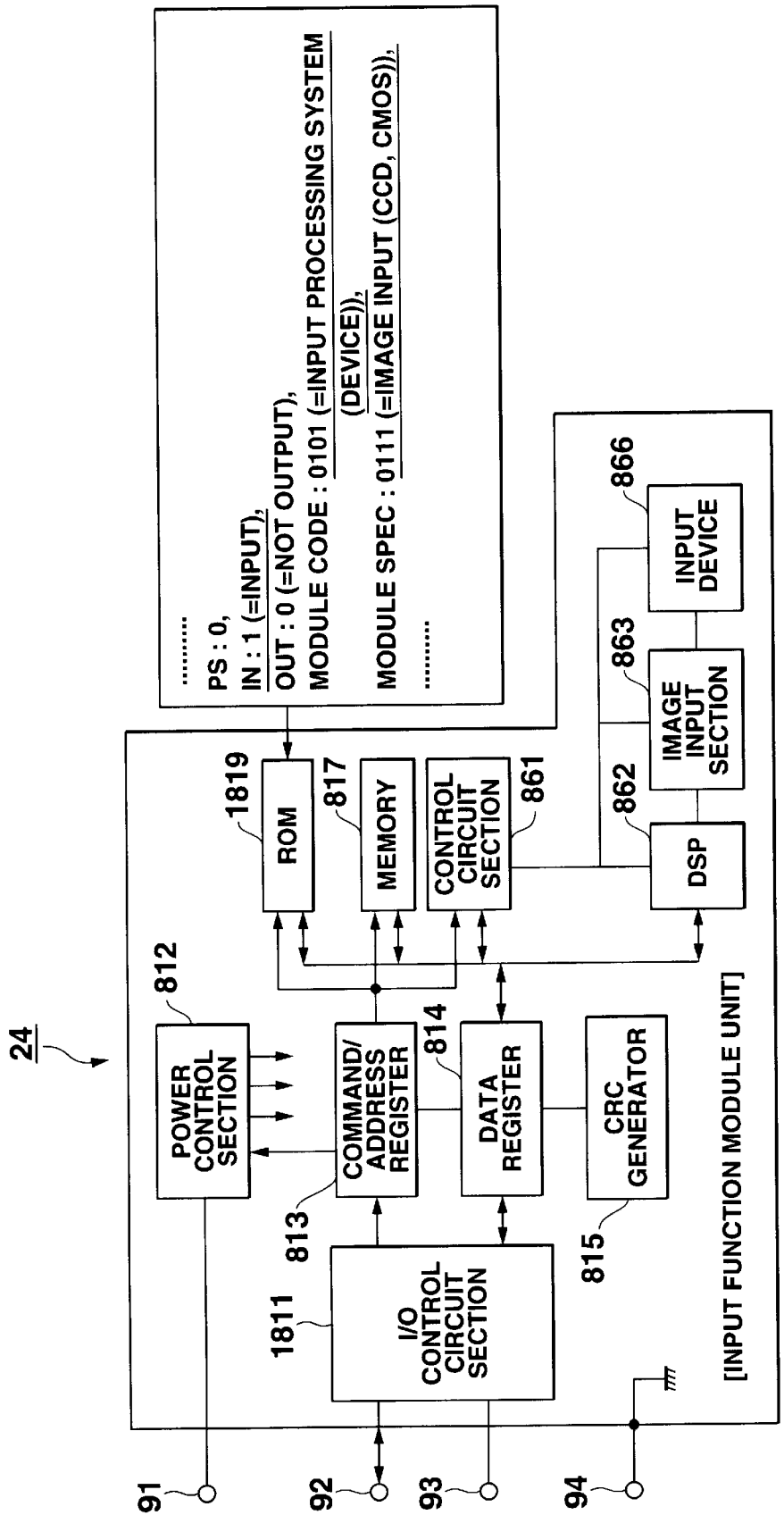
FIG. 46 is a block diagram illustrating the circuit configuration of an input processing (device) function module unit 24 in the modification of the eighth embodiment.

FIG. 46 is a block diagram illustrating in detail the circuit configuration of the function module unit 24. Since components previously described in the second embodiment are basically identical in configuration, they are omitted in the following description.

A ROM 1819 stores information from the manufacturer/series code 8160 of the function module unit to the error check (CRC cyclic correction code) 8169, which are similar to those shown in FIG. 41B.

Among the information 8160 through 8169, the module type code 8166 of the function module unit 24 is defined as "Module Code=0101 (=input processing system (device))".

The module specification code 8167 of the function module unit 24 is defined as "Module Spec=0111 (=image input (CCD, CMOS))".

Figure 47:
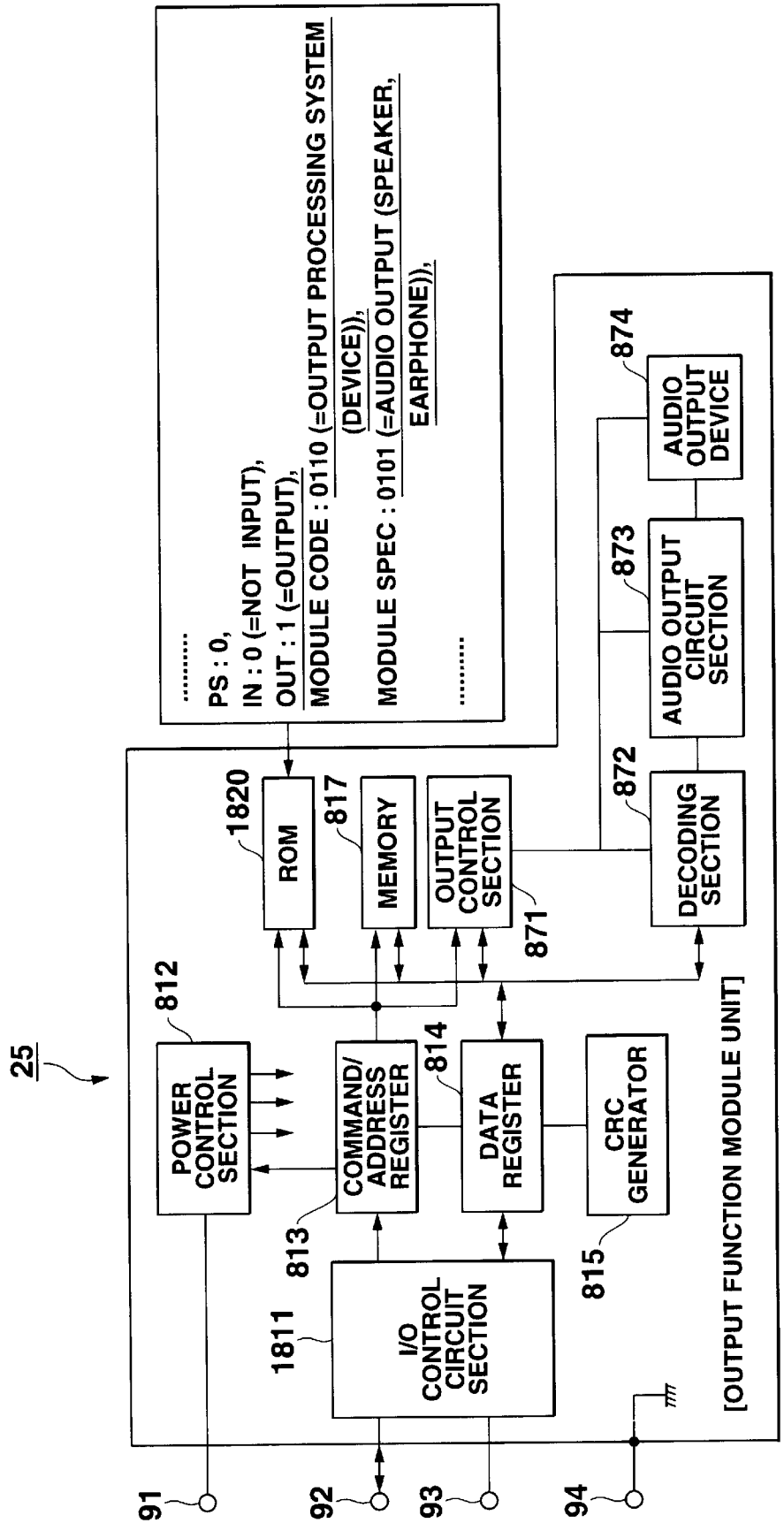
FIG. 47 is a block diagram illustrating the circuit configuration of an output processing (device) function module unit 25 in the modification of the eighth embodiment.

FIG. 47 is a circuit diagram illustrating in detail the circuit configuration of the function module unit 25. Since components previously described in the second embodiment are basically identical in configuration, they are omitted in the following description.

A ROM 1820 stores information from the manufacturer/series code 8160 of the function module unit to the error check (CRC cyclic correction code) 8169, which are similar to those shown in FIG. 41B.

Among the information 8160 through 8169, the module type code 8166 of the function module unit 25 is defined as "Module Code=0110 (=output processing system (device))".

The module specification code 8167 of the function module unit 25 is defined as "Module Spec=0101 (=audio output (speaker, earphone))".

Figure 48:
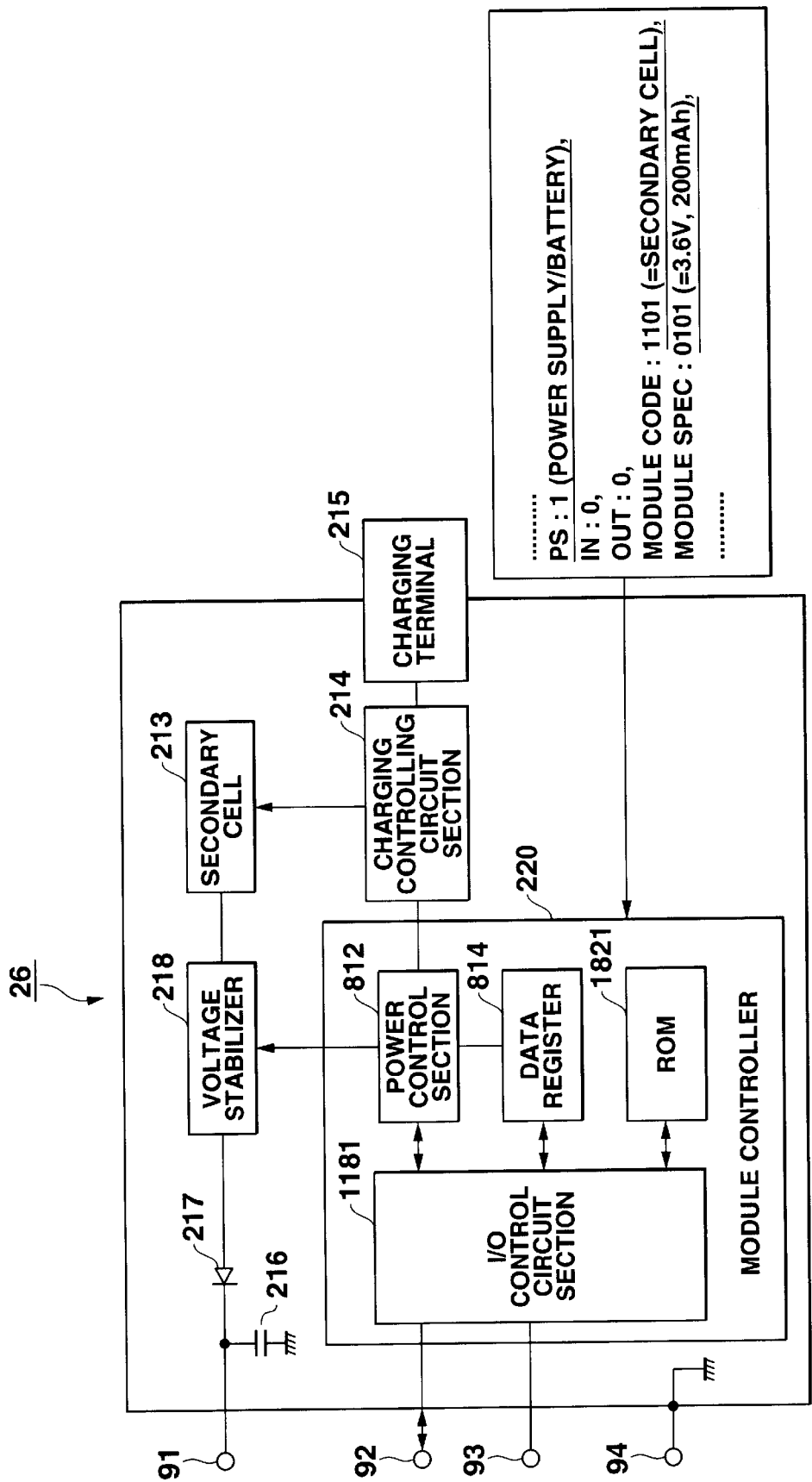
FIG. 48 is a block diagram illustrating the circuit configuration of a power supply module unit 26 in the modification of the eighth embodiment.

FIG. 48 is a circuit diagram illustrating in detail the circuit configuration of the function module unit 26. Since components previously described in the second embodiment are basically identical in configuration, they are omitted in the following description.

A ROM 1821 stores information from the manufacturer/series code 8160 of the function module unit to the error check (CRC cyclic correction code) 8169, which are similar to those shown in FIG. 41B.

Among the information 8160 through 8169, the module type code 8166 of the function module unit 26 is defined as "Module Code=1101 (=secondary cell)".

The module specification code 8167 of the function module unit 26 is defined as "Module Spec=0101 (=3.6V, 200 mAh)".

FIGS. 49 through 58 show tables 1662 through 1671 which are stored in the module unit control data memories 1661 of the respective wristwatches 5001 and 5002.

Each of the tables 1662 through 1671 stores a module identification code, a module specification code and a function in correspondence.

FIG. 49 shows a time measuring function module table 1662 in which the module identification code is set to "0000" commonly for all time measuring function module units such as a surf timer, a yacht timer, . . . , and so on in correspondence.

The module specification code differs from one function module unit to another depending on the function.

Therefore, the control circuit sections 63 and 163 of the wristwatches 5001 and 5002 can determine whether or not a function module unit fitted on and connected to the wrist bands 4 and 5 provides a time measuring function, and which specifications, when it provides the time measuring function, by referencing this time measuring function module table 1662.

FIG. 50 shows a CPU/processing program function module table 1663 in which the module identification code is set to "0001" commonly for all CPU/processing program function module units such as sunrise/sunset calculation, moon age calculation, and so on in correspondence.

The module specification code differs from one function module unit to another depending on the function.

Therefore, the control circuit sections 63 and 163 of the wristwatches 5001 and 5002 can determine whether or not a function module unit fitted on and connected to the wrist bands 4 and 5 provides a CPU/processing function, and which specifications, when it provides the CPU/processing function, by referencing this CPU/processing program function module table 1663.

FIG. 51 shows a memory function module table 1664 in which the module identification code is set to "0010" commonly for all memory module units such as 1 MB/SRAM, 2 MB/SRAM, . . . and so on in correspondence.

The module specification code differs from one function module unit to another depending on the memory capacity and hardware specifications of a particular function module unit.

Therefore, the control circuit sections 63 and 163 of the wristwatches 5001 and 5002 can determine, by referencing this memory function module table 1664, whether or not a function module unit fitted on and connected to the wrist bands 4 and 5 provides a memory function, and how man capacity and in which hardware the function module unit is configured, when it provides the memory function, based on the module specification code.

FIG. 52 shows a data bank function module table 1665 in which the module identification code is set to "0011" commonly for all data bank module units such as an address book, a schedule book, . . . and so on in correspondence.

The module specification code differs from one function module unit to another depending on the function.

Therefore, the control circuit sections 63 and 163 of the wristwatches 5001 and 5002 can determine, by referencing this data bank function module table 1665, whether or not a function module unit fitted on and connected to the wrist bands 4 and 5 provides a data bank function, and which specifications, when it provides the data bank function, based on the module specification code.

Figure 53:
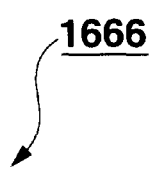
FIG. 53 is a diagram showing contents stored in a sensor function module table.

FIG. 53 shows a sensor function module table 1667 in which the module identification code is set to "0100" commonly for all data bank module units such as a thermometer, a barometer, . . . and so on in correspondence.

The module specification code differs from one function module unit to another depending on the function.

Therefore, the control circuit sections 63 and 163 of the wristwatches 5001 and 5002 can determine by referencing this sensor function module table 1666, whether or not a function module unit fitted on and connected to the wrist bands 4 and 5 provides a sensor function, and which specifications, when it provides the sensor function, based on the module specification code.

FIG. 54 shows an input processing system (device) function module table 1667 in which the module identification code is set to "0101" commonly for all input processing function module units such as input through via a connector (binary data), key input (keyboard), . . . and so on in correspondence.

The module specification code differs from one function module unit to another depending on the function.

Therefore, the control circuit sections 63 and 163 of the wristwatches 5001 and 5002 can determine by referencing this input processing system (device) function module table 1667, whether or not a function module unit fitted on and connected to the wrist bands 4 and 5 comprises an input device, and which specifications, when it comprises an input device, based on the module specification code.

FIG. 55 shows an output processing system (device) function module table 1668 in which the module identification code is set to "0110" commonly for all output processing function module units such as output through via a connector (binary), display output (monochrome display), . . . and so on in correspondence.

The module specification code differs from one function module unit to another depending on the function.

Therefore, the control circuit sections 63 and 163 of the wristwatches 5001 and 5002 can determine by referencing this output processing system (device) function module table 1668, whether or not a function module unit fitted on and connected to the wrist bands 4 and 5 comprises an output device, and which specifications, when it comprises an output device, based on the module specification code.

FIG. 56 shows a wireless processing system (communication system) function module table 1669 in which the module identification code is set to "0111" commonly for all output processing function module units such as general wireless communication, general wireless reception, . . . and so on in correspondence.

The module specification code differs from one function module unit to another depending on the function.

Therefore, the control circuit sections 63 and 163 of the wristwatches 5001 and 5002 can determine by referencing this wireless processing system (communication system) function module table 1669, whether or not a function module unit fitted on and connected to the wrist bands 4 and 5 provides a wireless processing function, and which specifications, when it provides the wireless processing function, based on the module specification code.

Figure 58:
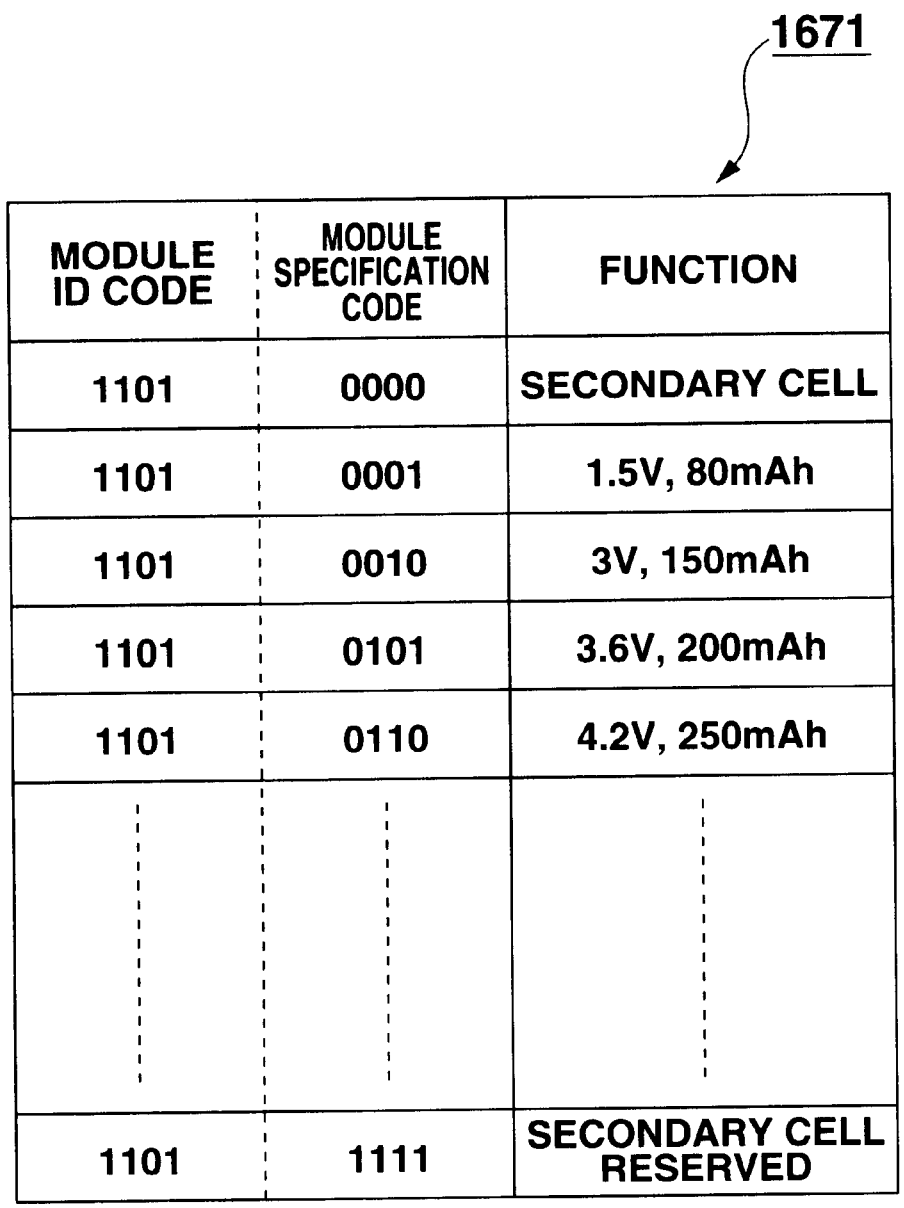
FIG. 58 is a diagram showing contents stored in a secondary cell function module table.

FIGS. 57 and 58 show a primary cell function module table 1670 and a secondary cell function module table 1671 in which the module identification code is set to "1000" (for the primary cell) or "1101" (for the secondary cell) commonly for all power supply module units such as 1.5V, 80 mAh; 3V, 150 mAh; and so on in correspondence.

The module specification code differs from one function module unit to another depending on the capabilities of the function module unit.

Therefore, the control circuit sections 63 and 163 of the wristwatches 5001 and 5002 can determine by referencing the primary cell and secondary cell function module tables 1670 and 1671, whether or not a function module unit fitted on and connected to the wrist bands 4 and 5 comprises a power supply, and which function is provided thereby, when it comprises a power supply, based on the module specification code.

Figure 59:
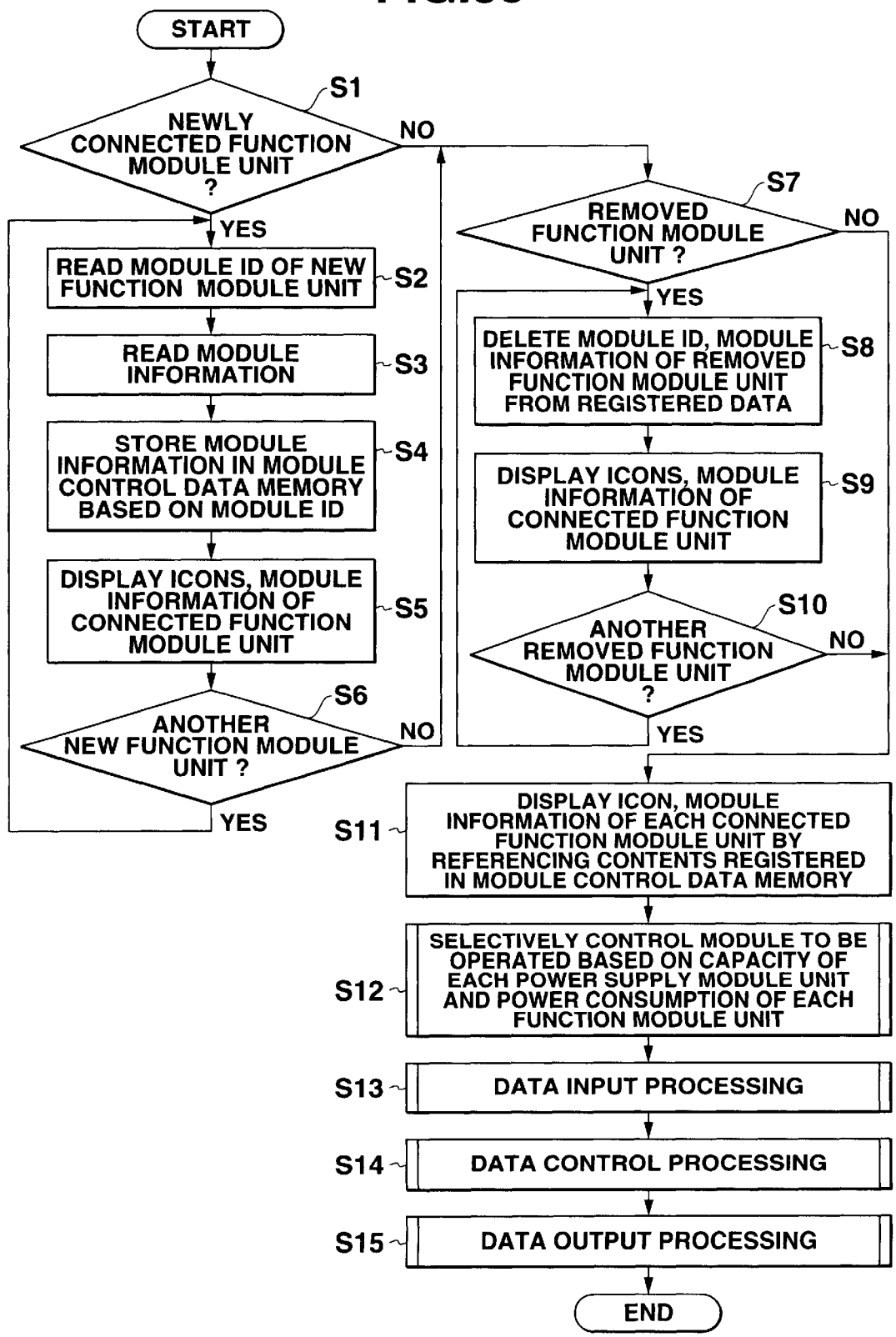
FIG. 59 is a flow chart illustrating a processing routine of the control circuit section.

In the eighth embodiment and modifications thereto configured as described above, the control circuit section 63 or 163 of each wristwatch 5001 or 5002 first executes processing in accordance with a flow chart illustrated in FIG. 59 based on the processing programs stored therein.

It is determined whether or not there is a newly connected function module unit fitted in the wrist band 4 or 5 (step S1).

If there is a newly connected function module unit, the control circuit section 63 or 163 reads the module ID (manufacturer/series code 8160, product serial number 8161) from among the information 8160 through 8169 stored in the ROM 816, 1816 through 1821 of the function module unit to determine whether or not the function module unit is supported by the wristwatch 5001 or 5002 (step S2). Then, the control circuit section 63 or 163 reads the subsequent module information (power supply/primary cell module bit (PS) 8162, input (data readable) module bit (IN) 8163, output (data writable) module bit (OUT) 8164, display format setting data (DF) 8165, module type code (Module Code) 8166, module specification code (Module Spec) 8167, power consumption information data 8168 (PCI: Power Consumption Information), and error check (CRC cyclic correction code) 8169 (step S3).

In correspondence to the module ID read at step the control circuit section 63 or 163 registers the module information read at step S3 in the module control data memory 1661 (step S4).

The control circuit section 63 or 163 then displays icons representative of the connected function module units and the module information of the same on the display section 60 or 161 (step S5).

Figure 60:
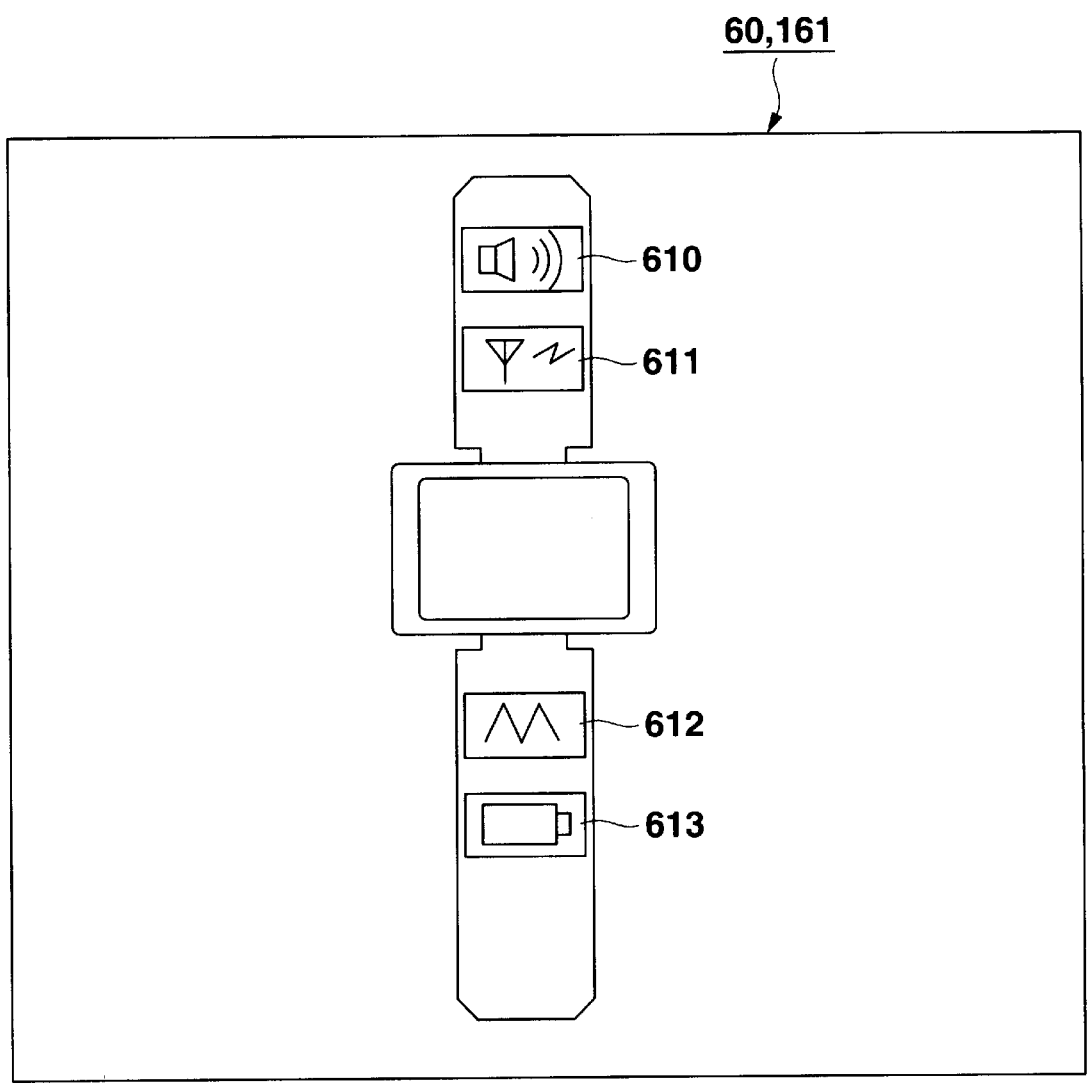
FIG. 60 is a diagram showing a display screen of a wristwatch.
Figure 61:
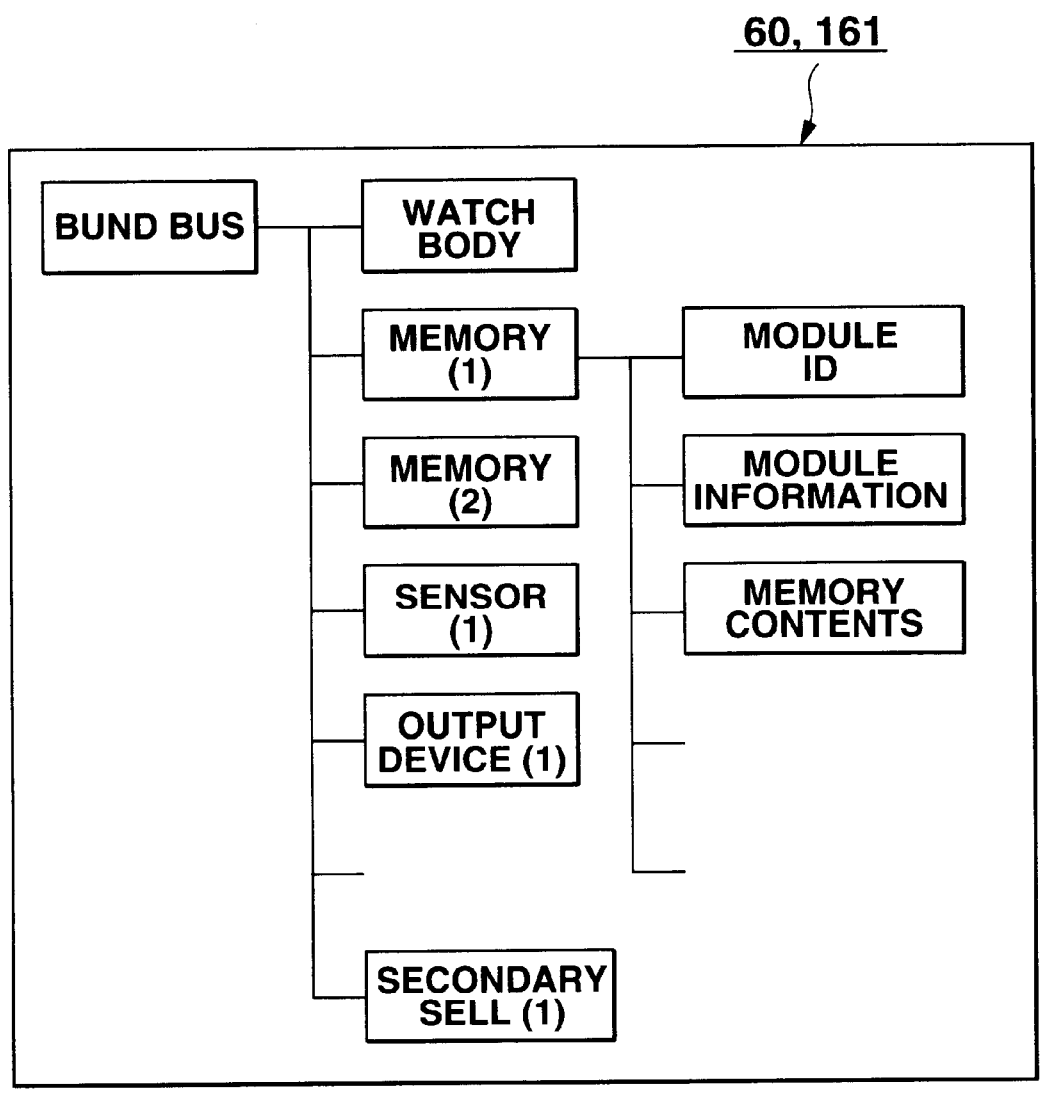
FIG. 61 is a diagram showing a display screen of a wristwatch.

The processing at step S5 causes the display section 60 or 161 of the wristwatch 5001 or 5002 to display the icons and module information of the connected function module units as illustrated in FIG. 60, or to display the module information in a tree form as illustrated in FIG. 61 (in FIG. 60, 610 designates an audio output icon representative of an output processing (device) function module unit; 611 an icon representative of a wireless processing (communication system) function module unit; 612 an icon representative of a memory function module unit; and 613 an icon representative of a power supply module unit).

It is determined whether or not there is another newly connected function module unit (step S6), and the processing from step S2 to step S5 is repeated for a newly connected function module unit, if any.

Then, when the processing from step S2 to step S5 has been completed for all of newly connected function module units, or when the result at the determination at step S1 shows that there is no newly connected function module unit, it is determined, contrary to the above, whether or not there is any function module unit which has been removed from the wrist band 4 or 5 (step S7).

If there is a function module unit which has been removed, the control circuit section 63 or 163 deletes the module ID and module information of the removed function module unit registered in the module control data memory 1661 at the foregoing step S4 from the registered data (step S8).

Then, the control circuit section 63 or 163 displays icons and module information of connected function module units on the display section 60 or 161 (step S9). It is determined whether or not there is another function module unit removed from the wrist band 4 or 5 (step S10), and the processing at steps S8 and S9 is repeated for all of removed function module units.

When the processing at steps S8 and S9 has been completed for all of the removed function module units, or when the result of the determination at step S7 shows that there is no removed function module unit, the control circuit section 63 or 163 displays icons and module information of the respective function module units connected to the wrist band 4 or 5 on the display section 60 or 161 by referencing the contents registered in the module control data memory 1661 (step S11).

The control circuit section 63 or 163 reads the contents registered in the module control data memory 1661 and selectively controls a function module unit to be operated from the capacity of a connected power supply module unit and the power consumption information data 8168 of the respective function module units (step S12).

As a result, if an input processing (device) function module unit, for example, has been operated, the control circuit section 63 or 163 processes data entered by the user in response to arbitrary manipulations of the user (step S13).

When the operated function module unit is a function module unit other than the input processing (device) function module unit and the output processing (device) function module unit for which processing is performed at the next step S15, data is processed in accordance with the function and specifications of the function module unit (step S14).

When the operated function module unit is an output processing (device) function module unit, the control circuit section 63 or 163 outputs data which is instructed by the user through arbitrary manipulations (step S15).

Figure 62:
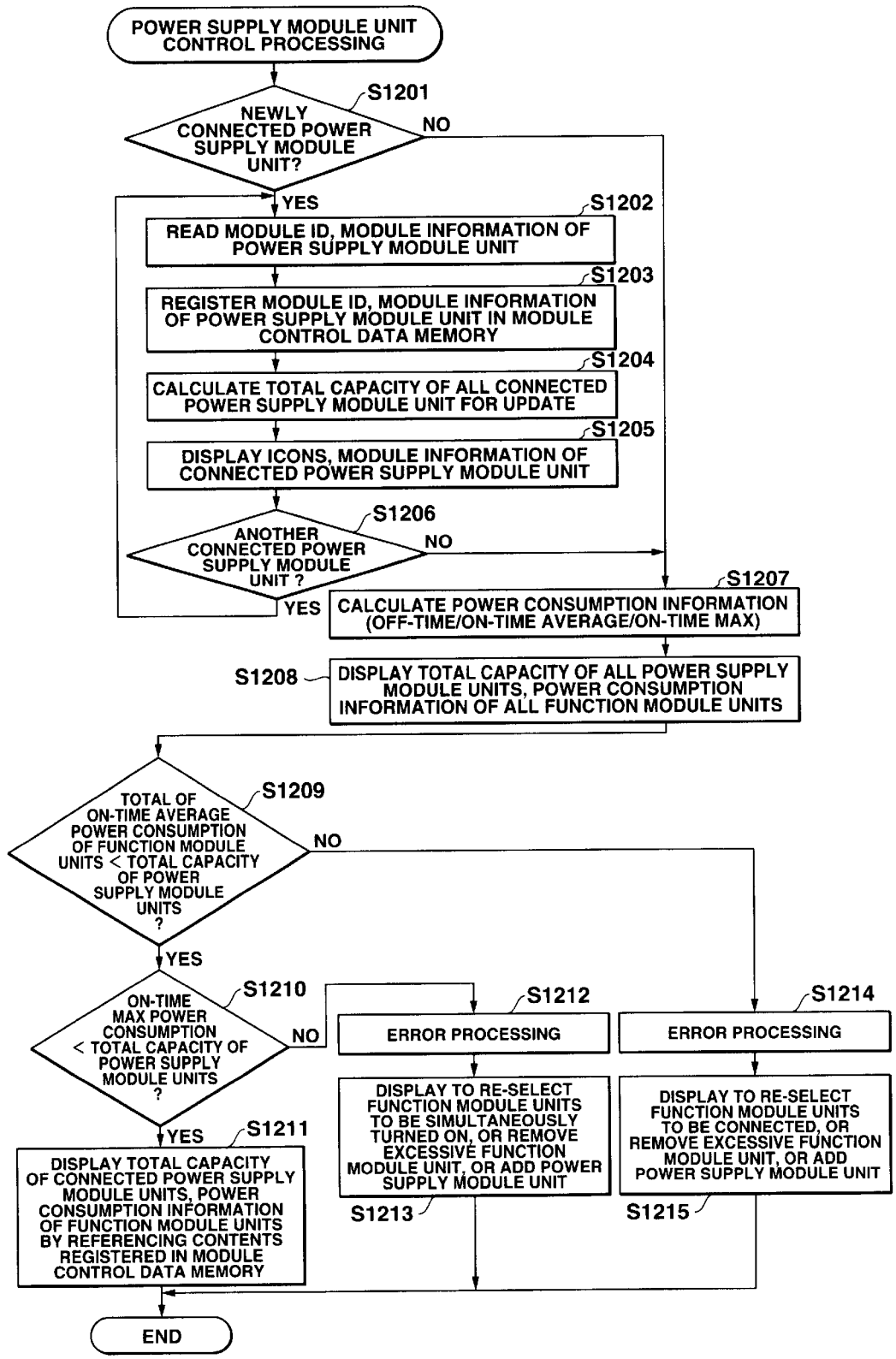
FIG. 62 is a flow chart illustrating step S12 in FIG. 59 in detail.

FIG. 62 is a flow chart illustrating in detail a routine of the processing at step S12 for selecting a function module to be operated.

It is first determined whether or not there is a newly connected power supply module unit fitted on the wrist band 4 or 5 (step S1201). If there is a newly connected power supply module, the control circuit section 63 or 163 reads a module ID stored in the ROM 816 of the power supply module unit, and reads subsequent module information (step S1202).

The read module ID and module information are registered in the module control data memory 1661 (step S1203).

The control circuit section 63 or 163 calculates the total capacity of all power supply module units connected to the wrist bands, and updates the value of the total capacity so far stored in the module control data memory 1661 (step S1204).

The control circuit section 63 or 163 displays icons representative of connected power supply module units and module information of the same on the display section 60 or 161 (step S1205). It is determined whether or not there is another newly connected power supply module unit (step S1206), and the processing from step S1022 to step S1205 is repeated to all of newly connected power supply module units.

When the processing from step S1202 to step S1205 has been completed or when the result of the determination at step S1201 shows that there is no newly connected power supply module unit, the control circuit section 63 or 163 calculates off-time power consumption, average on-time power consumption, and maximum on-time power consumption from power consumption information data of all connected function module units except for the power supply module units (step S1207).

Then, the control circuit section 63 or 163 displays the total capacity of all the connected power module units and the power consumption information of all the function module units on the display section 60 or 161 (step S1208).

It is determined whether or not a total of on-time average power consumption of all the function module units except for the power supply module units is less than the total capacity of all the connected power supply module units (step S1209).

If the determination at step S1209 is NO, i.e., if the total of on-time average power consumption of the connected function module units is equal to or more than the total capacity of all the power supply modules, the control circuit section 63 or 163 performs error processing (step S1214).

Associated with the error processing, the control circuit section 63 or 163 displays re-selection of function module units to be connected, or removal of excessive function module units, or addition of power supply module units on the display section 60 or 161 (step S1215).

On the other hand, if the determination at step S1209 is YES, i.e., if the total of on-time average power consumption of all the connected function module unit is less than the total capacity of all the power supply module units, it is determined whether or not the total of on-time maximum power consumption of all function module units except for the power supply module units is less than the total capacity of all the connected power supply module units (step S1210).

If the determination at step S1210 is NO, i.e., if the total of on-time maximum power consumption is equal to or more than the total capacity of all the connected power supply module units, the control circuit section 63 or 163 performs error processing (step S1212).

Associated with the error processing, the control circuit section 63 or 163 displays on the display section 60 or 161 to re-select function module units to be simultaneously driven, or remove excessive function module units, or add power supply module units (step S1213).

If the determinations at step S1209 and at step S1210 are both YES, i.e., if the total of on-time average power consumption of the connected function module units is less than the total capacity of the power supply module units, and if the total of on-time maximum power consumption of the connected function module units is less than the total capacity of the power supply module units, the control circuit section 63 or 163 performs processing at step S1211.

Specifically, the control circuit section 63 or 163 displays the total capacity of the connected power supply module units, and the power consumption of the connected function module units by referencing the contents registered in the module control data memory 1661.

Figure 63:
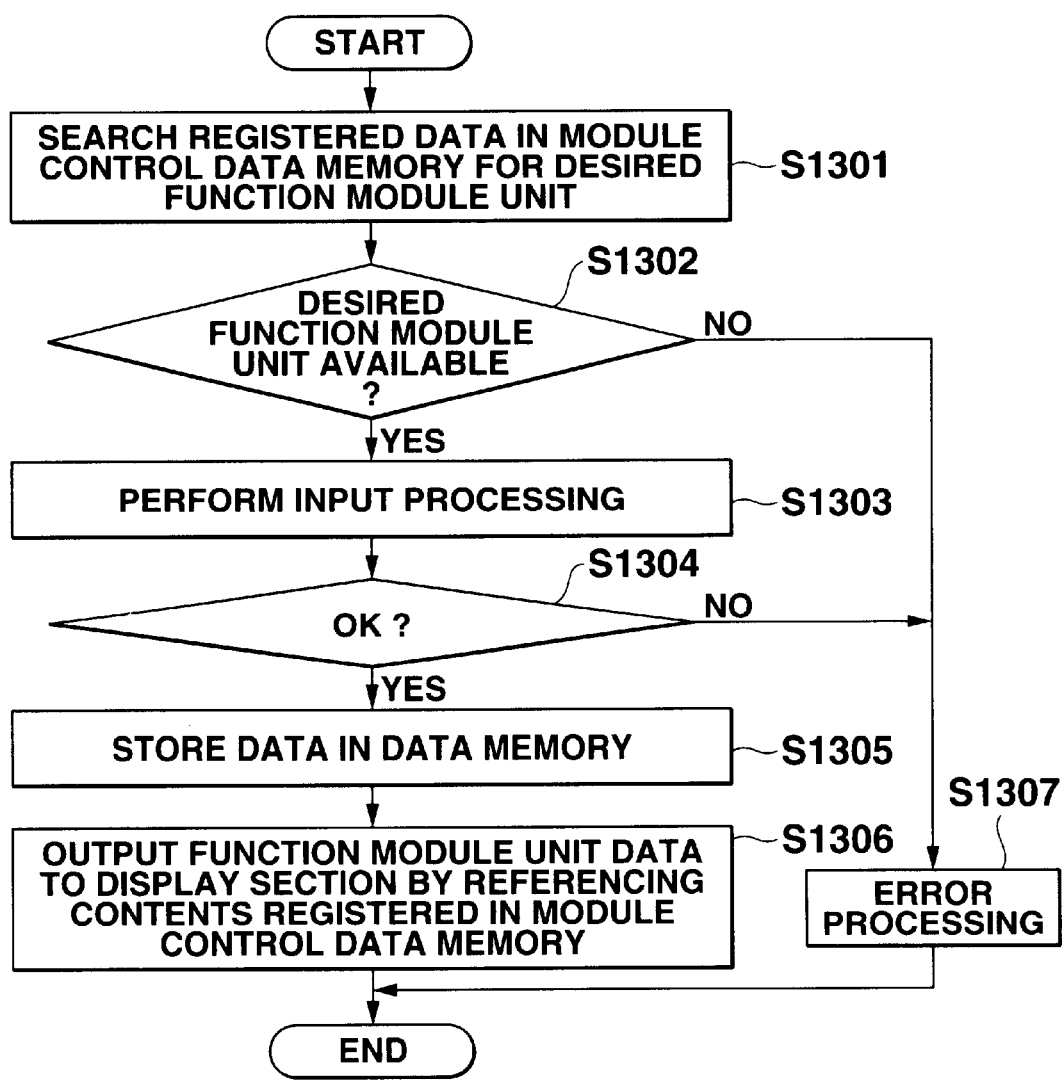
FIG. 63 is a flow chart illustrating step S13 in FIG. 59 in detail.

FIG. 63 is a flow chart illustrating in detail a routine of the data input processing at step S13 in FIG. 59.

In response to manipulations of the user on the key sections 62 or 162, the control circuit section 63 or 163 searches data registered in the module control data memory 1661 for a desired input processing (device) function module unit (step S1301).

It is determined from the result of the search whether or not the desired input processing (device) function module is available (step S1302), and the control circuit section 63 or 163 performs error processing if not (step S1307), followed by termination of the input processing routine.

If the desired function module unit is available, this function module unit performs data input processing of the user through arbitrary manipulations (step S1303).

It is determined whether or not the data input has been successfully performed (step S1304), and the control circuit section 63 or 163 performs the error processing if not successfully performed (step S1307), followed by termination of the input processing routine.

If the result of the determination at step S1304 shows that the data input has been successfully performed, the control circuit section 63 or 163 stores the input data in the data memory 166 within the control section (control circuit section 63 or 163) (step S1305).

Then, the control circuit section 63 or 163 displays the function module unit which has performed the input processing and associated data on the display section 60 or 161 by referencing the contents registered in the module control data memory 1661 (step S1306).

Figure 64:
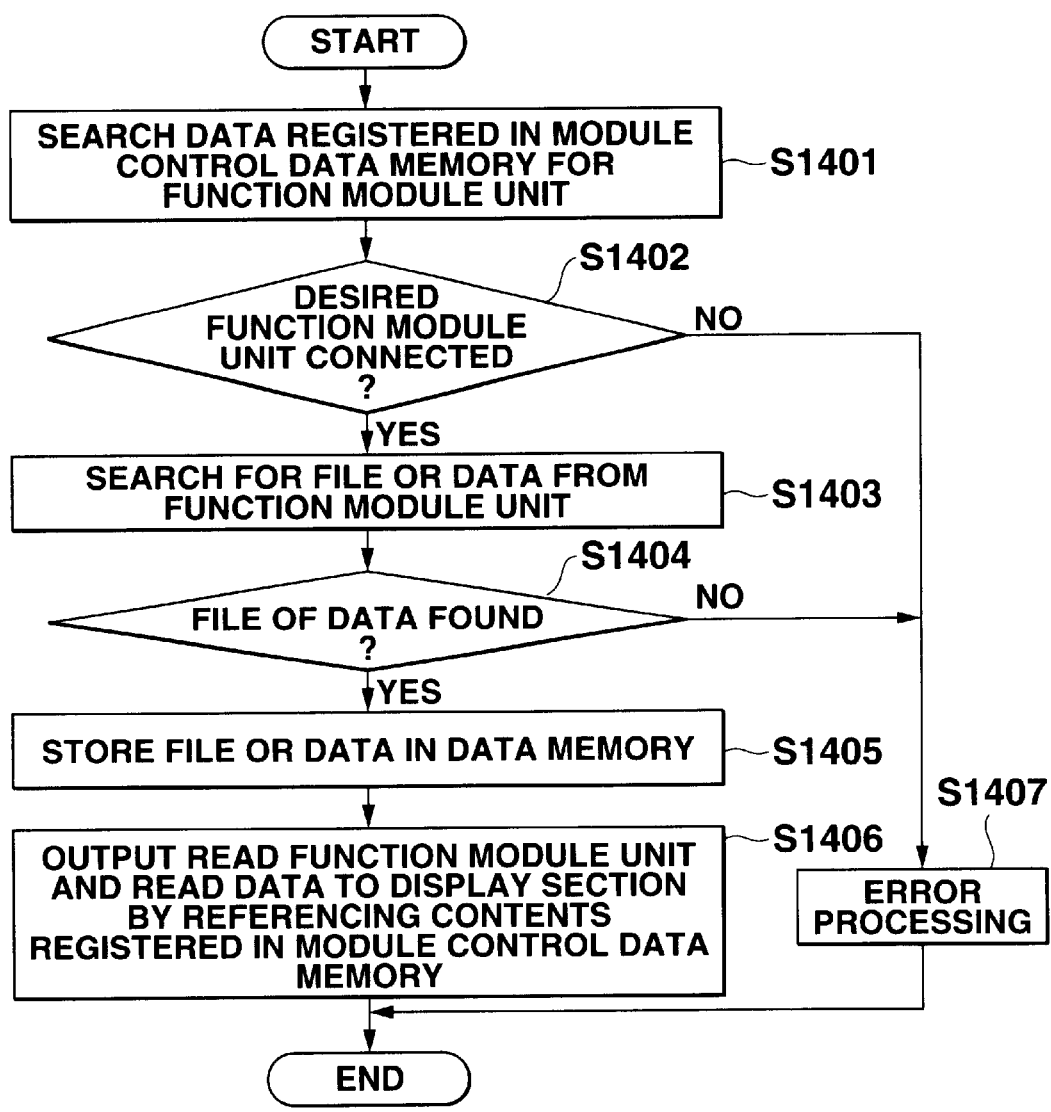
FIG. 64 is a flow chart illustrating in detail when data is read from a function module unit having a memory function and stored in a data memory (a read operation) at step S14 in FIG. 59.

FIG. 64 is a flow chart illustrating in detail a routine of the data control processing at step S14 in FIG. 59 when data is read from a function module unit having a memory function and stored in the data memory 166 of the control circuit section 63 or 163.

In response to manipulations on the key sections 62 or 162, the control circuit section 63 or 163 searches data registered in the module control data memory 1661 for a function module unit which has a memory function (step S1401).

It is determined from the result of the search whether or not a function module unit having a memory function is connected to the wrist band 4 or 5 (step S1402), and the control circuit section 63 or 163 performs error processing if not (step S1407), followed by termination of this routine.

If a function module unit having a memory function is connected, it is determined whether or not a file or data specified by the user through predetermined manipulations is stored in the function module unit (step S1403).

It is determined whether or not a desired file or data is found (step S1404), and the control circuit section 63 or 163 performs the error processing (step S1407), followed by termination of this routine.

If the result of the determination at step S1404 shows that the desired file or data is found, the file or data is stored in the data memory 166 of the control circuit section 63 or 163 (step S1405).

The control circuit section 63 or 163 displays the function module unit and the read file or data on the display section 60 or 161 by referencing the contents registered in the module control data memory 1661 (step S1406).

Figure 65:
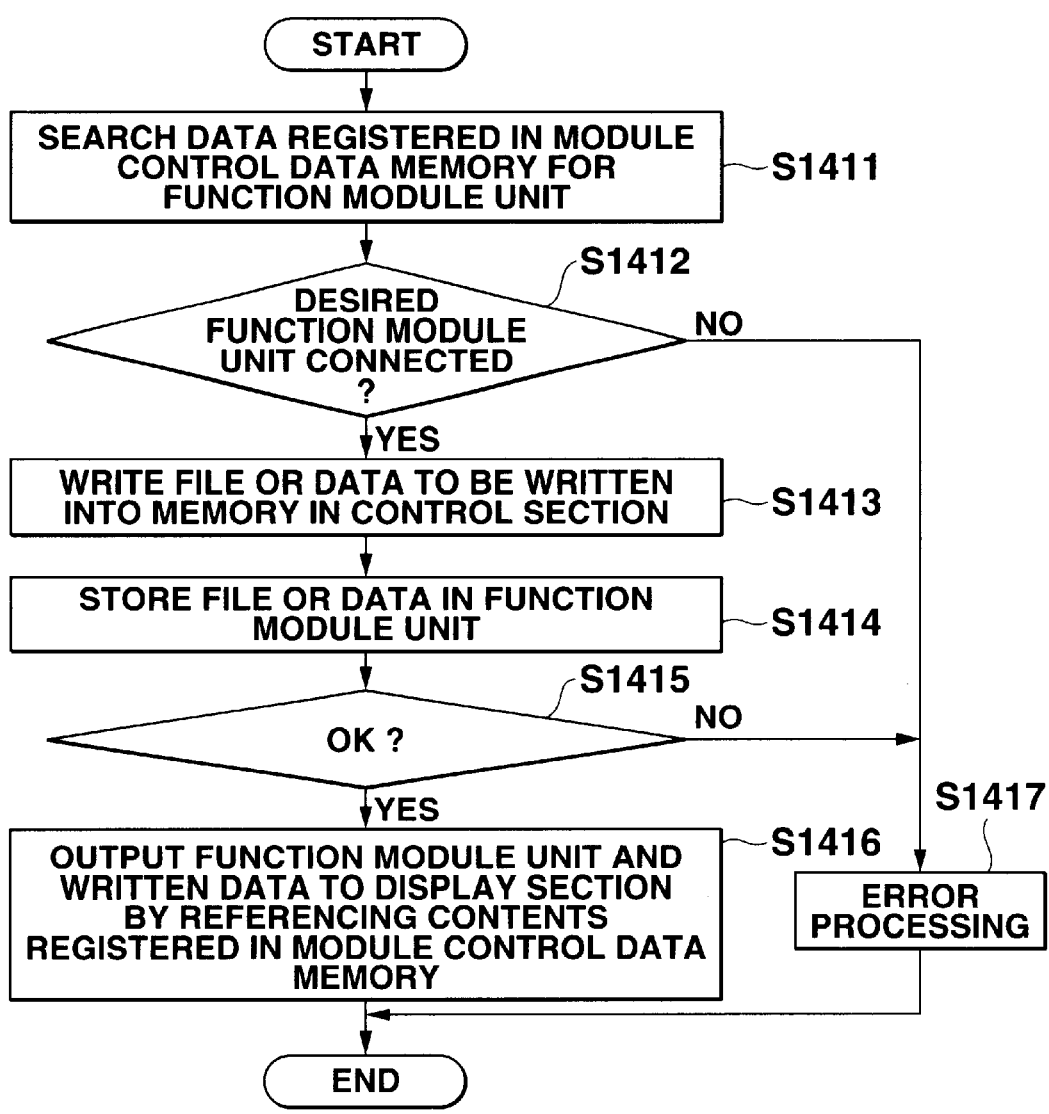
FIG. 65 is a flow chart illustrating in detail when data is read from a data memory and stored in a function module unit having a memory function (a write operation) at step S14 in FIG. 59.

FIG. 65 is a flow chart illustrating in detail a routine of the processing at step S14 in FIG. 59 when data is written from the data memory 166 of the control circuit section 63 or 163 to a function module unit having a memory function, reverse to the processing routine in FIG. 64.

In response to predetermined manipulations by the user on the key sections 62 or 162, the control circuit section 63 or 163 searches data registered in the module control data memory 1661 for a function module unit having a memory function (step S1411).

It is determined from the result of the search whether or not a function module unit having a memory function is connected to the wrist band 4 or 5 (step S1412), and the control circuit section 63 or 163 performs error processing if not (step S1417), followed by termination of this processing routine.

If a function module unit having a memory function is connected, a file or data specified by the user through predetermined manipulations is first temporarily read into a memory within the control circuit section 63 or 163 (step S1413).

Then, the control circuit section 63 or 163 stores the file or data in the memory function module unit (step S1414).

It is determined whether or not the storage has been successfully performed (step S1415), and the control circuit section 63 or 163 performs the error processing if not performed successfully (step S1417), followed by termination of the processing routine.

If the storage has been successfully performed, the control circuit section 63 or 163 displays the function module unit in which the file or data has been stored, and the file or data on the display unit 60 or 161 by referencing the contents registered in the module control data memory 1661 (step S1416).

Figure 66:
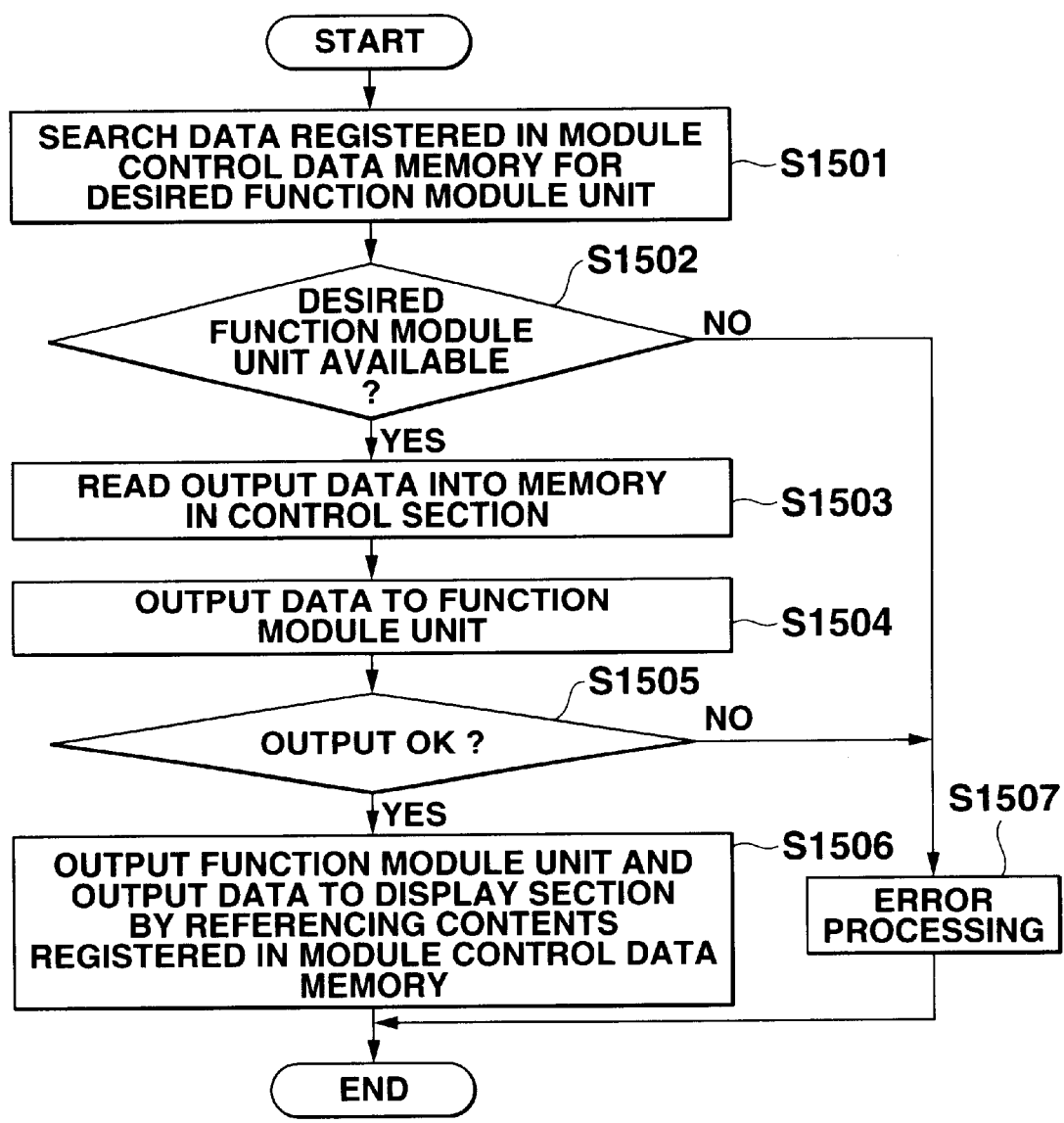
FIG. 66 is a flow chart illustrating step S15 in FIG. 59 in detail.

FIG. 66 is a flow chart illustrating in detail a routine of the data output processing at step S15 in FIG. 59.

In response to manipulations on the key sections 62 or 162, the control circuit section 63 or 163 searches data registered in the module control data memory 1661 for a function module unit having an output processing (device) function (step S1501).

It is determined from the result of the search whether or not a function module unit having an output processing (device) function is available (step S1502), and the control processing section 63 or 163 performs error processing if not (step S1507), followed by termination of the function module unit output processing routine.

If a function module unit having an output processing (device) function is available, data to be output from the function module unit is first read into a memory within the control section (control circuit section 63 or 163) (step S1503).

This data is output to the function module unit (step S1504).

It is determined whether or not the output has been successfully performed (step S1505), and the control circuit section 63 or 163 performs the error processing if not (step S1507), followed by termination of the function module unit output processing routine.

If the output has been successfully performed, the control circuit section 63 or 163 displays the function module unit to which the data has been output, and the data on the display section 60 or 161 by referencing the contents registered in the module control data memory 1661 (step S1506).

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents. While the foregoing embodiments have been described for a wristwatch worn on a wrist of the user taken as an example of a body wearable information processing terminal device, the present invention is not limited to the wristwatch, but may be applied to any information processing terminal device.

Figure 67:
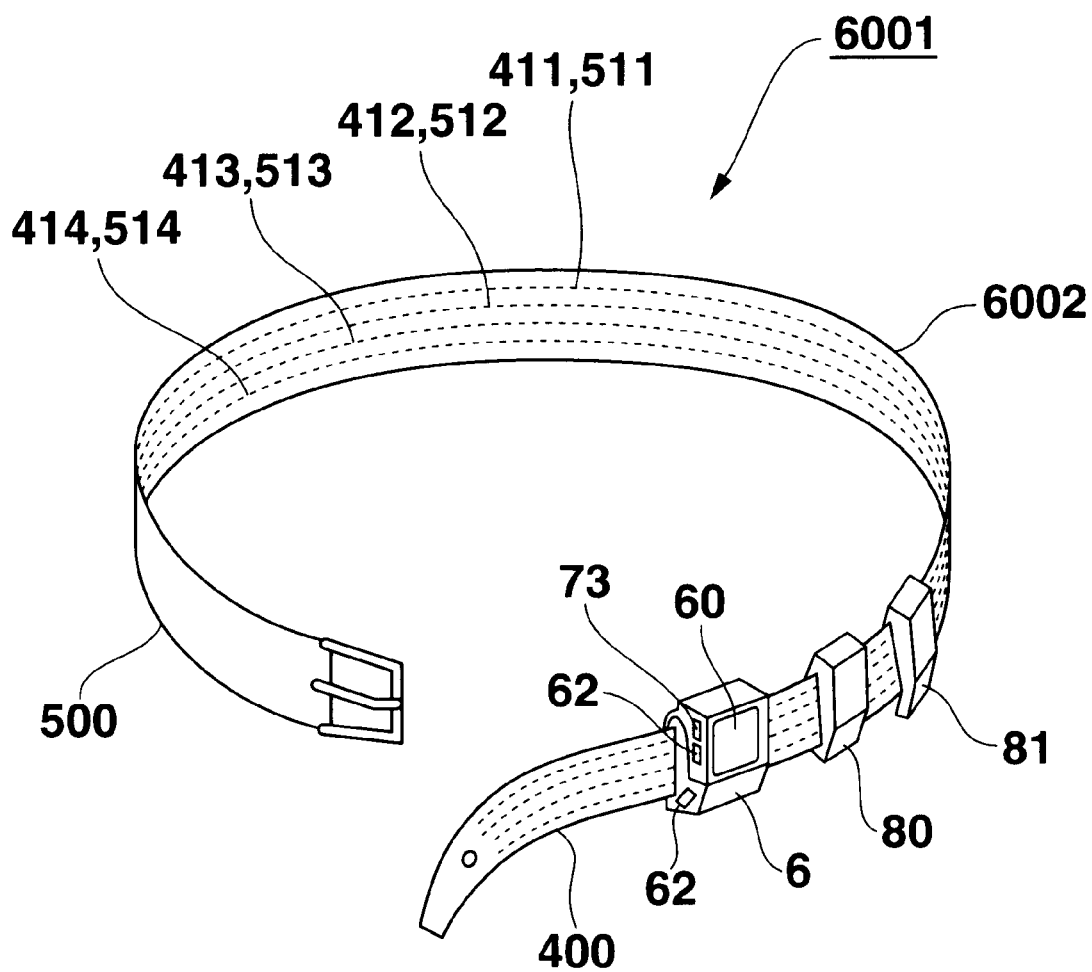
FIG. 67 is a diagram illustrating an external appearance of an information processing terminal device according to the present invention which is attached to a belt.

For example, as illustrated in FIG. 67, the information processing terminal device may be designed to have the bus line wires 411, 412, 413, 414 (511, 512, 513, 514) routed on a belt 6002 wound around the west of the user, and the body case 6 provided with a movable shaft 73 for pivoting the display section 60, such that the display section 60 can be rotated upward by 90 degrees, when the user mounts the information processing terminal device, to allow the user to look down the display section 60.

In this case, respective function module units 80 and 81 can be removably mounted to the belt 6002 and can be applied as a wearable computer which can readily extend functions.

What is claimed is:

1. A body wearable information processing device driven by a battery with predetermined capacity information, the device comprising:

a case body including a display which displays data, a control circuit which performs a predetermined function, and a first memory which stores received module data;

a band connected to the case body for removable attachment to a human body, and including a bus line wire extending along a longitudinal direction of the band and a first terminal electrically connected to the bus line wire; and a function module or modules removably attached to the band and each including a second memory which stores module data indicative of each of the function modules, an electric circuit, and a second terminal electrically connected to the first terminal, wherein the control circuit comprises a memory controller which reads the module data from the second memory of the function module or modules which are attached to the band and writes the read module data into the first memory, and an output unit which compares a sum information of power consumption of the function module or modules corresponding to the read module data stored in the first memory with predetermined capacity information and outputs a result of the comparison.

2. The device according to claim 1, wherein the bus line wire is embedded in the band and comprises a power source line, data line, clock line, and a ground line.

3. The device according to claim 1, wherein the bus line wire comprises a first line which transmits power from the battery and data, and a second line for grounding.

4. A body wearable information processing device driven by a battery with predetermined capacity information, the device comprising:

a case body including a display which displays data, a control circuit which performs a predetermined function, and a first memory which stores received module data; and a band connected to the case body and including function modules and a connector which removably connects the function modules, each of the function modules including an electronic circuit and a second memory which stores module data indicative of each of the function modules, wherein the control circuit includes a memory controller which reads the module data from the second memory of each of the function modules and writes the read module data into the first memory, and an output unit which compares a sum information of power consumption of the function modules corresponding to the read module data stored in the first memory with the predetermined capacity information and outputs a result of the comparison.

5. The device according to claim 4, wherein:

the case body includes a first terminal electrically connected to the control circuit;

each of the function modules includes a signal line connected to the electronic circuit and second terminals connected to both ends of the signal line;

the function modules are connected to each other through the second terminals; and the case body and the function modules are electrically connected through the first terminal and second terminals.

6. A body wearable information processing device driven by a battery with predetermined capacity information, the device comprising:

a case body including a display which displays data, a control circuit which performs a predetermined function, and a first memory which stores received module data; and a band connected to the case body and including function modules and a connector which removably connects the function modules, each of the function modules including a second memory which stores module data indicative of the function modules, a signal line, and second terminals connected to both ends of the signal line, wherein the control circuit includes a memory controller which reads the module data from the second memory of each of the function modules and writes the read module data into the first memory and an output unit which compares a sum information of power consumption of the function modules corresponding to the read module data stored in the first memory with the predetermined capacity information and outputs a result of the comparison.

7. A body wearable information processing device driven by a battery with predetermined capacity information, the device comprising:

a case body including a display which displays data, a control circuit which performs a predetermined function, a communication controller which controls optical data communication, and a first memory which stores received module data;

a band connected to the case body and removably attachable to a human body and including a bus line wire extending along a longitudinal direction of the band, a first terminal electrically connected to the bus line wire, a first light emitting unit electrically connected to the bus line wire, and a first light receiving unit electrically connected to the bus line wire; and a function module or modules removably attached to the band and each comprising a second memory which stores module data indicative of each of the function modules, an electronic circuit, a second terminal electrically connected to the first terminal, a second light receiving unit which is arranged to face the first light emitting unit, and a second light emitting unit which is arranged to face the first light receiving unit, wherein the control circuit includes a memory controller which reads the module data from the second memory of each of the function module or modules which are attached to the band and writes the read module data into the first memory and an output unit which compares a sum information of power consumption of the function module or modules corresponding to the read module data stored in the first memory with the predetermined capacity information and outputs a result of the comparison.

8. The device according to claim 7, wherein the bus line wire is embedded in the band and includes a power source line, a data communication line for optical data communication, and a ground line.

9. A body wearable information processing device driven by a battery with predetermined capacity information, the device comprising:

a case body including a display which displays data, a control circuit which performs a predetermined function, and a first memory which stores received module data;

a band connected to the case body and which is connected to the case body and removably attachable to a human body, and including a first coil for an electromagnetic induction; and a function module or modules which are removably attached to the band and each including a second coil for an electromagnetic induction, a second memory which stores module data indicative of each of the function modules, and an electric circuit;

wherein the control circuit comprises a transfer controller which transfers one of power from the battery and data between the first coil and second coil, a memory controller which reads the module data from the second memory of each of the function module or modules which are attached to the band and writes the read module data into the first memory and an output unit which compares a sum information of power consumption of the function module or modules corresponding to the read module data stored in the first memory with the predetermined capacity information and outputs a result of the comparison.

* * * * *